(12) United States Patent
Evans et al.

(10) Patent No.: US 11,141,249 B2
(45) Date of Patent: Oct. 12, 2021

(54) SYSTEMS AND METHODS FOR PERSONALIZED ORAL CARE

(71) Applicant: Fresh Health Inc., Mountain View, CA (US)

(72) Inventors: Ryan Christopher Evans, San Francisco, CA (US); Angela Junyan Chu, San Francisco, CA (US); Sophie Katherine Sheeline, San Francisco, CA (US); Bruce Michael Schena, Menlo Park, CA (US); Michael Lee Hanuschik, Mountain View, CA (US); Jonathan Riley Cox, Saratoga, CA (US); Kristina Jenna Cook, San Francisco, CA (US)

(73) Assignee: FRESH HEALTH INC., Mountain View, CA (US)

( * ) Notice: Subject to any disclaimer, the term of this patent is extended or adjusted under 35 U.S.C. 154(b) by 0 days.

(21) Appl. No.: 17/066,383

(22) Filed: Oct. 8, 2020

(65) Prior Publication Data

US 2021/0085436 A1    Mar. 25, 2021

Related U.S. Application Data

(63) Continuation of application No. PCT/US2020/028311, filed on Apr. 15, 2020.
(Continued)

(51) Int. Cl.
*A61C 17/02* (2006.01)
*A61C 17/34* (2006.01)

(52) U.S. Cl.
CPC ...... *A61C 17/0211* (2013.01); *A61C 17/0202* (2013.01); *A61C 17/3481* (2013.01)

(58) Field of Classification Search
CPC ............ A61C 17/0211; A61C 17/0202; A61C 17/3481; A61C 17/0217; A61C 17/00; A61C 17/024; A61C 17/032
See application file for complete search history.

(56) References Cited

U.S. PATENT DOCUMENTS

| 3,379,192 A | 4/1968 | Warren |
| 3,527,218 A | 9/1970 | Westine |
(Continued)

FOREIGN PATENT DOCUMENTS

| EP | 0 865 770 | 9/1998 |
| FR | 2 905 258 | 3/2008 |
| WO | WO 2016/164068 | 10/2016 |

OTHER PUBLICATIONS

International Search Report and Written Opinion issued in International Application No. PCT/US2018/040459 dated Nov. 5, 2018, 12 pages.
(Continued)

*Primary Examiner* — Nicholas D Lucchesi
(74) *Attorney, Agent, or Firm* — Cooley LLP

(57) ABSTRACT

Described herein are systems and methods for providing personalized oral care. A system for oral care comprises an oral insert. The oral insert is sized and shaped according to a user's oral cavity, and has a plurality of fluid nozzles and an effluence conduit to channel fluid out of the user's oral cavity. Pressurized fluid provided through the nozzles are directed to, for example, the interproximal spaces between the user's teeth. In some variations, a system comprises an oral insert and an elastomeric substrate that is attached to the oral insert. In some variations, the elastomeric substrate comprises a textured surface vibrates and/or mechanically agitates and/or translates along the surface of the user's teeth. In some variations, a system for oral care comprises a microbiome collection chamber. Some variations comprise
(Continued)

dental shim devices that are used for acquiring oral structure data and alignment between the upper and lower arches.

18 Claims, 58 Drawing Sheets

Related U.S. Application Data

(60) Provisional application No. 62/833,926, filed on Apr. 15, 2019, provisional application No. 62/879,983, filed on Jul. 29, 2019.

(56) References Cited

U.S. PATENT DOCUMENTS

| | | | |
|---|---|---|---|
| 3,731,675 A | | 5/1973 | Kelly |
| 4,164,940 A | | 8/1979 | Quinby |
| 5,104,315 A | | 4/1992 | McKinley |
| 5,177,827 A | * | 1/1993 | Ellison .................. A61C 17/228 15/22.1 |
| 5,365,624 A | | 11/1994 | Berns |
| 6,056,710 A | | 5/2000 | Bachman et al. |
| 6,334,853 B1 | | 1/2002 | Kopelman et al. |
| 6,353,956 B1 | | 3/2002 | Berge |
| 6,402,707 B1 | | 6/2002 | Ernst |
| 6,475,173 B1 | | 11/2002 | Bachman et al. |
| 6,893,259 B1 | | 5/2005 | Reizenson |
| 7,059,853 B2 | * | 6/2006 | Hegemann ............ A61C 1/0092 433/80 |
| 7,092,107 B2 | | 8/2006 | Babayoff et al. |
| 7,112,065 B2 | | 9/2006 | Kopelman et al. |
| 7,156,661 B2 | | 1/2007 | Choi et al. |
| 8,102,538 B2 | | 1/2012 | Babayoff |
| 8,241,035 B2 | | 8/2012 | Jones et al. |
| 8,363,228 B2 | | 1/2013 | Babayoff |
| 8,617,090 B2 | | 12/2013 | Fougere et al. |
| 8,638,447 B2 | | 1/2014 | Babayoff et al. |
| 8,638,448 B2 | | 1/2014 | Babayoff et al. |
| 8,675,207 B2 | | 3/2014 | Babayoff |
| 8,684,956 B2 | | 4/2014 | McDonough et al. |
| 8,888,727 B2 | | 11/2014 | Boyd et al. |
| 8,936,466 B2 | | 1/2015 | Moffson et al. |
| 9,022,959 B2 | | 5/2015 | Fusi, II et al. |
| 9,022,960 B2 | | 5/2015 | Fougere et al. |
| 9,022,961 B2 | | 5/2015 | Fougere et al. |
| 9,101,433 B2 | | 8/2015 | Babayoff |
| 9,216,073 B2 | | 12/2015 | McDonough et al. |
| 9,222,768 B2 | | 12/2015 | Ernst et al. |
| 9,299,192 B2 | | 3/2016 | Kopelman |
| 9,308,064 B2 | | 4/2016 | Binner et al. |
| 9,367,063 B2 | | 6/2016 | Herman et al. |
| 9,579,173 B2 | | 2/2017 | Fougere et al. |
| 9,615,901 B2 | | 4/2017 | Babayoff et al. |
| 9,770,643 B2 | | 9/2017 | Hawkins |
| 10,215,317 B2 | | 2/2019 | Burkhart et al. |
| 10,591,898 B2 | | 3/2020 | Wolf et al. |
| 10,682,211 B1 | | 6/2020 | Barlet et al. |
| 2007/0184404 A1 | | 8/2007 | Johnki |
| 2009/0208898 A1 | * | 8/2009 | Kaplan ................ A61C 17/028 433/80 |
| 2009/0223513 A1 | * | 9/2009 | Papania ............ A61M 15/0085 128/200.16 |
| 2010/0062397 A1 | * | 3/2010 | Brewer .................. A61C 17/38 433/216 |
| 2011/0027746 A1 | | 2/2011 | McDonough et al. |
| 2011/0072605 A1 | | 3/2011 | Steur |
| 2011/0117517 A1 | | 5/2011 | Bergheim et al. |
| 2011/0154595 A1 | | 6/2011 | Hill |
| 2011/0185525 A1 | | 8/2011 | Stapelbroek et al. |
| 2011/0318705 A1 | | 12/2011 | Sullivan et al. |
| 2012/0077144 A1 | | 3/2012 | Fougere et al. |
| 2012/0189976 A1 | * | 7/2012 | Mcdonough ....... A61C 17/0202 433/89 |
| 2012/0219926 A1 | | 8/2012 | Sullivan et al. |
| 2012/0318289 A1 | | 12/2012 | Sahoo |
| 2013/0014331 A1 | | 1/2013 | Garner et al. |
| 2013/0190608 A1 | | 7/2013 | Schmidt |
| 2016/0235509 A1 | | 8/2016 | Freiberg et al. |
| 2016/0236851 A1 | | 8/2016 | Leser et al. |
| 2018/0116773 A1 | | 5/2018 | Chen et al. |
| 2018/0344440 A1 | | 12/2018 | Dorward et al. |
| 2019/0000599 A1 | | 1/2019 | Hanuschik et al. |
| 2021/0030519 A1 | | 2/2021 | Hanuschik et al. |

OTHER PUBLICATIONS

International Search Report and Written Opinion issued in International Application No. PCT/US2020/028311 dated Aug. 14, 2020, 16 pages.

Extended European Search Report issued in European Application No. 18824871.0 dated Feb. 8, 2021, 10 pages.

* cited by examiner

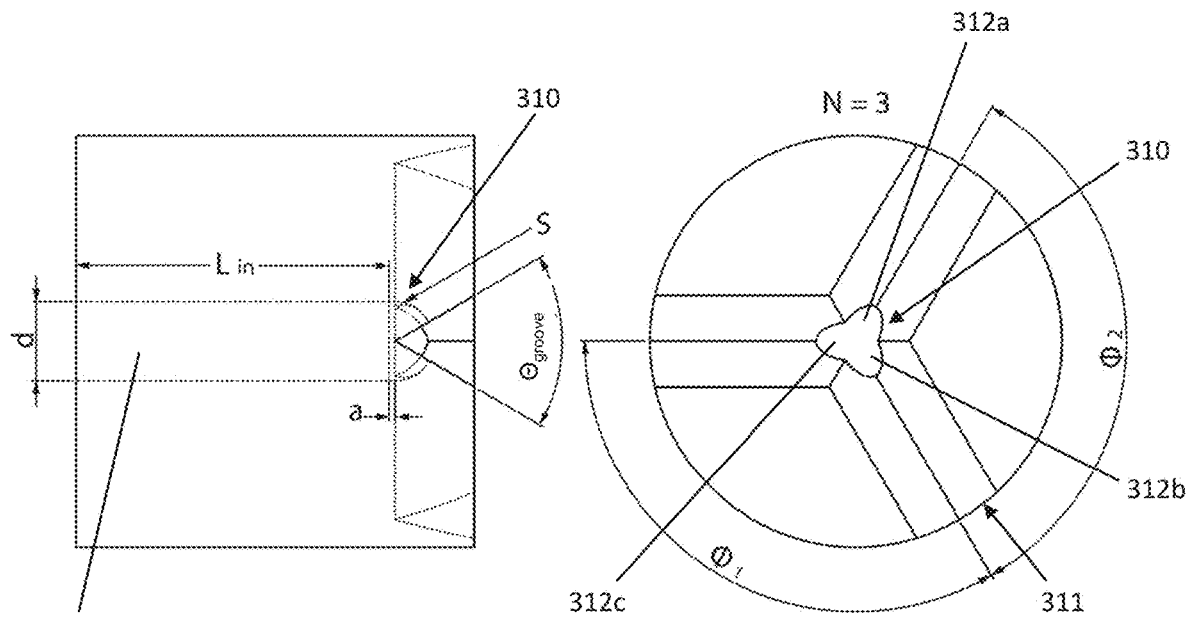
FIG. 3B
FIG. 3C
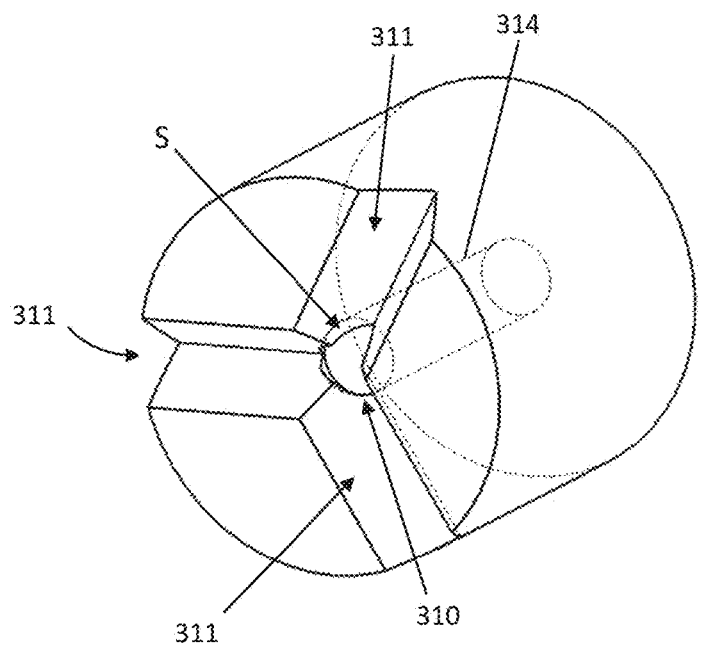
FIG. 3D

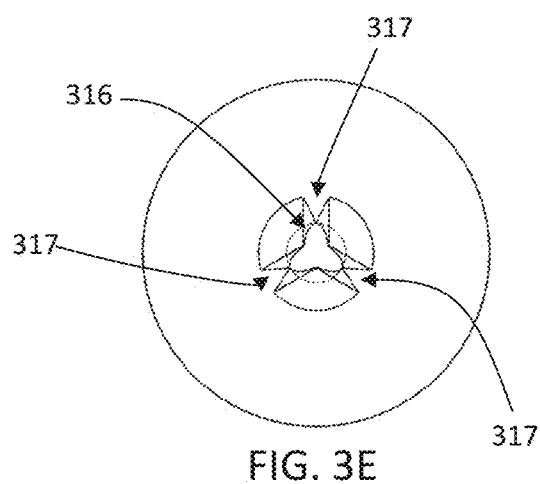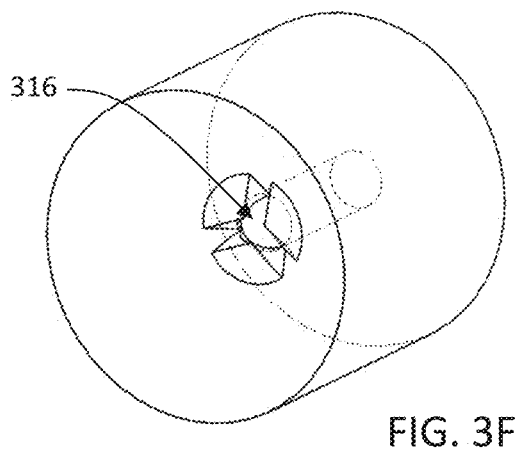
FIG. 3E
FIG. 3F

880

| Aligning placement tab of the dual-sided shim with the midplane of the user's bit and inserting the dual-sided shim into the user's oral cavity | 882 |

↓

| Clamping the dual-sided shim between the upper and lower teeth | 884 |

↓

| Removing the dual-sided shim from the user's oral cavity | 886 |

↓

| Scanning the impressions of the upper teeth and gums in the upper tray, and the impressions of the lower teeth and gums in the lower tray using a dental impression scanner | 888 |

↓

| Scanning single-arch impressions of the user's upper teeth and gums and the user's lower teeth and gums | 890 |

↓

| Determining the relative alignment between the upper and lower arches based on the scans of the impressions from the dual-sided shim and the single-arch impressions | 892 |

FIG. 8J

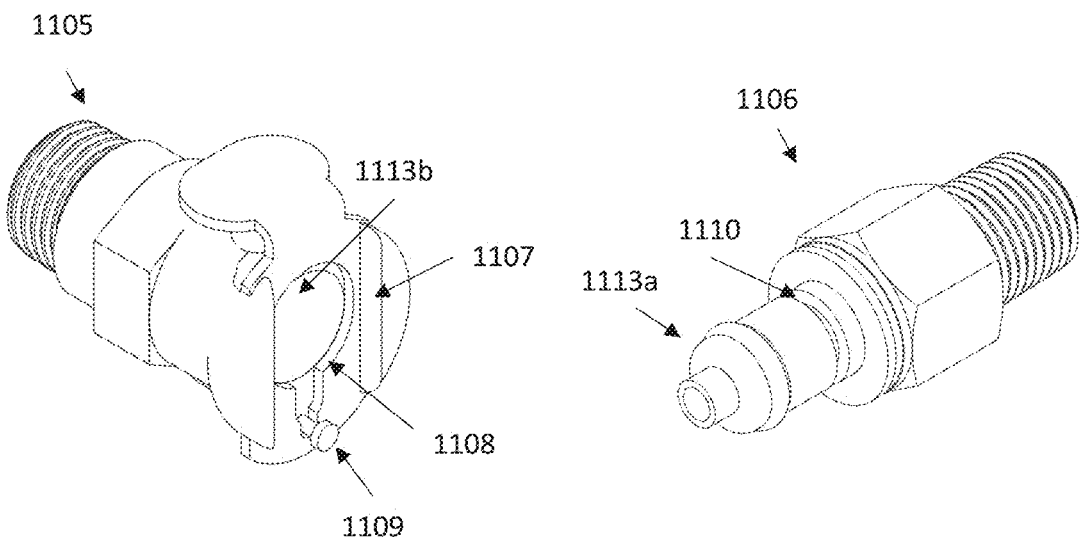
FIG. 11D
FIG. 11E
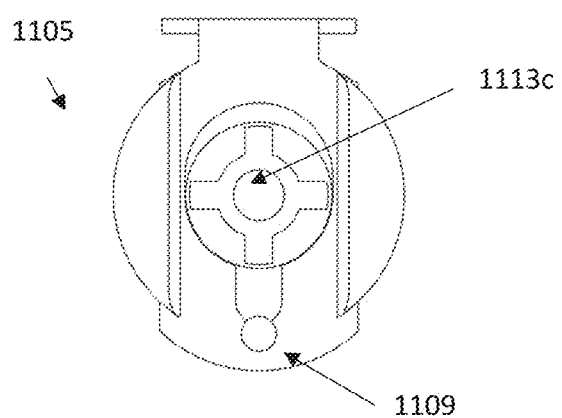
FIG. 11F

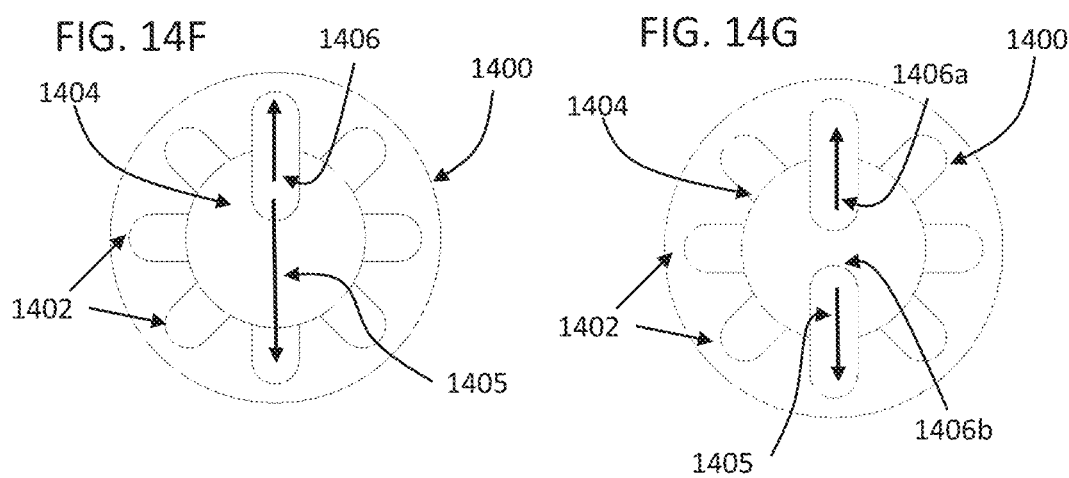

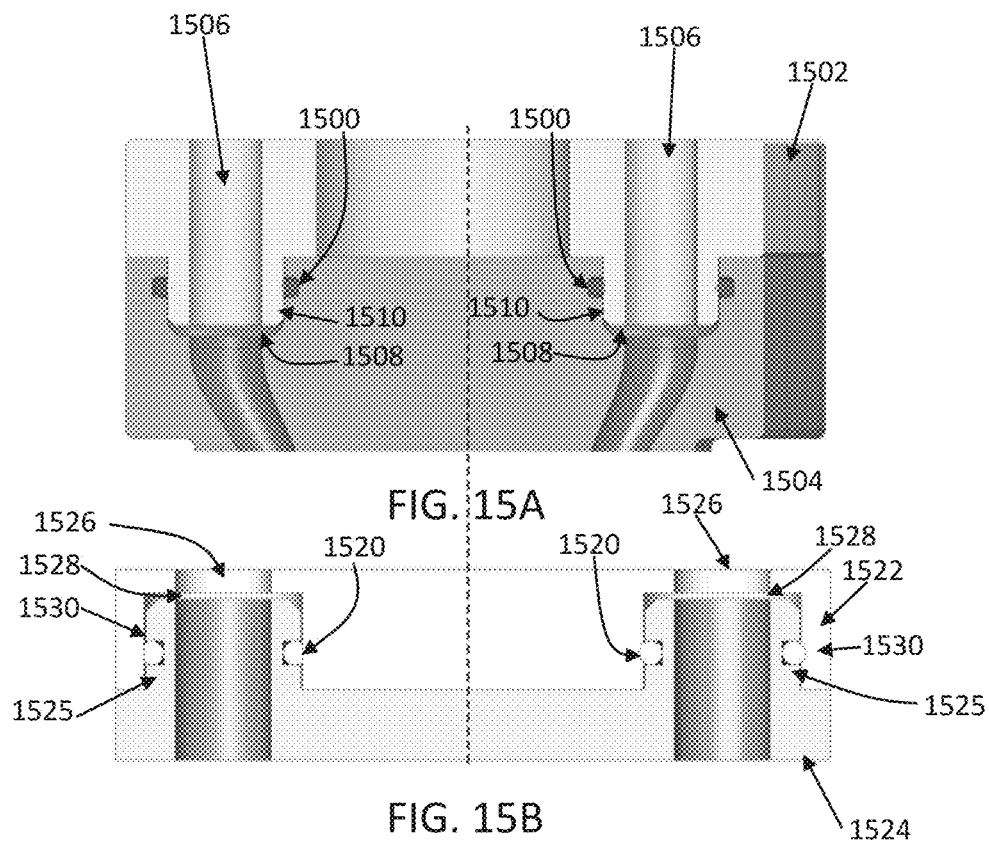
FIG. 15A
FIG. 15B
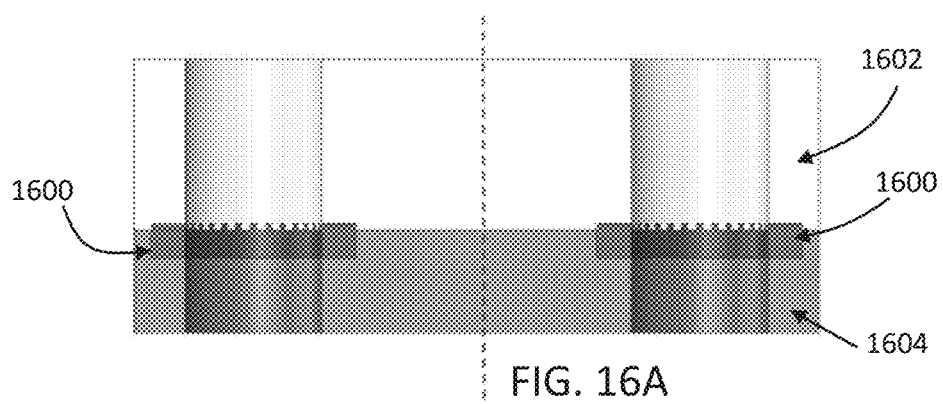
FIG. 16A
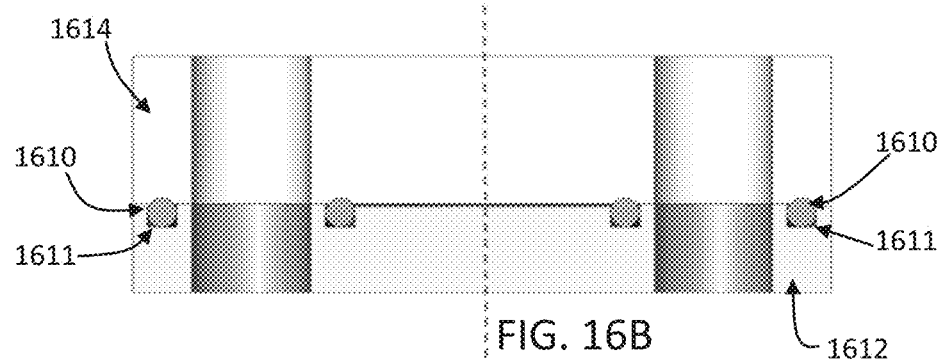
FIG. 16B

SYSTEMS AND METHODS FOR PERSONALIZED ORAL CARE

CROSS-REFERENCE TO RELATED APPLICATIONS

This application is a continuation of International Patent Application No. PCT/US2020/028311, filed Apr. 15, 2020, which claims priority to U.S. Provisional Patent Application No. 62/833,926, filed Apr. 15, 2019, and U.S. Provisional Patent Application No. 62/879,983, filed Jul. 29, 2019, each of which is hereby incorporated by reference in its entirety.

BACKGROUND

Tooth-brushing, interdental cleaning (e.g., flossing), and oral rinsing with antiseptic solutions are methods recommended by dental practitioners to prevent periodontal disease, gum disease (e.g., gingivitis), and/or tooth loss. However, for a variety of reasons, few individuals include all of these steps as part of their regular dental hygiene practice. Without adequate cleaning, bacteria levels in the mouth may rise and increase the likelihood of tooth decay, gum disease, and may even cause systemic inflammation. Elevated levels of inflammation have been linked to an increased risk of cardiovascular disease (e.g., developing atherosclerotic plaques, heart attack, stroke) and other diseases or conditions.

Currently, water flossers are available that provide high-speed fluid jets, as well as electric toothbrushes with vibrating bristles. The high-speed bristle motion can remove plaque and/or biofilms more efficiently than manual brushing. However, these devices can be cumbersome and time-consuming to use, which would reduce the likelihood of consistent and thorough oral care. Accordingly improved devices and methods for oral care are desirable.

SUMMARY

Described herein are systems and methods for providing comprehensive personalized oral care. One variation of a system for oral care comprises an oral insert that is sized and shaped according to a user's oral cavity and has a plurality of fluid nozzles. The system may comprise a handle that is attached to the oral insert, and the handle may have a fluid conduit that provides fluid communication between the fluid nozzles of the oral insert and a fluid reservoir. The system may comprise a fluid pump that is configured to pressurize the fluid from the reservoir and a fluid regulator, such as a fluid switcher, that is configured to deliver and distribute the pressurized fluid to the nozzles of the oral insert. The fluid reservoir may contain water, an antiseptic solution, a liquid medicament, flavored solutions, cleansing solutions, abrasive solutions, microbiome collection fluid(s), and/or any combination of the above-listed solutions and the like. The fluid may also include agents that may help reduce bad breath and may be fluoridated. The fluid nozzles of the oral insert may be located at regions that correspond with interproximal spaces between the user's teeth, so that fluid jets shaped by the nozzles may be directed into the interproximal spaces. Alternatively or additionally, the fluid nozzles may be located at an offset from the location of the interproximal spaces but may be directed toward the interproximal spaces (e.g., the fluid nozzles may be angled such that the fluid jet axis may be aimed toward the interproximal space). In some variations, the fluid nozzles may be located in a recess along an outer surface of the oral insert. The recess may have a flare shape, where the narrowed region of the recess is located at an exit opening of a fluid nozzle, and the width of the recess increases outward, where the width of the widened region of the recess may allow for the unimpeded spread of the fluid jet spray. In some variations, the width of the widened region of the recess may approximate the width of a fluid jet spray. The recess (e.g., indentation, cavity, etc.) surrounding the fluid nozzle exit opening may help direct the fluid jets. The fluid jets passing through the spaces/gaps between teeth may generate a flossing effect, and may help to remove debris and/or biofilm that is lodged in those spaces/gaps. Optionally, the fluid may comprise an antiseptic solution (and/or any other desired solution) and after passing through the interproximal spaces, it may circulate within and throughout the oral cavity to reduce the microbial population, and/or suppress bacterial and/or fungal growth, etc.

An oral insert may also comprise an effluence conduit that is configured to channel fluid from a posterior or lingual region of the user's oral cavity to an anterior or facial region of the user's oral cavity. The effluence conduit may be sized and shaped to promote the egress of the pressurized fluid after it has been passed through the interproximal spaces and circulated throughout the oral cavity so that fluid does not accumulate in the user's mouth. The effluence conduit may comprise a central port located between upper and lower portions of the oral insert, and the posterior opening of the central portion may be configured to channel fluid to the anterior and/or facial region of the user's oral cavity. Optionally, the effluence conduit may also comprise a first side fluid cavity and a second side fluid cavity, where the first and second side fluid cavities are in fluid communication with the central port.

One variation of a system for cleaning a user's oral cavity may comprise a fluid reservoir and an oral insert. The oral insert may comprise an upper portion that is sized and shaped to receive a user's upper teeth, a lower portion that is sized and shaped to receive a user's lower teeth, a plurality of fluid nozzles located in the upper portion and the lower portion and directed toward interproximal spaces between the user's teeth, and an effluence conduit located between the upper portion and the lower portion. The effluence conduit may be configured to channel fluid from a posterior or lingual region to an anterior or facial region of the user's oral cavity. The fluid effluence conduit may comprise a central port located at a central region of the oral insert, where a posterior opening of the central port may be configured to channel fluid from the posterior or lingual region of the user's oral cavity to the anterior or facial region of the user's oral cavity. In some variations, the fluid effluence conduit may comprise a central port located at a central region of the oral insert, a first fluid cavity on a right side of the oral insert, and a second fluid cavity on a left side of the oral insert, where the first and second fluid cavities may be in fluid communication with the central port. An anterior region of the central port may extend from (e.g., protrude from) an anterior region of the oral insert, and the anterior extension region of the central port may have a tapered shape having one or more concave curves configured to combine fluid streams from the posterior or lingual region of the user's oral cavity and to channel the combined fluid streams to the anterior or facial region of the user's oral cavity. The first and second fluid cavities may each have a rear section having a cross-section with a constant perimeter, and a lofted section having a cross-section that increases in cross-sectional area toward the front region of the user's oral cavity. The first fluid cavity may have a first opening located in the back region of the user's oral cavity and the second fluid cavity may have a second opening located in the back region of the user's oral cavity, and the surfaces of the oral insert around perimeter edges of the first and second openings may comprise concave or convex contours. For example, the first opening and the second opening may have a tapered, elongated shape, where the elongated shape has a narrowing dimension as it extends laterally from the central region of the oral insert.

Additionally, a system for cleaning a user's oral cavity may comprise a handle comprising a fluid conduit in fluid communication with the fluid reservoir and the plurality of fluid nozzles of the oral insert. In some variations, the oral insert may have a U-shaped curve that corresponds with a curvature of the user's mandible and/or maxilla. The upper portion of the oral insert has a U-shaped curve that corresponds with a curvature of the user's maxilla and the lower portion of the oral insert has a U-shaped curve that corresponds with a curvature of the user's mandible. In some variations, the fluid nozzles may each be located within a recess along an outer surface of the oral insert. The recess may have a first end at an opening of the fluid nozzle and a second end at an opening along the outer surface of the oral insert. The recess may have a flare shape such that a cross-sectional area of the opening along the outer surface is greater than a cross-sectional area of the fluid nozzle opening. For example, a diameter of the opening along the outer surface may be greater than a diameter of the fluid nozzle opening. The first end of the flared-shaped recess may have a circular shape and the second end may have an ellipsoid shape. In some variations, the recess may have one or more concave contours, and/or have a circular or ellipsoid shape.

In some variations, an oral insert may comprise a plurality of fluid manifolds and a manifold connector, where the plurality of fluid manifolds may be in fluid communication with the plurality of fluid nozzles and each fluid manifold terminates at a manifold opening in the manifold connector. The handle may comprise an attachment mechanism configured to detachably retain the oral insert, and a fluid switcher assembly, where the fluid switcher assembly may comprise a motor and a rotor connected to the motor. The attachment mechanism may comprise a sealing ring configured to provide a water-tight interface between the manifold connector and the handle. The handle may further comprise an elastomeric vibration damper located between the fluid switcher assembly and the oral insert. The manifold openings of the manifold connector may be arranged in a circle and the rotor may be a rotatable flat plate having a first fluid aperture configured to sequentially align with each of the manifold openings at the manifold connector as the motor rotates the rotatable flat plate. The manifold openings of the manifold connector may be spaced apart from each other by an inter-opening spacing, and first the fluid aperture of the rotatable flat plate may have a width that is greater than the inter-opening spacing such that the first fluid aperture constantly maintains a fluid connection with at least one manifold opening. In some variations, the rotatable flat plate may have a second fluid aperture. the second fluid aperture may be radially opposite the first fluid aperture. The manifold openings of the manifold connector may be arranged in a circle and the fluid switcher assembly may further comprise a manifold block having a plurality of fluid channels that are configured to be aligned with the manifold openings in the manifold connector. The rotor may be a rotatable flat plate that has a fluid aperture configured to sequentially align with each of the fluid channels in the manifold block as the motor rotates the rotatable flat plate. Alternatively, the manifold openings of the manifold connector may be arranged in a circle, and the rotor may be a rotatable barrel having a first fluid aperture configured to sequentially align with each of the manifold openings in the manifold connector as the motor rotates the barrel. In some variations, the rotatable barrel may have a second fluid aperture. The second fluid aperture may be radially opposite the first fluid aperture. The manifold openings of the manifold connector may be spaced apart from each other by an inter-opening spacing, and the first fluid aperture of the rotatable barrel may have a width that is greater than the inter-opening spacing such that the first fluid aperture constantly maintains a fluid connection with at least one manifold opening.

In some variations, the oral insert may optionally comprise an elastomeric substrate disposed along outer surfaces of the upper portion and lower portions. The upper and lower portions may comprise a rigid substrate. The combination of the rigid upper and lower portions with the elastomeric substrate may comprise hybrid oral insert. The elastomeric substrate may comprise a plurality of apertures that align with the plurality of fluid nozzles. The elastomeric substrate may comprise textured surfaces that correspond with locations of buccal surfaces and lingual surfaces of the user's teeth. In some variations, the elastomeric substrate may comprise textured surfaces that may be optionally configured to vibrate and/or otherwise mechanically agitate and/or translate along, and/or be manually actuated to contact, the surface of the user's teeth. Vibration of the textured surfaces along the facial surfaces, lingual surfaces, occlusal surfaces, mesial surfaces, distal surfaces, and/or incisal edges of teeth may generate a brushing effect along those tooth surfaces. In some variations, the textured surfaces (which may include bristles) of the elastomeric substrate may be located at regions that correspond with locations of facial surfaces, lingual surfaces, occlusal surfaces, mesial surfaces, distal surfaces, and/or incisal edges of the user's teeth. Optionally, the handle may further comprise a vibration mechanism that causes vibratory motion of the elastomeric substrate. The handle may be attached to the oral insert such that vibratory motion from the vibration mechanism is transferred to the elastomeric substrate. The fluid conduit may comprise a fluid valve (e.g., a fluid regulator or switcher) configured to regulate fluid flow to the plurality of fluid nozzles, and the fluid conduit may be mechanically coupled to the vibration mechanism such that vibrations caused by fluid flow through the fluid conduit may combine with the vibratory motion from the vibration mechanism to cause vibration of the elastomeric substrate. The vibration mechanism may comprise an eccentric rotating mass vibration motor, and/or a linear resonant actuator, and/or an electromagnetic vibration motor.

In some variations, the upper and lower portions of the oral insert may comprise a material having a first durometer value on a hardness scale, and the elastomeric substrate may comprise a material having a second durometer on a hardness scale that is lower than the first durometer. For example, the first durometer value may be from about 60 Shore A to about 100 Shore D. The elastomeric substrate may comprise a biocompatible elastomer and the rigid substrate may comprise a biocompatible UV curable photopolymer.

In some variations, the elastomeric substrate may be releasably attached to the oral insert. For example, an oral insert may further comprise a first attachment structure on the upper portion and/or lower portion, and a second attachment structure on the elastomeric substrate, where the attachment structures are configured to interlock. The first attachment structure may comprise a groove and the second attachment structure may comprise a protrusion that is configured to be aligned with the groove such that the first and second attachment structures interlock. Alternatively or additionally, a releasable attachment mechanism may comprise an adhesive that bonds the elastomeric substrate with the oral insert. An oral insert may further comprise a first attachment structure on the upper and/or lower portions, and a second attachment structure on the elastomeric substrate, where the first and second attachment structures may comprise one or more magnetic materials.

Some variations of a system for oral care may comprise a fluid reservoir that comprises a fluid opening and a check valve on a bottom surface that is configured to provide fluid to the handle, and an elevated plate disposed over the fluid opening such that there is a gap between the elevated plate and the fluid opening. A width of the elevated plate may be greater than a width of the fluid opening. For example, the width of the elevated plate may be at least twice the width of the fluid opening.

In some variations, the oral insert may further comprise an elastomeric substrate. The combination of the oral insert with the elastomeric substrate may comprise hybrid oral insert. A hybrid oral insert may comprise a rigid substrate (e.g., any of the oral inserts described herein) and an elastomeric substrate that is attached to the rigid substrate. The elastomeric substrate may have a plurality of apertures that align with the plurality of fluid nozzles when the elastomeric substrate is attached to the rigid substrate. In some variations, the elastomeric substrate may comprise textured surfaces that may be optionally configured to vibrate and/or otherwise mechanically agitate and/or translate along, and/or be manually actuated to contact, the surface of the user's teeth. Vibration of the textured surfaces along the facial surfaces, lingual surfaces, occlusal surfaces, mesial surfaces, distal surfaces, and/or incisal edges of teeth may generate a brushing effect along those tooth surfaces. In some variations, the textured surfaces (which may include bristles) of the elastomeric substrate may be located at regions that correspond with locations of facial surfaces, lingual surfaces, occlusal surfaces, mesial surfaces, distal surfaces, and/or incisal edges of the user's teeth. An oral care system comprising a hybrid oral insert may combine two or more of the recommended oral care steps, i.e., combining the functions of flossing, brushing, and/or rinsing, in a single step (e.g., flossing and rinsing, flossing and brushing, flossing, brushing and rinsing, etc.). This may help users adopt a more thorough daily oral care routine. Optionally, the handle may comprise a vibration mechanism, a mechanism to induce motion or the ability to be manually agitated or activated. In some variations, the elastomeric substrate may be releasably attached to the rigid substrate. The elastomeric substrate may comprise a material with a first hardness value (i.e., durometer) and the rigid substrate may comprise a material with a second hardness value (i.e., durometer) that is higher (i.e., harder, more rigid) than the first hardness value. For example, the elastomeric substrate may be made of an elastomer and the rigid substrate may be made of a polymer such an UV curable photopolymer. The elastomeric substrate may be made of any suitable compliant, flexible, and/or conformable material, which may help improve overall comfort of the hybrid oral insert in the oral cavity by providing a softer and/or smoother interface between the rigid substrate and the user's teeth and gums. Another variation of a system for oral care comprises an oral insert comprising a rigid substrate (without an elastomeric substrate) that is sized and shaped according to a user's oral cavity and has a plurality of fluid nozzles. The fluid reservoir, solutions, vibration mechanisms, and any of the components and/or features described herein may be used with an oral insert with a rigid substrate and an elastomeric substrate (i.e., a hybrid oral insert) and/or an oral insert with a rigid substrate but not an elastomeric substrate.

One variation of a hybrid oral insert may comprise a rigid substrate that is sized and shaped in accordance with a user's oral cavity and an elastomeric substrate that is attached to the rigid substrate. The rigid substrate may comprise a plurality of fluid nozzles located at regions of the rigid substrate that correspond with interproximal spaces between the user's teeth (and/or optionally at concavities along other teeth surfaces, including but not limited to the occlusal surfaces, facial surfaces, and/or lingual surfaces) and the elastomeric substrate may comprise a plurality of apertures that align with the plurality of fluid nozzles when the elastomeric substrate is attached to the rigid substrate. The elastomeric substrate may further comprise textured surfaces that correspond with locations of facial surfaces, lingual surfaces, occlusal surfaces, mesial surfaces, distal surfaces, and/or incisal edges of the user's teeth. In some variations, the elastomeric substrate may be configured to vibrate and optionally, the textured surfaces may be located at regions of the elastomeric substrate that correspond with locations of occlusal surfaces and/or incisal edges of the user's teeth. The oral insert may further comprise a handle comprising a fluid conduit in communication with the plurality of fluid nozzles of the rigid substrate. In some variations, the handle may further comprise a vibration mechanism that causes vibratory motion of the elastomeric substrate. The handle may be attached to the rigid substrate such that the rigid substrate transfers vibratory motion from the vibration mechanism to the elastomeric substrate. Alternatively or additionally, the handle may be attached to the rigid substrate and the vibration mechanism is mechanically coupled to the elastomeric substrate. The fluid conduit may comprise a fluid valve configured to regulate fluid flow to the plurality of fluid nozzles, and the fluid conduit may be mechanically coupled to the vibration mechanism such that vibrations caused by fluid flow through the fluid conduit may combine with the vibratory motion from the vibration mechanism to cause vibration of the elastomeric substrate. The vibration mechanism may comprise an eccentric rotating mass vibration motor, and/or a linear resonant actuator, and/or an electromagnetic vibration motor.

In some variations, the rigid substrate may comprise a material having a first durometer value on a hardness scale, and the elastomeric substrate may comprise a material having a second durometer on a hardness scale that is lower than the first durometer. For example, the first durometer value may be from about 60 Shore A to about 100 Shore D. The elastomeric substrate may comprise a biocompatible elastomer and the rigid substrate may comprise a biocompatible UV curable photopolymer.

In some variations, the elastomeric substrate may be releasably attached to the rigid substrate. For example, an oral insert may further comprise a first attachment structure on the rigid substrate and a second attachment structure on the elastomeric substrate, where the attachment structures are configured to interlock. The first attachment structure may comprise a groove and the second attachment structure may comprise a protrusion that is configured to be aligned with the groove such that the first and second attachment structures interlock. Alternatively or additionally, a releasable attachment mechanism may comprise an adhesive that bonds the elastomeric substrate with the rigid substrate. An oral insert may further comprise a first attachment structure on the rigid substrate and a second attachment structure on the elastomeric substrate, where the first and second attachment structures may comprise one or more magnetic materials.

The textured surfaces of an elastomeric substrate may comprise a repetitive pattern of grooves and/or protrusions. The elastomeric substrate may comprise an upper surface configured to contact the user's upper teeth, a lower surface configured to contact the user's lower teeth, and a stand-off structure that spans between the upper surface and the lower surface. The stand-off structure may be a first stand-off structure and the elastomeric substrate may comprise a second stand-off structure that spans between the upper surface and the lower surface. The first stand-off structure may be located on a left side of the elastomeric substrate and the second stand-off structure may be located on a right side of the elastomeric substrate. In some variations, the first and second stand-off structures may be vertical pillars that span between the upper and lower surface of the elastomeric substrate and may be located such that they align with one or more of the user's molars, premolars, or canines.

The rigid substrate in some variations of a hybrid oral insert may comprise an upper portion having an upper trough configured to receive the user's upper teeth, a lower portion having a lower trough configured to receive the user's lower teeth, and fluid effluence conduit located between the upper portion and the lower portion of the rigid substrate and configured to channel fluid from a posterior or lingual region of the user's oral cavity to an anterior or facial region of the user's oral cavity. The fluid effluence conduit may comprise a central port located at a central region of the rigid substrate, where a posterior opening of the central port is configured to channel fluid from the posterior or lingual region of the user's oral cavity to the anterior or facial region of the user's oral cavity. Alternatively or additionally, the fluid effluence conduit may comprise a central port located at a central region of the rigid substrate, a first fluid cavity on a right side of the rigid substrate, and a second fluid cavity on a left side of the rigid substrate, where the first and second fluid cavities may be in fluid communication with the central port. An anterior region of the central port may extend from an anterior region of the rigid substrate, and the anterior extension of the central port may have a tapered shape that has one or more concave curves. The one or more concave curves may be configured to combine fluid streams from the posterior or lingual region of the user's oral cavity and to channel the combined fluid streams to the anterior or facial region of the user's oral cavity. The first and second fluid cavities may each have a rear section having a cross-section with a constant perimeter, and a lofted section having a cross-section that increases in cross-sectional area toward the front region of the user's oral cavity. The first fluid cavity may have a first opening located in the back region of the user's oral cavity and the second fluid cavity may have a second opening located in the back region of the user's oral cavity. The surfaces of the rigid substrate around perimeter edges of the first and second openings may comprise concave or convex contours. For example, the first opening and the second opening may have a tapered, elongated shape, where the elongated shape has a narrowing dimension as it extends laterally from the central region of the substrate.

In some variations, the rigid substrate may have a U-shaped curve that corresponds with a curvature of the user's mandibular and/or maxillary arch. The upper portion of the rigid substrate may have a U-shaped curve that corresponds with a curvature of the user's maxilla and the lower portion of the rigid substrate may have a U-shaped curve that corresponds with a curvature of the user's mandible.

One variation of a hybrid oral insert may comprise a rigid substrate that is sized and shaped in accordance with a user's oral cavity, an elastomeric substrate that is attached to the rigid substrate, and a vibration mechanism configured to cause vibratory motion of the elastomeric substrate. The elastomeric substrate may comprise textured surfaces that correspond with locations of buccal surfaces and lingual surfaces of the user's teeth. The elastomeric substrate may comprise an upper surface configured to contact the user's upper teeth, a lower surface configured to contact the user's lower teeth, and a stand-off structure that spans between the upper surface and the lower surface.

Any of the personalized oral care systems described herein may comprise a fluid reservoir, a customized oral insert comprising a fluid ingress port that is connectable to the fluid reservoir and in fluid communication with the fluid nozzles or openings, and a fluid effluence port, and a collection chamber configured to be attached to the fluid effluence conduit or port of the oral insert. The customized oral insert may further comprise an upper substrate configured to receive a user's upper teeth, a lower substrate configured to receive a user's lower teeth, an arrangement of fluid nozzles or openings located in the upper and lower substrates, and the fluid ingress port may be in communication with the fluid nozzles or openings. The oral care system may further comprise a microbiome collection fluid within the fluid reservoir. The microbiome collection fluid may comprise a saline solution. Optionally, a sample stabilization fluid within the collection container, wherein the sample stabilization fluid comprises a liquid suspension, such as a preservative solution. The collection chamber is configured to attach to the oral insert by snap-lock and/or any suitable releasable attachment mechanism. The collection chamber may comprise an opening and a fluid-tight cover removably disposed over the opening.

One variation of a method for collecting an oral microbiome sample may comprise inserting an oral insert into a user's oral cavity, the oral insert comprising one or more fluid nozzles or openings in fluid communication with a fluid reservoir containing a microbiome collection fluid, and a fluid effluence conduit or port, delivering the microbiome collection fluid from the fluid reservoir to the oral insert into the user's oral cavity at a fluid pressure about 40 psi or more, and collecting an oral microbiome sample by accumulating a volume of the microbiome collection fluid using a collection chamber coupled to the fluid effluence conduit or port. The fluid pressure may be from about 40 psi to about 200 psi. The one or more fluid nozzles or openings of the oral insert may be arranged at positions that correspond with sub-gingival regions and/or interproximal regions of the user's oral cavity such that fluid jets from the fluid openings are directed toward the sub-gingival regions. Delivering the microbiome collection fluid into the user's oral cavity may comprise directing the microbiome collection fluid through the one or more fluid nozzles or openings to the sub-gingival regions and/or interproximal regions of the user's oral cavity. The microbiome collection fluid may comprise a saline solution. The collection chamber may contain a sample stabilization fluid. Delivering the microbiome collection fluid may comprise pumping the microbiome collection fluid to the oral insert for a specified duration. The specified duration may be from about 1 second to about 10 seconds. Optionally, a method for collecting a microbiome sample may comprise priming the oral insert by pumping the microbiome collection fluid through the oral insert before inserting the oral insert into the user's oral cavity. Priming the oral insert may comprise pumping the microbiome collection fluid through the oral insert for a specified duration from about 1 second to about 20 seconds. A method may comprise coupling the collection chamber to the fluid effluence port after priming the oral insert. In some variations, the method may comprise sealing the collection chamber with a fluid-tight cover after collecting the oral microbiome sample.

Also disclosed herein is a dental shim device for oral scanning. A dental shim device may comprise first and second alignment portions that each have an upper surface and a lower surface that position and maintain upper and lower teeth in a selected position, a bridge portion having a length that spans between the first and second alignment portions, and one or more orientation registration markers on facial surfaces of the first and second alignment portions and/or the bridge portion. The upper surface and lower surface of the first and second alignment portions may contact the incisal and/or occlusal surfaces of the upper and lower teeth. In some variations, the upper surface may have a first surface area and a first width, and the lower surface may have a second surface area and a second width, and the first width may be greater than the second width. Alternatively or additionally, the first surface area may be greater than the second surface area. The first and second alignment portions may each comprise a sidewall sized to retain a fixed vertical offset between the upper and lower teeth, for example, the fixed vertical offset may be from about 5 mm to about 20 mm. The sidewall may comprise a rigid material and/or the upper surface and the lower surface may comprise a compliant material configured to be conformable to contours of the upper and lower teeth. The compliant material may be moldable and/or may comprise one or more of a rubber-like material, dental wax, dental impression material, gingival barrier material, and foam. In some variations, the compliant material may be curable from an elastic state to a rigid state, for example, the compliant material may be curable using one or more of chemical curing, thermal curing, room-temperature curing, and light curing. The length of the bridge portion may have a curve that approximates a curve of a dental arch, and/or the curved length may be configured to align with the curve or width of the dental arch. The curved length of the bridge portion may further comprise a convex facial surface. The convex facial surface may be tapered such that an upper portion of the facial surface protrudes forward and tapers inward toward a lower portion of the facial surface. The bridge portion may comprise a flexible material. A first end of the curved length may be attached to the first alignment portion and a second end of the bridge length may be attached to the second alignment portion. The upper surface and lower surface of the first and second alignment portions may contact the lingual and/or facial surfaces of the upper and lower teeth. The selected position of the upper and lower teeth may be a clamped (e.g., jaw closed) position. The length of the bridge portion may comprise one or more straight segments. In some variations, the length of the bridge portion may comprise a placement tab. The first and second alignment portions, the bridge portion, and/or the orientation registration markers may be made of a non-reflective, non-transparent material. For example, the first and second alignment portions, the bridge portion, and the orientation registration markers may be made of an opaque material.

In some variations, the orientation registration markers may comprise a vertical midline indicator located midway along the length of the bridge portion. The orientation registration markers may form an asymmetric arrangement. The one or more orientation registration markers may be shaped and positioned such that the position of individual upper and lower teeth relative to the one or more orientation registration markers is unique. The one or more orientation registration markers may be arranged and shaped such that an alignment between an upper arch and lower arch can be determined by registering relative positions of the upper and lower teeth to the one or more orientation registration markers. The orientation registration markers may comprise one or more 3-D structures extending from the facial surfaces of the first and second alignment portions and/or the bridge portion. Alternatively or additionally, the orientation registration markers may comprise one or more visual indicia located on the facial surfaces of the first and second alignment portions and/or the bridge portion. In some variations, the one or more visual indicia may include cross-hatch patterns and/or raised and/or depressed regions that are shaped as semi-circles and/or blocks and/or notches at known locations relative to each other. Alternatively or additionally, the one or more visual indicia may include non-uniform cross-hatch patterns.

Optionally, an oral shim device may comprise a stabilization structure configured to contact the first and second alignment portions and configured to engage with anatomical structures outside of a wearer's oral cavity. The stabilization structure may be configured to engage with one or more of a wearer's chin, forehead, and cheeks.

A dental shim device for obtaining oral cavity data may comprise an upper tray comprising a surface that contacts upper teeth of an upper dental arch and an upper handle that extends from a curved portion of the upper tray, a lower tray comprising a surface that contact lower teeth of a lower dental arch and a lower handle that extends from a curved portion of the lower tray, and an adjustable mating joint that engages the upper tray and lower tray, where the adjustable mating joint may be configured to adjust an offset and angle between the upper tray and the lower tray. the adjustable mating joint comprises a concave groove on the upper tray and a ball on the lower tray opposite the concave groove, where the ball is movable within the concave groove to adjust the offset and angle between the upper tray and the lower tray. The concave groove may comprise a concave cavity. Alternatively or additionally, the concave groove may comprise curves that are configured to engage the ball at a position within the concave groove to retain the offset and angle. Optionally, the teeth-contacting surface of the upper tray may comprise a compliant material configured to be conformable to contours of the upper teeth and the teeth-contacting surface of the lower tray may comprise a compliant material configured to be conformable to contours of the lower teeth.

BRIEF DESCRIPTION OF THE DRAWINGS

FIGS. 3B-3D depict a cross-sectional view, a front view, and a perspective view, respectively, of one variation of a three-lobed fluid nozzle or fluid opening.

FIGS. 3E-3F depict a front view and a perspective view, respectively, of one variation of a three-lobed fluid nozzle or fluid opening.

FIG. 8J is a flowchart depicting one variation of a method for acquiring imaging data of the contours, locations, orientation and/or alignment of the user's oral anatomy, using a shim device.

FIG. 10A depicts a front view of a shim device. FIG. 10B depicts a side view of the shim device of FIG. 10A. FIG. 10C depicts a top view of the shim device of FIG. 10A. FIG. 10D depicts a rear/back view of the shim device of FIG. 10A.

FIGS. 11D-11E depict perspective views of the female and male portions, respectively, of the sliding latch release attachment mechanism. FIG. 11F depicts a front view of the female portion of the sliding latch release attachment mechanism.

FIGS. 14F-14G depict schematics of variations of a rotary valve that may be used with a fluid switcher assembly.

FIGS. 15A-15B depict variations of radial seals.

FIGS. 16A-16B depict variations of face seals.

DETAILED DESCRIPTION

Figure 1A:
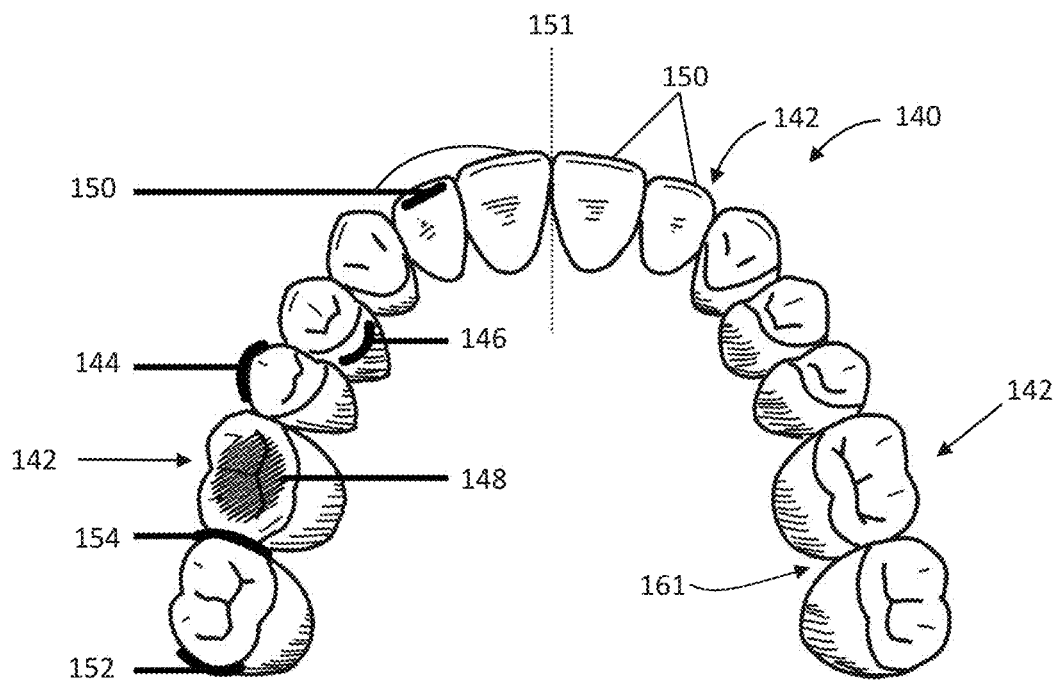
FIG. 1A depicts a top view of the oral anatomy of a user.

One variation of a system for oral care may comprise an oral insert (or mouthpiece) having an upper portion and a lower portion that are sized and shaped according to a user's oral cavity, a plurality of fluid nozzles directed toward the interproximal spaces between the user's teeth, and an effluence conduit located between the upper portion and the lower portion and configured to channel fluid circulating within the user's mouth to an anterior or facial region of the user's oral cavity. The oral insert may also comprise one or more fluid manifolds in fluid connection with the fluid nozzles, and the fluid manifolds may extend from the fluid nozzles to a manifold connector at one end of the oral insert. The manifold connector may be configured to releasably attach to a handle. The upper and lower portions of the oral insert may each be tray, band, and/or carrier that is sized and shaped according to a user's upper and lower teeth, respectively, and in some variations, may be made of a rigid material. For example, the upper and lower portions may comprise a teeth-receiving tray that may be curved to approximate the curvature of a user's mandibular and/or maxillary arch. The oral insert may be made of a rigid material to help withstand the elevated pressure levels of the fluid supplied by the system pump.

In some variations, an oral insert may be made of a rigid material and may comprise an arrangement of a plurality of fluid nozzles with openings positioned to provide a customized fluid flow over a user's teeth. In some variations, the fluid nozzles may be located in a recess (e.g., indentation, cavity, concave contour, etc.) along the outer surface (i.e., teeth-facing and/or gingiva-facing surfaces) of the upper and lower portions. The fluid nozzle opening may be located at the inner-most portion of the recess, and the recess may have a shape that approximates the spray of the fluid jet from the fluid nozzle opening. For example, the recess may be flared, and/or may have a tapered shape, where the fluid nozzle opening is located at the narrowest portion of the recess. The locations of the fluid nozzles on the oral insert may be determined based on dental scans of a user's teeth, and as such, each oral insert is customized to accommodate a user's oral geometry. For example, fluid nozzles of the oral insert may be located on regions of the upper and lower portions that correspond with the interproximal spaces between teeth. Alternatively or additionally, fluid nozzles may be located at a certain distance from the interproximal spaces, but may be angled toward the interproximal spaces so that the fluid jet may be applied to the interproximal spaces. Fluid jets from the openings of the plurality of fluid nozzles may clean multiple teeth simultaneously and the location and geometry of the fluid nozzles with respect to specific and unique structures of the user's mouth may help facilitate expeditious and/or effective cleaning of teeth surfaces. In some variations, the oral insert may comprise a custom arrangement of a plurality of fluid nozzles where the opening of each of the nozzles is positioned to target a specific dental feature or structure, as well as any oral and/or dental devices or implants, for example, permanent and removable dental restorations/prosthetics, orthodontic appliances, etc. (e.g. crowns, bridges, implants, braces, retainers, dentures, and the like).

The one or more effluence conduits may be configured to channel the pressurized fluid circulating within the user's oral cavity (e.g., posterior and/or lingual regions) towards an anterior and/or facial region of the oral cavity to exit the user's mouth. In some variations, the effluence conduit may comprise a central channel or port that extends from a posterior portion of the oral insert to an anterior portion of the oral insert. Optionally, there may be one or more side fluid cavities that connect with the central channel to help facilitate fluid flow from the left and right sides of the oral cavity to the central channel. The dimensions of an effluence conduit may be selected such that the overall dimensions of the oral insert fit comfortably within a user's mouth, while also providing rapid egress of pressurized fluid from the user's mouth. The contours of the surface of the oral insert that define the boundaries of the effluence conduit may be smoothed and/or filleted to promote efficient fluid dynamic flow from within the user's oral cavity toward the mouth opening.

Optionally, an elastomeric substrate may be included with any of the oral inserts or mouthpiece described herein. The combination of an oral insert (which may comprise a rigid substrate) and an elastomeric substrate may be referred to as a hybrid oral insert. Some variations of a system for oral care may comprise a hybrid oral insert. A hybrid oral insert comprises a rigid substrate having a plurality of recessed fluid nozzles, one or more fluid manifolds, a manifold connector, and one or more effluence conduits (e.g., similar to any of the oral inserts described herein), and an elastomeric substrate that is attached to the rigid substrate. A hybrid oral insert may comprise an elastomeric substrate having a plurality of apertures that align with the plurality of fluid nozzles when the elastomeric substrate is attached to the rigid substrate. The elastomeric substrate may have textured surfaces (as described above and herein) or may not have textured surfaces. In one variation, the elastomeric substrate may comprise textured surfaces and/or protruding structures at regions of the elastomeric substrate that correspond with the buccal and/or lingual and/or occlusal and/or incisal edges or surfaces and/or mesial and/or distal surfaces of the teeth. The optional textured surfaces and/or protrusions on the elastomeric substrate may be configured to vibrate (e.g., resonantly or non-resonantly) and/or agitate. In some variations, the oral insert may be coupled to a handle, and the handle may comprise a vibration mechanism that causes any mechanical motion (e.g., vibration, agitation, translation, oscillations, etc.) of the elastomeric substrate and an optional battery that powers the vibration mechanism. One example of a vibration mechanism may comprise an electromagnet and a magnetic mass that is mechanically coupled to the elastomeric substrate. Changing the polarity of the electromagnet may cause the magnetic mass to move or vibrate, thereby causing a corresponding agitation or vibration in the elastomeric substrate. Alternatively or additionally, a vibration mechanism may comprise an eccentric rotating mass (ERM) rotating mass motor and/or a linear resonant actuator (LRA). Alternatively or additionally, a vibration mechanism may comprise dual counter-rotating ERMs where the positional phase relationship between the motions of each motor is controlled so as to create controllable directional vibration. Alternatively or additionally, the vibration actuator may be driven electrically, manually, and/or by the flow of the fluid (e.g., water. air, etc.) through the system (e.g., hydraulically, pneumatically).

In some variations, the elastomeric substrate may be mechanically coupled to any of the vibration mechanisms described herein, while in other variations, the elastomeric substrate may not be configured to vibrate. For example, one variation of a hybrid oral insert may comprise an elastomeric substrate that has textured surfaces and is configured to vibrate, while in another variation, a hybrid oral insert may comprise an elastomeric substrate that does not have textured surfaces and is not configured to vibrate. In these variations, the hybrid oral insert may comprise a rigid substrate comprising fluid nozzles or alternatively, may comprise a rigid substrate without any fluid nozzles. An oral system may comprise an oral insert having a rigid substrate as described herein, but without an elastomeric substrate.

A personalized oral care system may also comprise one or more valves, pumps and/or manifolds that regulate the fluid flow between the fluid reservoir and the oral insert. For example, an oral care system may also comprise a base station comprising a controller that controls and/or coordinates fluid flow through the fluid nozzles (e.g., fluid jets that emerge through the openings of the fluid nozzles). The base system control may optionally control vibration of the elastomeric or conformable substrate of a hybrid oral insert. The base station may also comprise a fluid pump in communication with the fluid reservoir and a handle dock. The handle may comprise a fluid regulator in fluid communication with the fluid pump, and the fluid regulator may be configured to deliver and/or distribute pressurized fluid to the fluid manifolds in the oral insert. For example, the fluid regulator may comprise a fluid switcher assembly having a motor and a rotor that distributes fluid to the one or more fluid manifolds of the oral insert, which in turn supplies fluid to the nozzles. The oral insert may comprise a manifold connector that is configured to releasably attach to the handle such that the manifold connector is in fluid connection with the fluid switcher assembly. The handle may comprise an attachment mechanism having one or more seals configured to provide water-tight engagement with the manifold connector of the oral insert. In some variations, the handle fluid switcher assembly may comprise a manifold block having a plurality of fluid channels that are configured to be aligned with the manifold openings in the manifold connector. Optionally, the base station may comprise a fluid reservoir dock. In some variations, the handle dock may also be a handle charging dock (e.g., by inductive charging) that stores energy in the optional handle battery that may be used for activating the vibration mechanism. Alternatively or additionally, power to the vibration mechanism may be provided by an electrical connection (e.g., a wire) between a power source on the base station and the vibration actuator or actuators located in the handle. Alternatively or additionally, mechanical motion of the elastomeric and/or rigid insert may be manually-actuated.

The personalized oral care systems are described in the context of cleaning the teeth and/or disrupting biofilms that may form on or in between the teeth or restorations or around dental appliances, and within the gingival sulcus, but it should be understood that the systems described herein may also be used for the application of medicaments or prophylactics to the oral cavity, teeth whitening, oral disinfection, antiseptic fluids, cleaning fluids, etc. The fluid in the fluid reservoir may contain one or more of antiseptic fluids, antibiotic fluids, cleaning fluids, surfactants, pH balancing, anti-microbial or anti-fungal medicaments, fluoridated fluids, water, saline, and/or compounds that alleviate halitosis.

A personalized oral care system may comprise a collection chamber that is configured to be attached to a fluid output port (e.g., a fluid effluence conduit or port) of the oral insert. When attached to the fluid effluence port, a portion or sample of the fluid (e.g., a microbiome collection fluid) that has been circulated in the user's oral cavity may be captured by the collection chamber. The microbiome collection fluid sample in the collection chamber may be analyzed to determine the contents of the user's oral microbiome. The microbiome collection fluid may comprise a saline solution. The collection chamber may contain a fluid sample stabilization compound, which may help preserve (e.g., prevent or reduce the degradation of) the contents of the oral microbiome. Optionally, the fluid sample stabilization compound may react with contents of the oral microbiome to facilitate detection of those contents during testing/analysis. For example, the microbiome collection compound may comprise one or more detection markers having binding sites that may specifically react with certain contents of a microbiome, and the positive identification of the detection marker would indicate the presence of certain components of the microbiome. The detection markers may comprise optical markers such as fluorescent tags. In some variations, the sample stabilization compound may comprise a liquid suspension and/or a preservative solution. The collection container may be attached to the oral insert using any suitable mechanical engagement, for example, screw-fit, snap-fit, friction-fit, and/or magnetic engagement. Optionally, the collection chamber may comprise a fluid inlet port that receives the fluid exiting the user's oral cavity via the effluence port, and the fluid inlet port may comprise a one-way valve configured to permit fluid flow into the chamber while preventing fluid flow out of the chamber. The collection chamber may comprise an opening and a fluid-tight cover that is configured to be disposed over the opening (which may be separate from the fluid inlet port) after the collection fluid sample is acquired.

The microbiome collection fluid may be delivered to the user's oral cavity via the fluid openings or nozzles of the oral insert at an elevated fluid pressure, using any of the devices and methods described herein. For example, the pump mechanism of the fluid reservoir may provide fluid to the oral insert at a pressure of about 40 psi or more, from about 40 psi to about 200 psi, etc. The fluid pressure exiting each fluid nozzle and impinging on a tooth surface or structure may be from about 10 psi to about 150 psi. In some variations, the microbiome collection fluid may be located within the fluid reservoir of a personalized oral care system and pressurized for delivery to the oral insert. Introducing the microbiome collection fluid at an elevated fluid pressure (i.e., any pressure that exceeds that of oral rinsing or swishing) and/or directing the collection fluid at specific regions of the user's oral cavity may facilitate the collection of the oral microbiome in those regions. For example, an oral insert with fluid nozzles that direct the collection fluid to the interproximal spaces between the teeth and/or subgingival regions at an elevated pressure may facilitate more efficient collection of a microbiome sample from those spaces than oral rinsing (e.g., the user swishing the collection fluid in their mouth). The fluid jets from the oral insert nozzles may disrupt and/or remove biofilm in hard-to-reach areas (e.g., areas that are typically inaccessible by oral rinsing or swishing, such as interproximal spaces, subgingival regions, crevices, concavities, etc.), which may allow for microbiome contents in those areas to be collected and analyzed. For example, fluid jets at elevated pressures (e.g., about 40 psi or more) may dislodge bacteria that may be located in hard-to-reach areas, and sweep the bacteria with the collection fluid toward the effluence port and into the collection chamber. This may provide a more accurate and/or comprehensive measurement of a user's oral microbiome as compared to oral rinsing or swishing. A sample of a user's oral microbiome may be analyzed for bacterial content, and/or fungal content, and/or viral content, and/or protein content (including nucleic acids such as DNA or RNA), pH levels, and such data may be used to calculate a metric of the user's oral health. One example of an oral health metric may include a gum health score that represents the inflammation state/level of a user's gums. Analysis of the collected microbiome sample by a processor may output the type and/or quantity of bacterial species in the oral cavity, ratio of commensal to pathogenic bacteria, whether high-risk and/or low-risk pathogens are present, correlations between pathogen type and systemic disease for informative purposes, etc.

A personalized oral care system may have an oral cleaning mode and a sample collection mode. In the oral cleaning mode, the system may be configured to provide a continuous flow of pressurized fluid (e.g., water, antiseptic, or any of the fluids described herein) from the reservoir to the oral insert and into the user's oral cavity. In the sample collection mode, the system may be configured to provide a burst of pressurized microbiome collection fluid from the reservoir to the oral insert. The burst duration may last from about 1 second to about 20 seconds, e.g., from about 1 second to about 10 seconds, from about 5 seconds to about 15 seconds, etc. The mode may be set by pressing a mode button (or turning a dial or switch) on the base station to the desired mode, which may then adjust the operation of the one or more valves and/or pumps that regulate the fluid flow between the reservoir and the oral insert. Optionally, an oral care system may have a microbiome collection priming mode, where the microbiome collection fluid is pumped through the oral insert (e.g., before placing the oral insert into the user's mouth) before the collection of an oral microbiome sample. The microbiome collection fluid that is pumped through the oral insert during the priming mode may be discarded and may help clear any residual fluids and/or biological substances that may contaminate or dilute the oral microbiome sample. In priming mode, pressurized fluid may be pumped into the oral insert for a duration that may be the same as, or different from, the duration that pressurized fluid is pumped into the oral insert in the sample collection mode, and the duration may be pre-programmed or selected by the user. For example, pressurized fluid may be pumped into the oral insert from about 1 second to about 60 seconds during the priming mode. After priming is complete, the collection chamber may be attached to the effluence port of the oral insert in preparation for microbiome sample collection.

Also disclosed herein are dental shim devices that may be used to position a user's teeth during the acquisition of imaging data pertaining to the user's oral geometry and the acquisition of data pertaining to the alignment between the upper and lower teeth (e.g., positions of the upper arch and the lower arch relative to each other). The oral geometry and alignment data may be used by a processor to generate a customized oral insert (e.g., a hybrid oral insert with a rigid substrate and an elastomeric substrate, or an oral insert with only a rigid substrate) that has fluid nozzles positioned at specific dental structures to facilitate cleaning efficiency, while providing a measure of user comfort when the oral insert is placed in the user's oral cavity (i.e., when the user clamps down over the oral insert). In some variations, the processor may generate a model of the user's oral cavity using the acquired oral geometry and alignment data, and generate an oral insert having fluid nozzles positioned at desired locations based on the model of the user's oral cavity. Imaging data that identifies the location of interproximal spaces between teeth and/or the gingival margins and/or gingiva, buccal pits, fissures, and the like may be used by a processor to generate an oral insert with fluid nozzles at locations that correspond with those dental structures. A dental shim device may comprise first and second alignment portions that each have an upper surface and a lower surface that position and maintain upper and lower teeth in a selected position, a bridge portion having a length that spans between the first and second alignment portions, and one or more orientation registration markers on facial surfaces of the first and second alignment portions and the bridge portion. The orientation registration markers may have an asymmetric arrangement and/or may be shaped and positioned such that the position of individual upper and lower teeth relative to the one or more orientation registration markers is unique. Registration of the relative positions of the upper and lower teeth to the one or more orientation registration markers may be used by a processor to determine the alignment between the upper arch and lower arch. In some variations, the orientation registration markers may comprise one or more 3-D structures extending from the facial surfaces of the first and second alignment portions and the bridge portion and/or one or more visual indicia located on the facial surfaces of the first and second alignment portions and the bridge portion. Examples of visual indicia may include cross-hatch patterns, and/or raised and/or depressed regions that are shaped as semi-circles and/or blocks and/or notches, and/or vertical grooves or protrusions at known locations relative to each other.

The upper surface and lower surface of the first and second alignment portions may contact the incisal and/or occlusal surfaces of the upper and lower teeth when inserted into the user's oral cavity. The first and second alignment portions may each comprise a sidewall sized to retain a fixed vertical offset between the upper and lower teeth. The upper surface and the lower surface may comprise a compliant material configured to be conformable to contours of the upper and lower teeth. In some variations, the compliant material may comprise one or more of a rubber-like material, dental wax, dental impression material, gingival barrier material, and foam. The length of the bridge portion may have a curve that approximates a curve of a dental arch (e.g., either upper arch or the lower arch, average curvature of the upper and lower arches, a composite curvature of the upper and lower arches, etc.) and may comprise a flexible material. Optionally, a dental shim device may comprise a stabilization structure configured to contact the first and second alignment portions and to engage with anatomical structures outside of a wearer's oral cavity, e.g., the wearer's chin, forehead, and/or cheeks. Optionally, the shim may comprise one or more handles or placement tabs that may be coupled to the bridge portion and/or one or both of the alignment portions to facilitate insertion of the shim into the user's oral cavity.

Another variation of a dental shim device that may be used to position a user's teeth during the acquisition of oral geometry and/or alignment imaging data may comprise an upper tray having a surface that contacts upper teeth of an upper dental arch and an upper handle, a lower tray having a surface that contact lower teeth of a lower dental arch and a lower handle, where the upper and lower handles may be configured to allow the user to easily grasp the shim device to insert, position, and remove the shim device. In one variation, the upper tray and lower tray may be fixed relative to each other with a predetermined vertical offset. Alternatively, some variations may comprise an adjustable mating joint that engages the upper tray and lower tray, where the adjustable mating joint may be configured to adjust an offset between the upper tray and the lower tray. The adjustable mating joint may comprise a concave groove on the upper tray and a ball on the lower tray opposite the concave groove. The ball may be movable within the concave groove to adjust the offset and angle between the upper and lower trays. In some variations, the concave groove may comprise one or more curves (e.g., a cone-shaped or tapered curve) configured to engage the ball at a position within the concave groove to retain the offset and angle. The teeth-contacting surface of the upper tray may comprise a compliant material configured to conform to contours of the upper teeth, and the teeth-contacting surface of the lower tray may comprise a compliant material configured to conform to contours of the lower teeth. Examples of compliant materials may include one or more of a rubber-like material, dental wax, dental impression material, gingival barrier material, and foam. The tray(s) of the shim device may be inserted into a user's oral cavity and the user may be asked to close their jaw and clamp the trays together. When clamped, the distance between markers on the upper and lower handles may be measured, and the upper and lower teeth may leave impressions in the compliant material(s). After the trays are removed from the user's mouth, an external scanner may be used to acquire imaging data of the teeth-contacting surfaces of upper and lower trays, where the compliant material may contain impressions of the upper and lower teeth. Images of the teeth impressions of the compliant material, along with the offset and angle between the upper and lower trays, as well as the measured distance between the upper and lower handles, may be used to generate a model of the user's oral cavity that include the contours of their teeth, gingival margins, and the alignment between the teeth of the upper and lower arches. A kit may comprise one or more dental trays and/or dental shims to acquire teeth impressions of different regions in the user's oral cavity. For example, a kit may comprise a set of one or more dental trays containing a compliant material that may be used to acquire full impressions of the upper teeth and lower teeth, and a set of one or more dental shims that may be used to acquire impressions of the upper and lower anterior teeth (e.g., anteriors and/or premolars) at a specified offset. The multiple scans of the impressions in the dental trays and/or dental shims may be combined to generate a model of the user's oral cavity. A processor may use this model to generate a customized oral insert (e.g., with a customized arrangement of fluid nozzles) for any of the oral care systems described herein.

In some variations, the acquired imaging data of the user's oral geometry and alignment between the upper and lower arches may be photographic data and/or video data. Imaging data may be acquired using internal scanning methods (e.g., using an intraoral scanner) and/or external scanning methods.

Figure 1B:
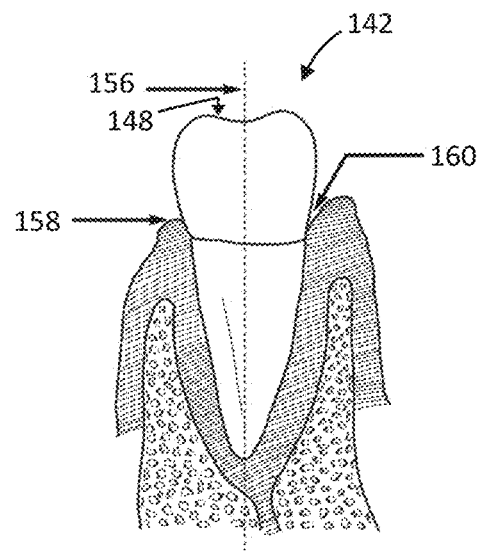
FIG. 1B depicts a partial cutaway side view of a tooth and surrounding gingiva.
Figure 1C:
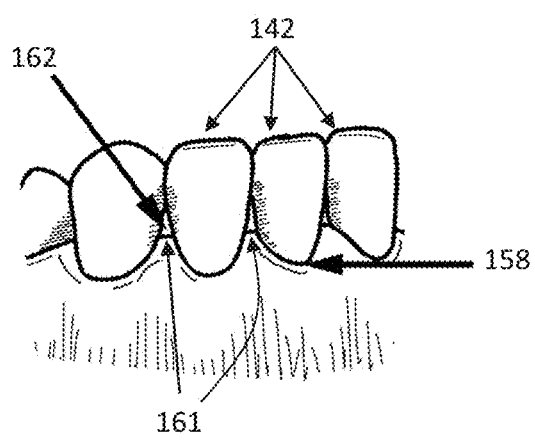
FIG. 1C depicts a side view of teeth and surrounding gingiva.

FIGS. 1A-1C are schematic depictions of oral anatomy and dental structures, illustrating the regions of the oral cavity described herein. FIG. 1A depicts a top view of a set of teeth (140) of the mandible or lower jaw (though similar terminology may be used to refer to the teeth and structures of the maxilla or upper jaw) Each tooth (142) may have a facial surface (144) which is the region of the tooth that contacts the cheeks or lips and a lingual surface (146) which is the region of the tooth that contacts (or is nearest to) the tongue. Facial surfaces may be, for example, the buccal surfaces of the posterior teeth and the labial surfaces of the anterior teeth. Lingual surfaces may also be referred to as the palatal surfaces for maxillary teeth. Posterior teeth may have an occlusal surface (148) and the anterior teeth may have an incisal edge or surface (150). The occlusal (or incisal) surface is the region of the tooth that aids in chewing, and/or faces across from the occlusal (or incisal) surface of the opposing tooth. The surface of a tooth facing away from the arch midline may be referred to as the distal surface (152) while the surface of a tooth facing toward the arch midline (151) may be referred to as the mesial surface (154). FIG. 1B depicts a side view of a single tooth (142), which may have a long axis (156) that extends along the longest dimension of the tooth (142) and/or is substantially perpendicular to the occlusal surface (148) or incisal edge (150) of the tooth. The edge or boundary of the gums (e.g., gingiva, gingival tissue) along the surfaces of the teeth or closest to the occlusal surfaces or incisal edge of the teeth may be referred to as the gingival margin (158). The gingival margin (158) may have one or more curves along the bottom of each tooth, and the radius of curvature and length of the gingival margin for each tooth may vary. A space or region (160) between the gingiva and the surfaces of the tooth may be referred to as a gingival sulcus (160). Interdental gingiva (161) may be the gum tissue located between two adjacent teeth. FIG. 1C depicts a side view of a plurality of teeth (142). The space or gap between each tooth (142) may be referred to as the interproximal space or gap (162), and may be defined by the mesial surface of one tooth and the distal surface of the adjacent tooth, or the mesial surfaces of two teeth, in the case of central incisor teeth. The left side of a user's oral cavity may be the region of the oral cavity that is to the left of the interproximal space between the two central incisors (e.g., to the left of the arch midline), and the right side of a user's oral cavity may be the region of the oral cavity that is to the right of the interproximal space between the two central incisors (e.g., to the right of the arch midline). While the fluid nozzles of the oral inserts disclosed herein are described as being positioned and/or directed at the interproximal spaces between a user's teeth, it should be understood that any of the fluid nozzles may be positioned and/or directed toward any anatomical region or structure of a user's oral cavity, including, but not limited to, the gingival margins, interdental gingiva, and/or facial, occlusal, lingual surfaces of the teeth.

System Overview

Figure 1D:
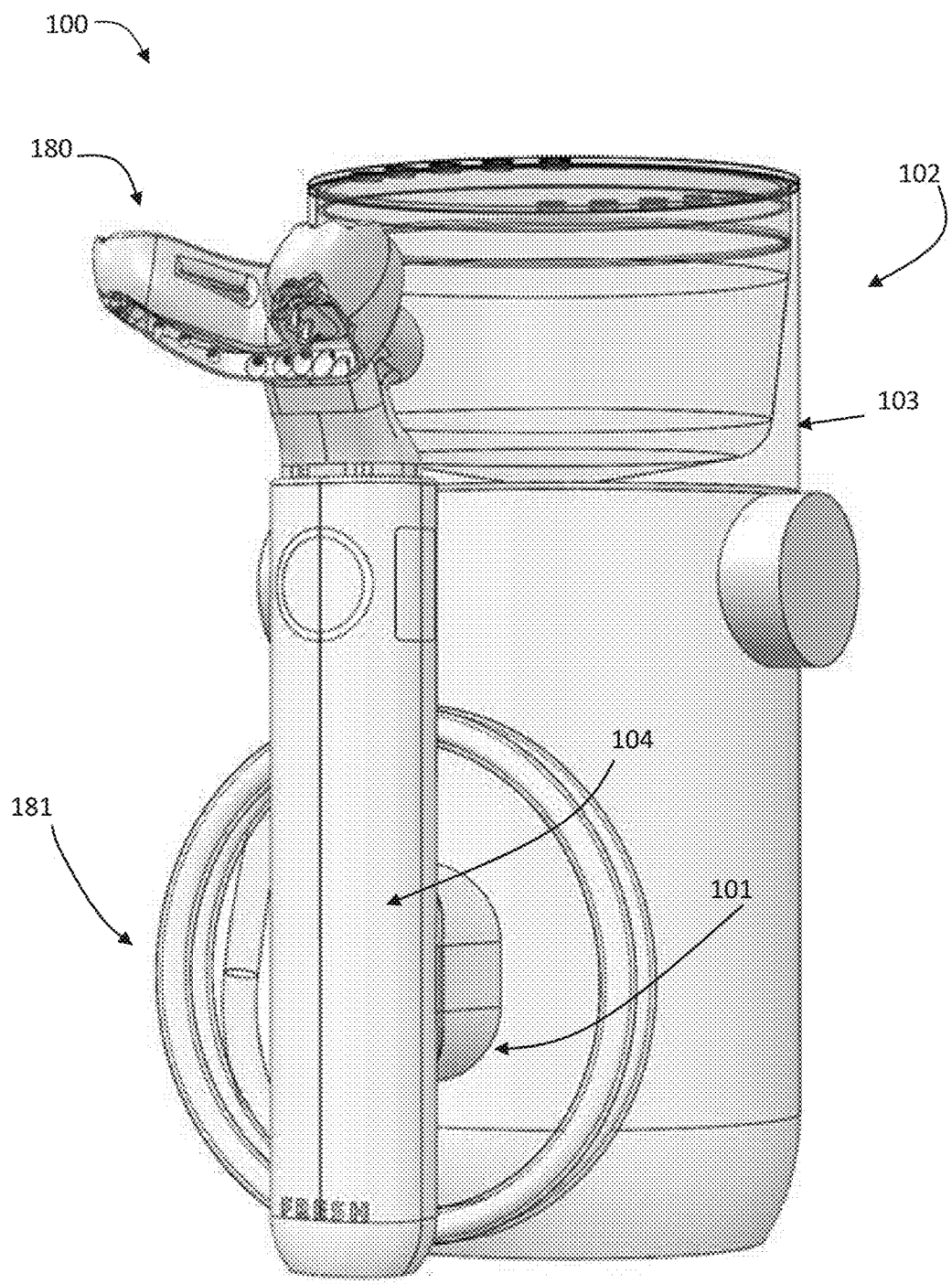
FIG. 1D depicts a perspective view of one variation of a personalized oral care system.

One variation of a system for personalized oral care is depicted in FIG. 1D. The system (100) may comprise a base station (102) having a fluid reservoir (103), a handle (104), and a customized oral insert or mouthpiece (180) coupled to the handle (104). The oral insert may comprise an upper portion and a lower portion that are sized and shaped according to a user's oral cavity, a plurality of fluid nozzles at locations in the upper and lower portions that are directed toward the interproximal spaces between the user's teeth, and an effluence conduit located between the upper portion and the lower portion and configured to channel fluid circulating within the user's mouth to an anterior or facial region of the user's oral cavity. One or more fluid conduits or tubes (181) may connect the fluid reservoir (103) to the handle (104) which has a fluid regulator that distributes the fluid to the oral insert (180). The system (100) may optionally comprise a charging station (101) for the handle (104).

The handle (104) may comprise one or more control buttons (e.g., a start/stop button, a fluid flow adjustment dial, vibration adjustment and/or activation dial), as may be desirable, which may be positioned variously on the handle for ergonomic or efficient use. Alternatively or additionally, one or more control buttons may be located on the base station (102). For example, a system may comprise one or more control buttons on the base, and no control buttons on the handle. In other variations, a personalized oral care system may not have a handle at all, and may alternatively comprise one or more fluid conduits or tubes that directly connect the fluid from the base station reservoir to the oral insert. The fluid retained in the fluid reservoir of a customized oral care system may be water, saline, a mouth wash or rinse, (e.g., containing fluoride and/or germicidal or other cleaning and/or teeth protective fluids), and/or any other desirable additive, such as those described above. The oral insert may comprise a plurality of fluid nozzles having fluid openings that are arranged in accordance with the unique geometry of the user's oral cavity, gingival geometry, and dental structures (and any oral and/or dental devices or implants). Examples of oral and/or dental devices or implants may include, but are not limited to, permanent and removable dental restorations/prosthetics, orthodontic appliances, and etc. (e.g., crowns, bridges, implants, braces, retainers, dentures, and the like). Each of the fluid openings and/or fluid nozzles may be positioned to target a specific dental feature. In some variations, fluid openings and/or fluid nozzles may be located within a recess along the outer surface (e.g., surfaces of the oral insert that face the teeth and gingiva) of the oral insert. Within the internal portions of the oral insert, the fluid nozzles may be connected to one or more internal fluid manifolds. One fluid manifold may supply fluid (e.g., pressurized fluid) to one or more fluid nozzles. For example, an oral insert may comprise eight (8) manifolds that may supply fluid to sixty-four (64) fluid nozzles. The inlets of these manifolds may extend from the posterior (e.g., lingual) region of the mouthpiece (or where desirable for ergonomic and/or efficient use) in the form of a standardized connector, to which a handle and/or one or more tubes may be connected. For example, an oral insert may comprise a plurality of fluid manifolds that each terminates at a manifold opening in a manifold connector. The handle (104) may comprise an attachment mechanism that is configured to releasably engage the manifold connector of the oral insert. The attachment mechanism may comprise one or more sealing rings to facilitate a water-tight engagement so that the pressurized fluid from the fluid regulator may be transferred to the fluid manifolds with little or no fluid leakage at the interface between the manifold connector and the fluid regulator.

In some variations, the oral insert may comprise a fluid effluence conduit, channel, or port that allows for the egress of the fluid that has been introduced into the oral cavity via the fluid nozzles. A fluid effluence conduit may comprise a central port or channel and a plurality of lateral channels that extend from various portions of the oral cavity to the central port to drain fluids. Alternatively, a fluid effluence conduit may comprise a single central port or channel that extends from the lingual portion of the oral cavity to drain fluids. The curvature and placement of the fluid effluence conduit may be configured to accumulate fluid and direct the accumulated fluid toward the anterior portion of the oral cavity so that it may flow out and into a sink or drain.

Figures 1E, 1F, 1G:
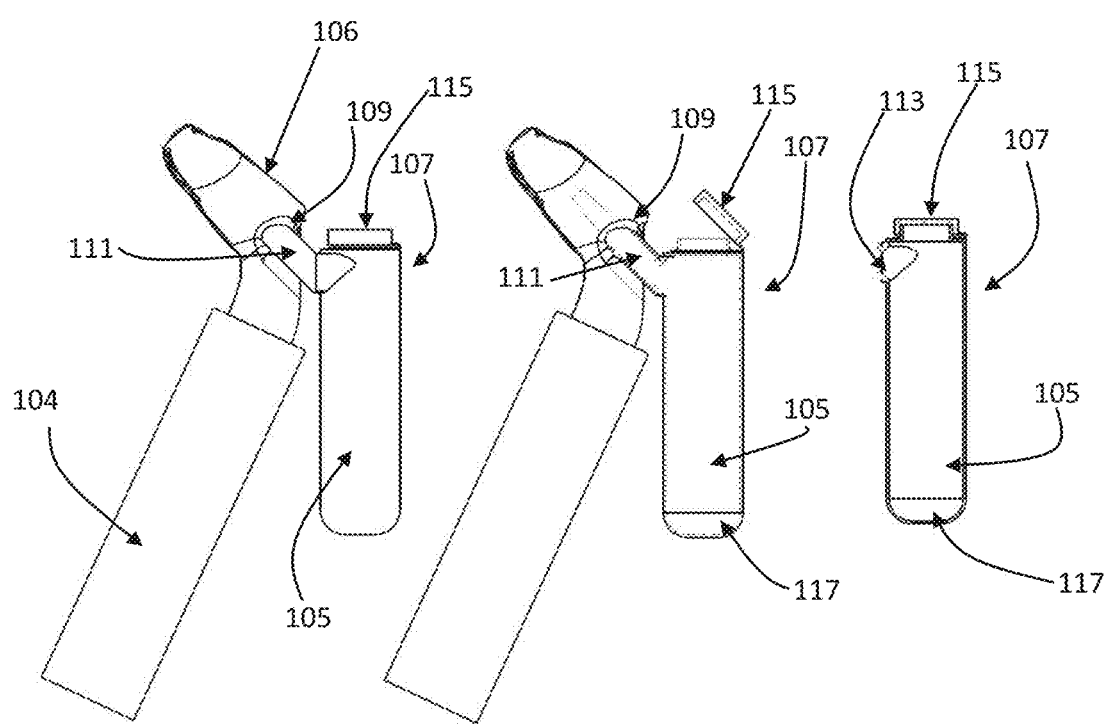
FIGS. 1E-1F depict a side view of an oral care system with a microbiome sample collection chamber.
FIG. 1G depicts a side view of a microbiome sample collection chamber.
Figure 1H:
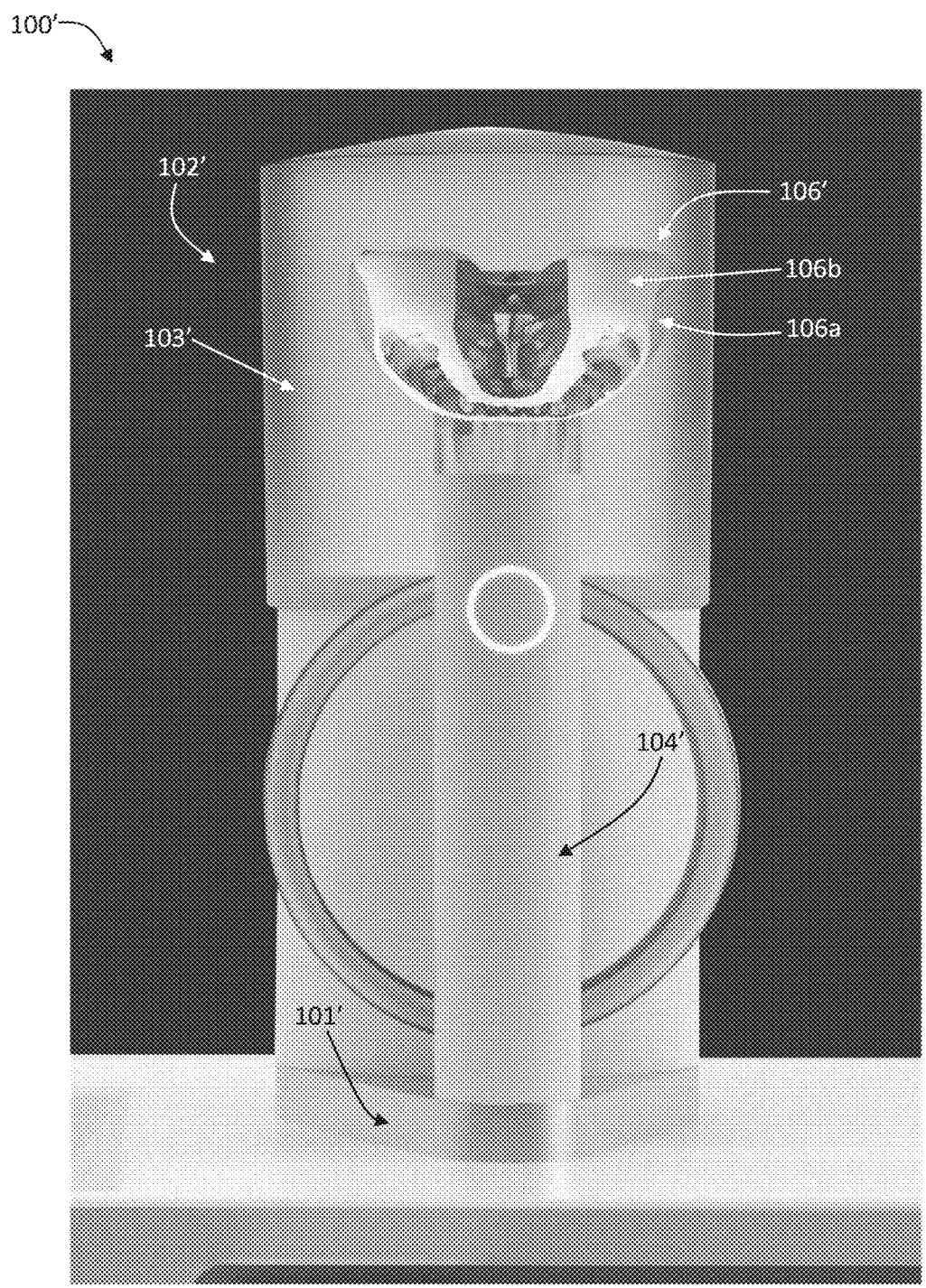
FIG. 1H depicts a perspective view of another variation of a system for personalized oral care.
Figure 1I:
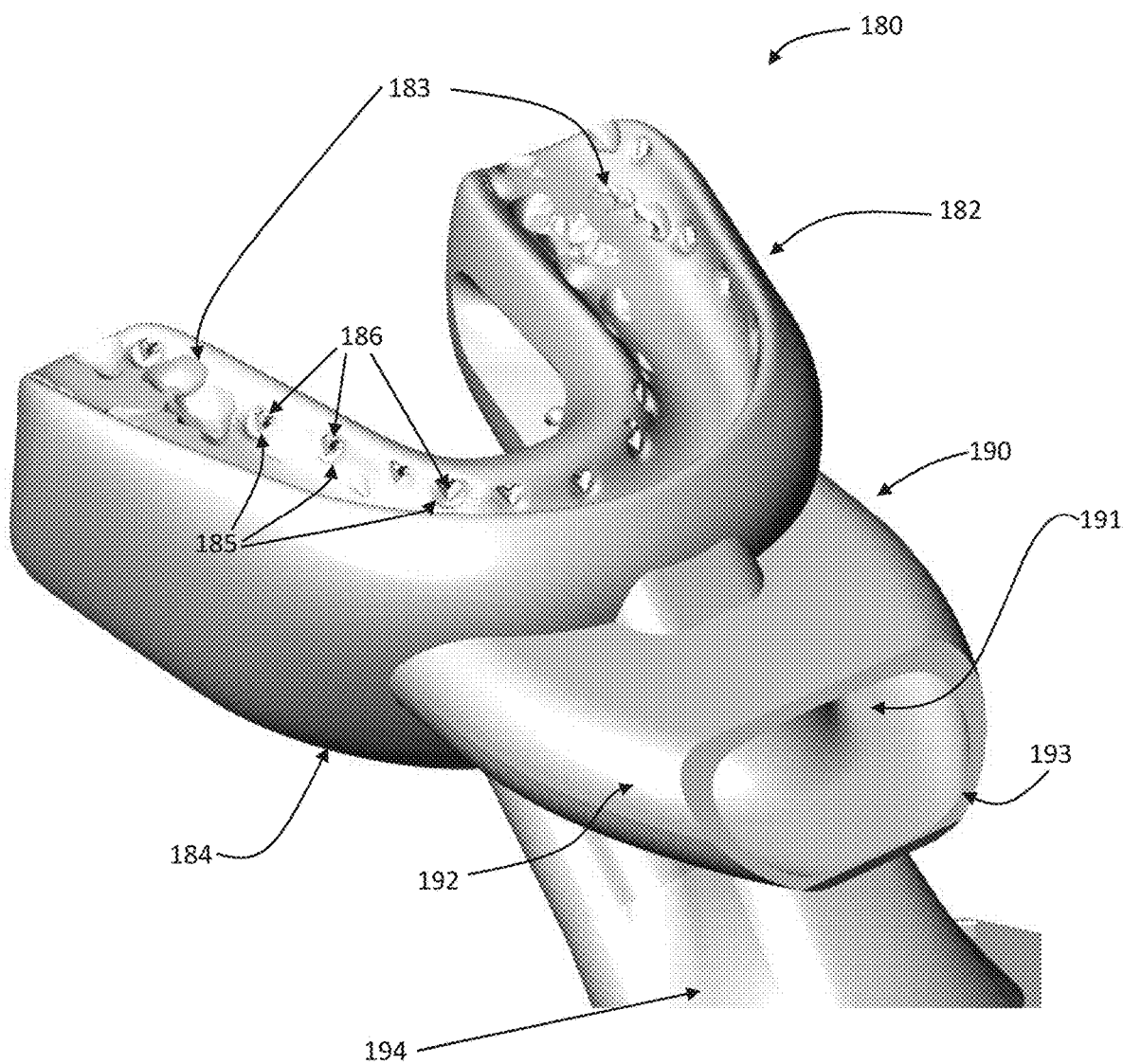
FIG. 1I depicts a perspective view of one variation of an oral insert.

FIG. 1I depicts one variation of an oral insert (180). The oral insert (180) may be made of a rigid material, and may comprise an upper portion (182) having a tray configured to receive a user's upper teeth, a lower portion (184) having a tray configured to receive a user's lower teeth, a plurality of fluid nozzles (186) located in the upper portion and the lower portion, and an effluence conduit (190) located between the upper portion and the lower portion. The trays of the upper and lower portions may comprise one or more alignment features, which may comprise protrusions, slots, or recesses that receive and/or articulate with the user's teeth, gums, hard palate, soft palate, other oral structures, and/or may have contours that correspond to one or more teeth. These alignment features may help to ensure that the oral insert is seated in a desired position in the user's mouth. In some variations, one or more of the fluid nozzles (186) may be located in recesses or indentations (185) along the teeth- and/or gingiva-facing surfaces of the upper and lower trays. The recesses (185) and the fluid nozzles (186) may be located at regions of the upper and lower trays that correspond with the interproximal spaces between the user's teeth, and/or at locations that allow the fluid nozzles to direct fluid jets to the interproximal spaces (e.g., that may not necessarily correspond with the locations of the interproximal spaces). The recesses (185) may have a flared or tapered shape, and/or may have one or more concave contours, where the fluid nozzle opening is located at the narrow portion of the recess. The width of the recess may increase as it extends outward from the fluid nozzle opening. The increased width of a flared recess may allow the fluid jet spray to expand unimpeded. In some variations, the central axis of the flared recess may be aligned with the direction of the fluid jet. The effluence conduit (190) may comprise a central port or channel (191) which may extend between a posterior region and anterior region of the oral insert, and may protrude forward at the anterior region as a beak or an elongated spout (192) that terminates at a fluid egress opening (193). Alternatively or additionally, an effluence conduit may comprise a first side fluid cavity or channel and a second side fluid cavity or channel. The side fluid cavities may funnel into the central port, or may each have their own elongated spouts with separate fluid egress openings. The shape, sizing, and surface contours of the effluence conduit may be configured according to the user's oral anatomy (e.g., size and size of oral cavity, location of teeth, etc.) and configured to promote fluid dynamic efficiency in draining the fluid from the user's mouth. In some variations, the fluid delivered to the user's mouth may be pressurized and/or delivered at a high fluid rate in order to effectively clean their teeth and/or dislodge particles trapped in the interproximal spaces. Because of the increased rate and/or pressure of fluid flow into the oral cavity (i.e., fluid ingress), the effluence conduit of the oral insert may be sized and shaped to allow for fluid egress at the same or greater rate as fluid ingress. The oral insert (180) may also comprise one or more fluid manifolds, which may be a series of branched and/or networked internal fluid channels that distribute the fluid from the handle to the individual fluid nozzles. The fluid manifolds may terminate at a series of manifold openings in a manifold connector port (194) of the oral insert. In some variations, the manifold connector may have one opening per fluid manifold, or may have more than one manifold opening per fluid manifold. When the oral insert is connected to the handle, the fluid regulator components may be configured to fluidically engage with the manifold connector such that the fluid regulator controls the fluid flow into the manifolds. Optionally, the fluid regulator in the handle may further comprise a manifold block having a plurality of fluid channels that are configured to be aligned with the manifold openings in the manifold connector.

Some variations of a personalized oral care system may comprise a collection chamber that is configured to be attached to the fluid effluence conduit, channel, or port. One variation of a collection chamber that may be included with any of the oral care systems described herein is depicted in FIGS. 1E-1G. Collection chamber (107) may comprise a collection cavity (105), a fluid-tight cover (115) that may be removably disposed over an opening in the chamber (i.e., in fluid communication with the collection cavity), and a fluid inlet port (111). A fluid inlet port (111) may protrude from the collection cavity and sized and shaped to extend into the effluence conduit or port (109) of an oral insert (106). Alternatively, a fluid inlet port may be generally flush against the outer surface of the collection cavity (105). The fluid inlet port (111) may comprise one or more mechanical or structural elements configured to engage the effluence port of the oral insert. For example, an inlet port may comprise a surface with an increased coefficient of friction (e.g., rubbery, tacky) to engage with the oral insert by friction-fit. Alternatively or additionally, a fluid inlet port of a collection chamber may comprise threaded grooves or protrusions that correspond with threaded protrusions or grooves in the oral insert to engage via screw-fit. Alternatively or additionally, the fluid inlet port of a collection chamber may comprise one or more protruding lips or grooves that are configured to engage with corresponding grooves or protruding lips of the oral insert to engage via snap-fit. The collection chamber may also engage with the oral insert using a magnetic mechanism, where magnetic components of opposing polarity are disposed in corresponding location on the oral insert and the collection chamber. The volume of the collection cavity (105) may be from about 5 mL to about 200 mL.

FIG. 1F depicts the configuration of a collection chamber during sample collection, i.e., as the microbiome collection fluid is being accumulated in the chamber. The cover (115) may not be disposed over the opening (i.e., the chamber is open to atmospheric or ambient pressure) which may help facilitate the accumulation of the collection fluid and microbiome sample in collection cavity. An optional sample stabilization compound (117) may be located within the collection cavity (105), either before the microbiome sample is collected or added after the sample is collected. Examples of stabilization compounds may comprise Sodium dodecyl sulphate glycine, N,N-trans-1,2-cyclohexanediylbis[N-(carboxymethyl)-, hydrate, lithium chloride, and/or other solutions. The collection chamber (107) may comprise an attachment structure (113), such as a one-way valve, located at the juncture between the fluid inlet port (111) and the collection cavity (105) that allows the collection fluid to flow into, but not out of, the collection cavity. After the desired sample volume has been collected, the collection chamber may be detached from the oral insert. Optionally, the fluid inlet port may be removed from the remainder of the collection chamber, and/or the fluid inlet port may be detached from the effluence port. As depicted in FIG. 1G, the cover (115) may then be secured over the opening of the collection chamber. The collection chamber may then be submitted for microbiome content analysis.

Another variation of a system for personalized oral care is depicted in FIG. 1H. The system (100') may comprise a base station (102') having a fluid reservoir (103'), a handle (104'), and a customized hybrid oral insert or mouthpiece (106') coupled to the handle (104'). The hybrid oral insert may comprise a rigid substrate (106a) and an elastomeric substrate (106b), such as any of the rigid substrates and elastomeric substrates described herein. One or more fluid conduits or tubes (not shown) may connect the fluid reservoir (103') to the handle (104') and to the hybrid oral insert (106'). The system (100') may optionally comprise a charging station (101') for the handle (104'). The handle (104') may comprise one or more control buttons (e.g., a start/stop button, a fluid flow adjustment dial, vibration adjustment and/or activation dial), as may be desirable, which may be positioned variously on the handle for ergonomic or efficient use. Alternatively or additionally, one or more control buttons may be located on the base station (102'). For example, a system may comprise one or more control buttons on the base, and no control buttons on the handle. In other variations, a personalized oral care system may not have a handle at all, and may alternatively comprise one or more fluid conduits or tubes that directly connect the fluid from the base station reservoir to the hybrid oral insert. The fluid retained in the fluid reservoir of a customized oral care system may be water, saline, a mouth wash or rinse, (e.g., containing fluoride and/or germicidal or other cleaning and/or teeth protective fluids), and/or any other desirable additive, such as those described above. The rigid substrate (106a) of the customized hybrid oral insert may comprise a plurality of fluid nozzles having fluid openings that are arranged in accordance with the unique geometry of the user's oral cavity, gingival geometry, and dental structures (and any oral and/or dental devices or implants). Examples of oral and/or dental devices or implants may include, but are not limited to, permanent and removable dental restorations/prosthetics, orthodontic appliances, and etc. (e.g., crowns, bridges, implants, braces, retainers, dentures, and the like). Each of the fluid openings and/or fluid nozzles may be positioned to target a specific dental feature. In some variations, fluid openings and/or fluid nozzles may be located within a recess along the outer surface of the oral insert. Within the internal portions of the hybrid oral insert, the fluid nozzles may be connected to one or more internal manifolds. The inlets of these manifolds may extend from the posterior (e.g., lingual) region of the mouthpiece (or where desirable for ergonomic and/or efficient use) in the form of a standardized connector, to which a handle and/or one or more tubes may be connected. For example, an oral insert may comprise a plurality of fluid manifolds where each fluid manifold terminates at a manifold opening of a manifold connector. In some variations, an optional vibration mechanism may be located on the base station and/or handle, and may be configured to confer mechanical motion to the hybrid oral insert (e.g., to the rigid substrate only, the elastomeric substrate only, or both the rigid substrate and the elastomeric substrate).

Alternatively, a system for personalized oral care may comprise a base station, a handle, and a hybrid oral insert coupled to the handle. The hybrid oral insert may comprise a rigid substrate without any fluid nozzles that is sized and shaped according to a user's oral cavity, and an elastomeric substrate that is attached to the rigid substrate. In this variation, the base station may not have a fluid reservoir. The elastomeric substrate may optionally comprise textured surfaces and/or protruding structures at regions of the elastomeric substrate that correspond with the buccal and/or lingual and/or occlusal and/or incisal edges or surfaces of the teeth (e.g., mesial and/or distal surfaces of the teeth, for example, when the user is missing one or more teeth). Optionally, the base station and/or handle may comprise a vibration mechanism that may be configured to confer mechanical motion to the hybrid oral insert (e.g., to the rigid substrate only, the elastomeric substrate only, or both the rigid substrate and the elastomeric substrate).

A vibration mechanism may be enclosed within the housing of the handle and be coupled to the textured surfaces of the elastomeric substrate of a hybrid oral insert. Optionally, the elastomeric substrate may be configured to vibrate and/or agitate against the surfaces of a user's teeth, which may help to remove surface debris and/or disrupt the formation of biofilms. The vibration mechanism may be included in the handle and/or may be included on the base station. Examples of vibration mechanisms include, but are not limited to electromagnetic motors, an eccentric rotating mass (ERM) rotating mass motor and/or a linear resonant actuator (LRA). In some variations, the vibration mechanism may comprise two ERMs that are counter-rotated (e.g., a counter-rotating mass actuation mechanism) to provide a resultant net force in set of directions (e.g., linear direction). The vibratory motion may be random, linear or rotational motion. The mechanical motion generated by the vibration mechanism may be transferred to the rigid substrate that then transfers the motion to the elastomeric substrate. Alternatively or additionally, the vibration mechanism may be directly coupled to the elastomeric substrate, so that the mechanical motion from the vibration mechanism causes a corresponding agitation or vibration in the elastomeric substrate. Alternatively or additionally, vibration or agitation of the elastomeric substrate may be generated based on the fluid flow motion from the handle to the rigid substrate and/or the fluid flow through the internal manifolds of the rigid substrate and/or the fluid flow exiting the plurality of fluid openings interacting with the textured portion of the elastomeric substrate. For example, the pulsatile fluid flow may cause a corresponding pulsatile mechanical motion to the elastomeric substrate. Alternatively or additionally, agitation of the rigid or elastomeric substrate may be generated manually (e.g., by the user) and guided by stand-off structures or other features in the rigid or elastomeric portion of the insert.

Figure 2A:
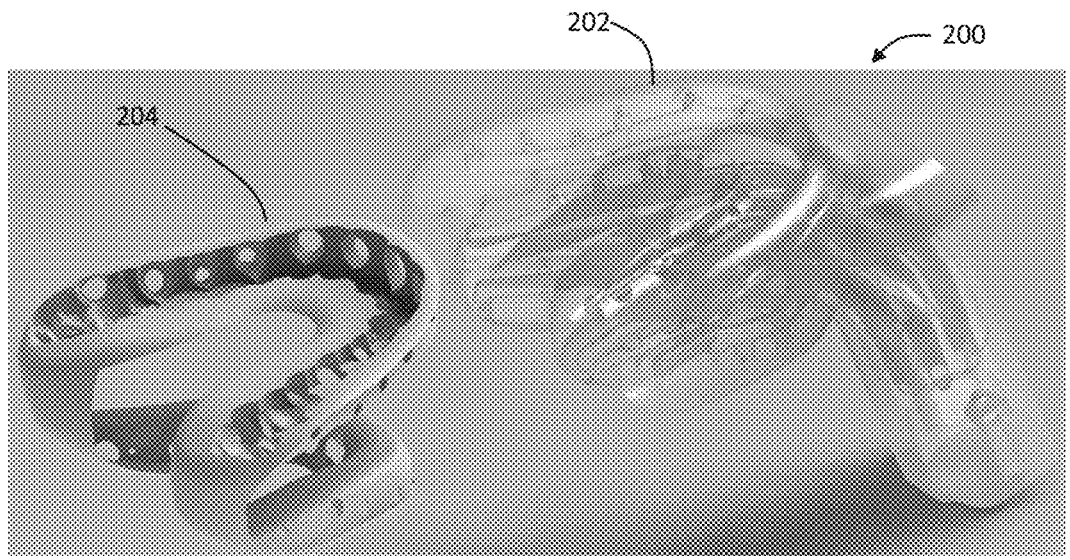
FIGS. 2A-2B depict perspective exploded views of variations of a hybrid oral insert (i.e., an oral insert with an elastomeric substrate).
Figure 2B:
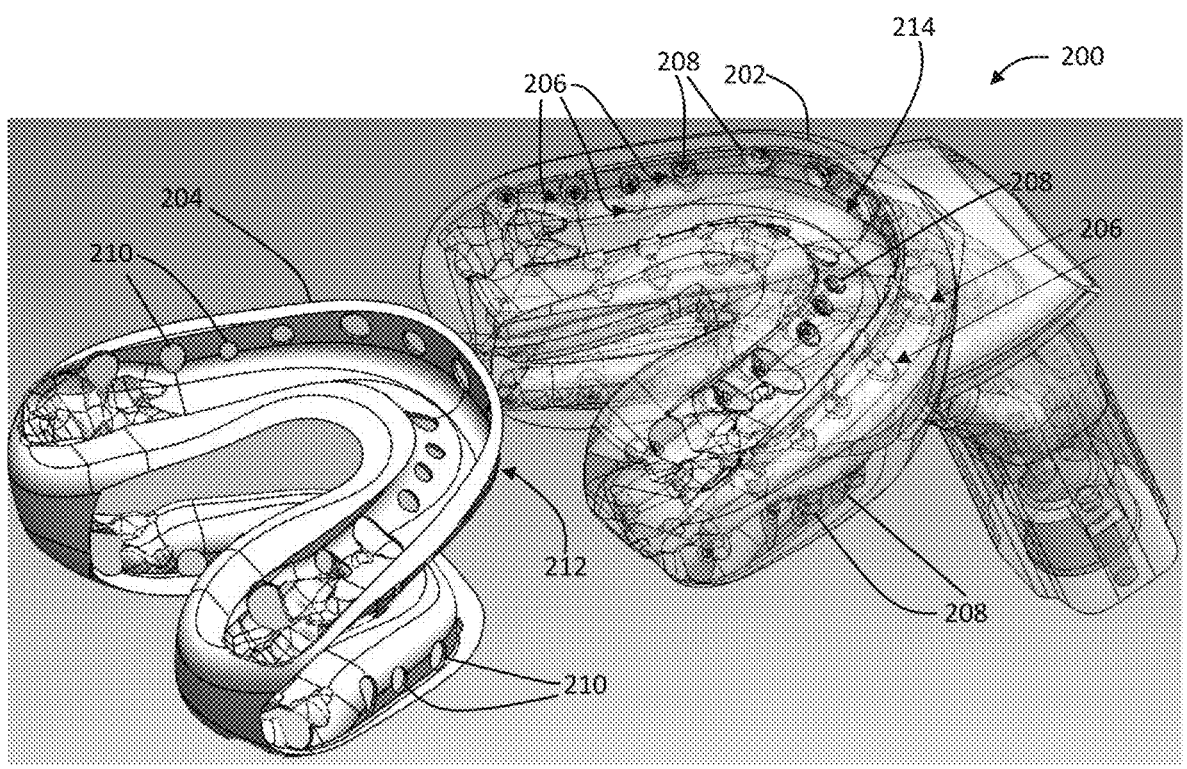
Figure 2C:
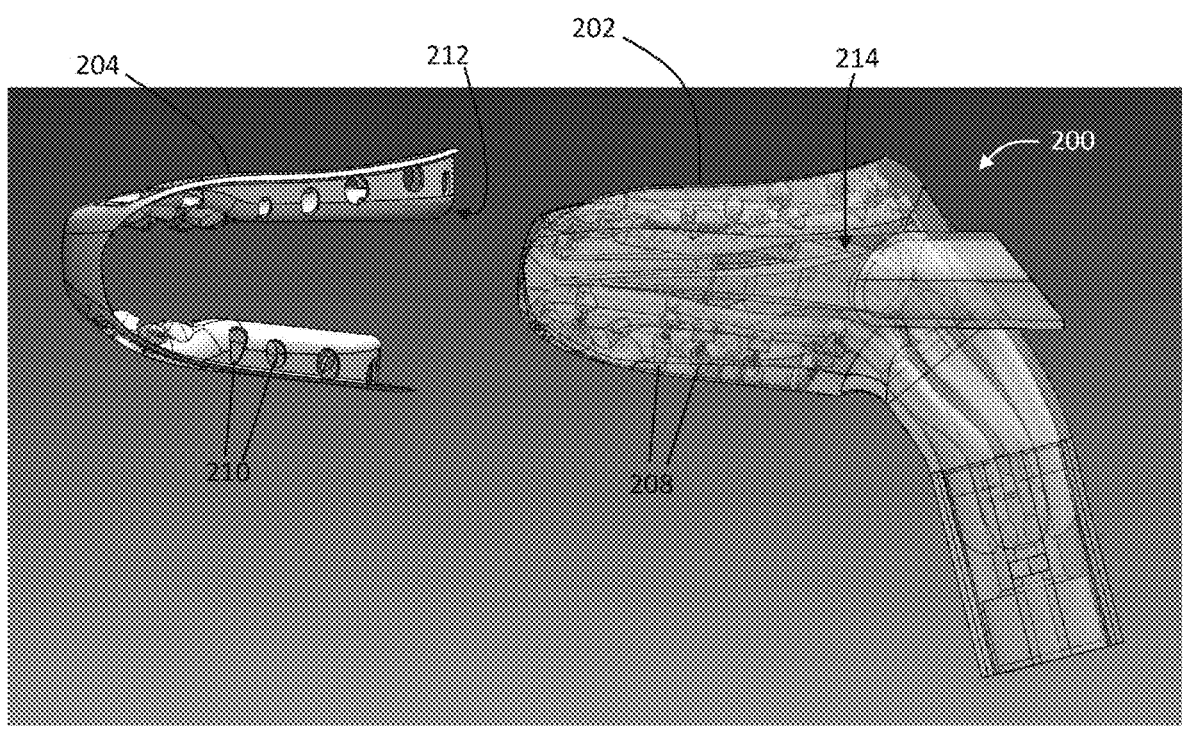
FIG. 2C depicts a side exploded view of one variation of a hybrid oral insert.

FIGS. 2A-2C are perspective exploded views of variations of a hybrid oral insert. The hybrid oral insert (200) may comprise a rigid substrate (202) and an elastomeric substrate (204) configured to attached to the rigid substrate (204). The rigid substrate (204) may comprise a plurality of fluid nozzles (206) with fluid openings (208), and the plurality of fluid nozzles, along with the location of the fluid openings, may be in an arrangement that is customized to a user's oral anatomy. The elastomeric substrate (204) may comprise a plurality of openings (210) that correspond with each of the fluid openings (208) so that when the elastomeric substrate is attached to the rigid substrate, the openings (210) are aligned in a non-occlusive fashion with the fluid openings (208). The rigid substrate may comprise upper and lower portions/trays that correspond with the upper and lower teeth of the user. The elastomeric substrate may comprise upper and lower portions/trays that that correspond with the upper and lower portions/trays of the rigid substrate. For example, as depicted in FIGS. 2B-2C, convex regions (212) of the elastomeric substrate (204) fit into concave regions (214) of the rigid substrate (202). The elastomeric substrate (204) may be disposed over at least a portion of the rigid substrate that is sized and shaped to receive a user's teeth. For example, the elastomeric substrate may cover most, if not all, of the surface of the rigid substrate such that the surfaces of the user's teeth and/or gums and/or inner cheek substantially contact the elastomeric substrate, with little or no contact with the rigid substrate. An elastomeric substrate that is disposed over the tooth-, gum-, and/or inner cheek-surfaces may improve and enhance user comfort.

Optionally, any of the oral inserts described herein may comprise an identification tag or chip that is paired with the corresponding handle and/or base station, which may have a tag or chip reader. A base station system controller may comprise a memory that stores a set of operating modes and/or settings (e.g., intensity flow setting, flow rate setting, fluid pulsatile pattern, etc.) for each identification tag or chip. This may allow a user to set and store their preferred settings so that when they attached their mouthpiece to the handle, the oral care system can automatically operate with those settings. In some variations, the oral insert may have an NFC/RFID chip, and the handle may have an NFC/RFID chip reader, as described further below. Alternatively or additionally, an oral insert may have an identification tag that has a distinct physical or mechanical characteristic that can be detected or sensed by an identification tag reader in the handle so that the base station can distinguish a first oral insert from a second oral insert. The identification tag may be located (e.g., attached by the user or installed during manufacturing) in proximity to the manifold connector and/or the mechanical interface between the oral insert and the handle, and the reader may be located in the handle such that when the oral insert is attached to the handle, the tag is located in sufficient proximity to the reader so that its distinct physical and/or mechanical characteristic may be detected. In some variations, the tag and the reader may be in contact with each other when the oral insert is attached to the handle. For example, the tag and/or reader may have electrical contacts or pins that allow the system to sense the electrical properties of the identification tag. Alternatively, the tag and the reader may not be in contact with each other, and the reader able to sensor the physical characteristic of the tag simply by being in close proximity. In some variations, the identification tag may comprise a band (e.g., an elastic band) or adhesive patch with distinct optical properties, and the identification tag reader may be color or light sensor in the handle. For example, an oral care system may comprise bands or patches of at least two colors (e.g., black and white) and/or two optical properties (e.g., reflective, not-reflective), which may allow two users to share the base station and handle. Alternatively or additionally, the identification tag may comprise a magnetic component having a particular polarity or orientation (e.g., north pole, south pole, no polarity), and the identification tag reader may be a magnetic sensor. Alternatively or additionally, the identification tag may comprise an inductive component having a distinct inductive property (e.g., different wire coils), and the identification tag reader may be a inductance sensor. Alternatively or additionally, the identification tag may comprise a capacitive component having a distinct capacitive property (e.g., different dielectric constants), and the identification tag reader may be a capacitive sensor. Alternatively or additionally, the identification tag may comprise a resistive component having a distinct resistive property (e.g., different resistance values, "short circuit" vs. "open circuit"), and the identification tag reader may be a current or voltage sensor. An oral care system may optionally comprise one or more of the above identification tags, and in some variations, a first user may select the tag that they wish to attach to their individual oral insert to distinguish over the oral insert of a second user. The identification tag may have a limited number of distinct physical or mechanical characteristics (e.g., 2, 3, 4, 5, 6, 7, 8) that correspond to the number of users that share the same handle and base station.

Oral Insert

Figure 3A:
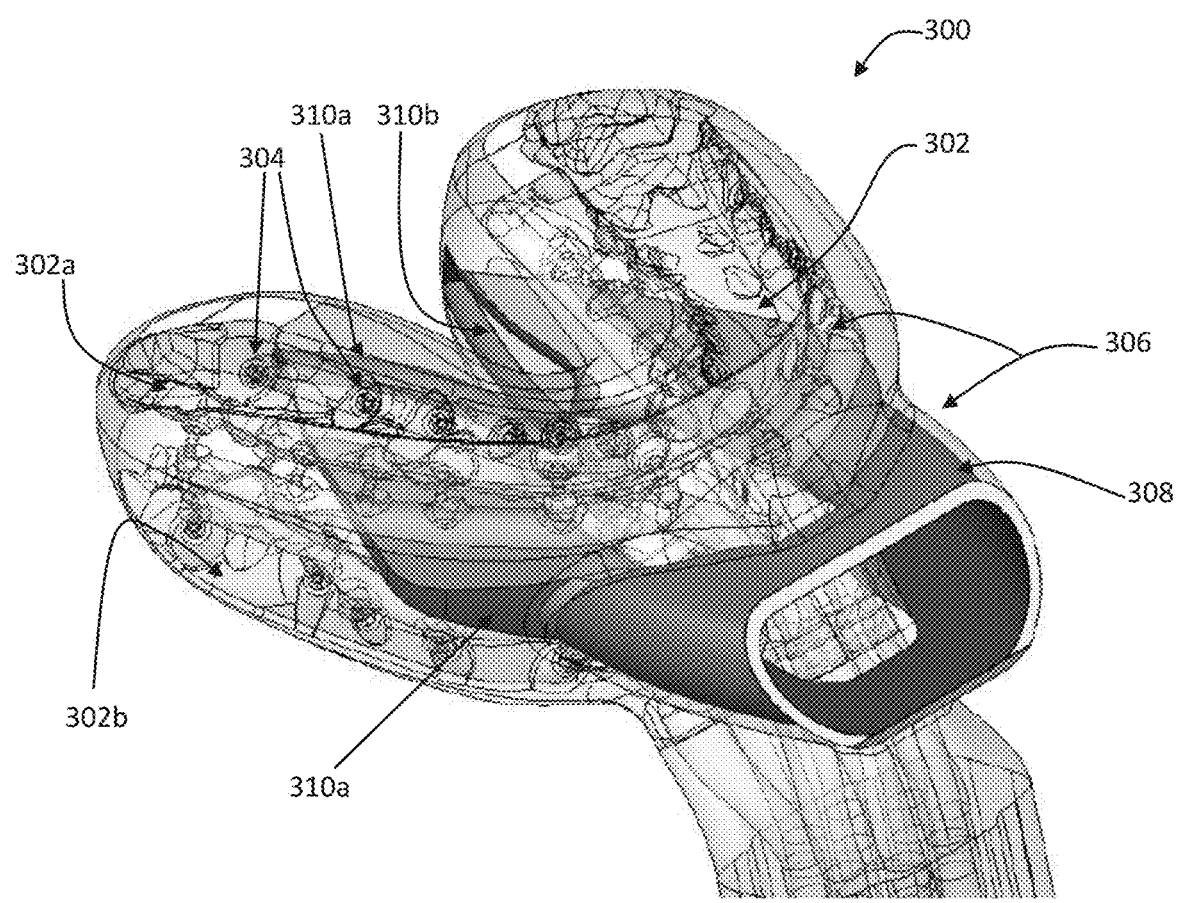
FIG. 3A depicts a perspective, partial cutaway view of one variation of an oral insert.

FIG. 3A depicts one variation of an oral insert or mouthpiece. The oral insert may be made of a rigid material. Some variations of an oral care system may only have an oral insert made of a rigid substrate while other variations may have a rigid oral insert and an elastomeric or conformable substrate (i.e., hybrid oral insert). The oral insert (300) may comprise a channel or trough or groove or slot that has one or more contours that correspond with one or more teeth of a user. The contours may be shaped based on optical and/or digital impressions using intraoral scanners or photographs (e.g., 3-D intraoral scans, 3-D scans of a dental impression), photographs, X-rays, physical impressions, intraoral and extraoral radiographs, computed tomography, including cone beam computed tomography, magnetic resonance imaging, ultrasound, and the like. In some variations, a mouthpiece may not have contours corresponding to one or more teeth, but may comprise one or more alignment features to help facilitate correct and consistent placement and alignment of the mouthpiece within the mouth. For example, an oral insert or mouthpiece may comprise a channel or trough or groove or slot (302) defined by two side walls and a bottom wall that are sized to fit around the teeth (e.g., configured to contact facial surfaces, lingual surfaces, and occlusal surfaces of maxillary teeth and/or mandibular teeth). The side walls and bottom wall may have smoothed surfaces and/or contours that may or may not correspond with the anatomical contours of the one or more teeth. In some variations, one or more alignment features may be located within the trough to help seat the teeth within the trough. For example, an alignment feature may comprise protrusions, slots, or recesses that receive and/or articulate with the user's teeth, gums, hard palate, soft palate, other oral structures, and/or may have contours that correspond to one or more teeth. These alignment features may help to ensure that the oral insert is seated in a desired position in the user's mouth.

The upper portion of an oral insert may comprise a trough (302) that has a curve that corresponds with the curve of the maxillary teeth or mandibular teeth (i.e., teeth along the curve of the maxilla or mandible). For example, the maxillary (or mandibular) teeth may be located on the maxilla (or mandible) along a curve, and a curved trough of the oral insert may approximate that curve. While some variations of the oral insert may comprise a trough having contours that match the anatomical contours of a user's teeth, in this variation, the interior walls of the trough (302) may have smooth surfaces and/or contours or features associated with the size, shape, placement and alignment of the fluid openings or nozzles with respect to a user's teeth. For example, a plurality of fluid nozzles (304) having fluid openings may be located within the trough, for example, along the two side walls of the trough for providing fluid flow to the facial and/or lingual surfaces of the teeth. The fluid openings or nozzles (304) may include protrusions that extend into the space of the trough, or may be flush along or recessed relative to the inner surface of side walls of the trough. In some variations, the fluid nozzles or openings may be located within recesses or indentations along the surface of the trough. As will be described further below, the fluid openings or nozzles (304) may be positioned at customized locations to direct fluid to specific regions of the teeth. For example, some fluid openings or nozzles may be located across from the interproximal spaces, and/or along the gingival margins. In some variations, the spacing or distance between the fluid openings or nozzles may correspond with the distance between the interproximal spaces or the size and shape of the teeth. One or more fluid nozzles may be located at an offset from the locations of the interproximal spaces and/or gingival margins but may be angled toward the interproximal spaces such that the fluid jet axis may be aimed toward the interproximal space. While the examples described herein have one or more fluid nozzles directed toward the interproximal spaces, it should be understood that one or more fluid nozzles directed toward any of the anatomical regions described and depicted in FIGS. 1A-1C.

While some oral inserts or mouthpieces may comprise a single trough to fit over either the maxillary teeth or the mandibular teeth, in other variations, an oral insert may comprise two opposing troughs where one trough accommodates the maxillary teeth and the other trough accommodates the mandibular teeth (i.e., so that both upper (maxillary) and lower (mandibular) teeth may be irrigated simultaneously or in series with a single mouthpiece). The oral insert (300) comprises a first trough (302a) that may be configured to fit over the mandibular teeth (e.g., a lower trough) and a second trough (302b) opposite the first trough that may be configured to fit over the maxillary teeth (e.g., an upper trough). A first set of fluid openings or nozzles may be located within the first trough (302a) to provide customized fluid flow to the mandibular teeth and a second set of fluid openings or nozzles may be located within the second trough (302b) to provide customized fluid flow to the maxillary teeth. In some variations, fluid openings or nozzles may be provided only in regions of the oral cavity for which fluid irrigation or infusion is desired. For example, some variations may comprise separate mouthpieces that each provide fluid flow to a select subset of teeth. This may be useful for applications other than cleaning, for example, the targeted application of medicine, whitening solutions, etc. Any of the fluid openings or nozzles described herein may be used in either or both of the troughs for providing customized fluid flow for each of the mandibular teeth and the maxillary teeth.

The oral insert (300) may also comprise a fluid effluence conduit (306). The fluid effluence conduit (306) may protrude from the portion of the oral insert that is shaped to accommodate a user's teeth. The protruded portion (308) of the effluence conduit (306) may have curves and contours that may help facilitate the redirection of fluid in the oral cavity and direct it to exit the user's mouth into a sink or drain. The protruded portion (308) may be a central port and the effluence conduit may comprise one or more lateral fluid cavities or channels (310) that accumulate fluid from various regions of the oral cavity and direct the fluid into the central port (308). For example, the effluence conduit (306) may comprise a first (left) lateral fluid cavity (310a) and a second (right) lateral fluid cavity (310b) that are in fluid communication with the central port (308). Alternatively, a fluid effluence conduit may comprise a single central channel or port that extends between a posterior region and an anterior region of the oral insert.

The oral inserts or mouthpieces described herein may comprise a plurality of fluid openings or nozzles arranged based on the individual geometry of a user's oral cavity and dental structures. Customizing the position of the nozzles with respect to specific dental structures may help facilitate cleaning efficacy. Cleaning efficacy may be achieved by generating a shear stress greater than the critical shear stress (i.e., a shear stress threshold) at which biofilm or residue may be removed from the target surface or feature (e.g. tooth or gum structure). If a nozzle is incorrectly aligned relative to the dental and/or gum structures of a user, fluid jets may be improperly applied to the teeth or gum structures, which may detract from cleaning efficacy and in some cases, may even push debris into a gum pocket (instead of flushing debris out of a gum pocket). The positions of the nozzles in the arrangement of nozzles may be determined by locating the dental or gum feature(s) targeted by the one or more nozzles, orienting the nozzle such that the applied fluid jet moves across or toward the feature such that biofilm or debris on the feature is disrupted or removed, and positioning the nozzle at a location such that fluid from the nozzle strikes the feature in a controlled fashion (e.g., with a consistent flow or pulsatile flow) to overcome the shear stress threshold at which biofilm or residue may be removed from the target surface or feature (e.g. tooth or gum structure). In some variations, customized arrangement of nozzles may take into account any irregular tooth anatomy and/or orthodontic appliances, including supernumerary teeth, missing or unerupted teeth, fusion (when two developing teeth merge into one tooth—usually forming a groove that is prone to decay), gemination (when a developing tooth splits into two teeth—usually forming grooves that are prone to decay), partially erupted teeth, and numerous other formation or eruption issues that may cause irregular geometries. The customized fluid opening or nozzle arrangements of disclosed herein may accommodate and clean the extra surfaces, interproximal regions, gingival margins, ridges, grooves, pits and fissures that might otherwise be missed by non-customized mouthpieces or devices (i.e., mouthpieces having fluid openings or nozzles that are not arranged based on a user's oral and dental structures).

The oral inserts or mouthpieces described herein may also accommodate changes in dental geometry. For example, a user may have a broken or missing tooth, and/or may have new teeth or restorations. Some variations of a mouthpiece may include one or more shields that may have curves and/or contours that correspond to the surface contours of one or more of the user's teeth. The shields may be mechanically attached or chemically bonded into the space or cavity of the mouthpiece that corresponds to the missing or broken tooth, and may extend from the mouthpiece up to the gingival margin (e.g., a few millimeters over the gingival margin). The shields may help prevent fluid jets intended for the missing or broken tooth from striking the recess where the tooth was previously located. The shields may also be used to shield especially sensitive teeth or gums (e.g., due to tooth decay, retained roots, partially erupted teeth, exposed roots, and/or after a dental procedure) from fluid jets, as may be desirable for user comfort.

While the fluid openings or nozzles are described herein in the context of fluid ingress (i.e., introducing fluid into the oral cavity), it should be understood that one or more of the fluid openings or nozzles may be used for fluid egress (e.g., channeling fluid out of the oral cavity and/or coupled to an active egress method such as suction or vacuum chamber), as may be desirable.

An oral insert may comprise one or more internal fluid cavities or manifolds connected to the fluid nozzles. In some variations, a handle may comprise a pump and/or a fluid regulator, both of which may be in fluid connection with the base station reservoir and enclosed within a handle housing. In variations where the oral insert comprises a plurality of manifolds, the fluid regulator or fluid switcher assembly of the handle may multiplex and/or regulate fluid flow in each of the plurality of manifolds. The handle may also comprise an electronics control board and one or more user inputs or control buttons, which may be in communication with the electronics control board. The electronics control board may receive and/or relay commands to regulate the fluid flow into the handle and to the mouthpiece.

The oral insert may comprise any material having a rigidity and/or hardness that can accommodate and sustain the fluid flow rates and pressures that facilitate the removal of debris from interproximal spaces and/or disrupt biofilm formation on tooth surfaces (fluid pressures from about 10 psi to about 150 psi). For example, an oral insert may be made of a material having a hardness durometer value from about 60 Shore A to about 100 Shore D. The oral inserts or mouthpieces, including the rigid substrate of a hybrid oral insert, described herein may be manufactured utilizing one or more 3-D printing (also known as Additive Manufacturing) processes which may include: Stereolithography Apparatus (SLA), Polymer Jetting, Powder Deposition, Binder Jetting, Selective Laser Sintering (SLS), Fused Deposition Modeling (FDM), Fused Filament Fabrication (FFF), Directed Energy Deposition (DED), Direct Metal Laser Sintering (DMLS), Selective Laser Melting (SLM), Electron Beam Melting (EBM), Laminated Object Manufacturing (LOM), Rapid Liquid Printing (RLP), BioPrinting, Self Assembly Printing (Also known as 4D printing), digital light projection (DLP) methods or a hybrid system that utilizes a variety of 3D printing process. Manufacturing may also include a hybrid process that utilizes 3D Printing and robotics, 3D printing and conventional manual milling or Computer Numerically Controlled (CNC) machining, or 3D printing and injection molding or over-molding. Manufacturing may also include a system for varying hardness, flexibility, color, or texture depending upon process and materials used. Materials may include, UV-curable photopolymers such as Carbon MPU100, Whip Mix Surgical Guide, KeySplint Soft™, 3D Systems™ VisiJet SL Clear™, 3DSystems™ Accura ClearVue™, NextDent™ Model Clear™ or Stratasys™ Med620™, UV curable ceramics, powder polymers, powder metals, powder alloys, powder ceramic, powered organic material, filament-based plastics, filament-based metals, filament based ceramics, filament-based organic materials, or may be comprised of a variety of plastic, metal, ceramic, organic materials or biological materials that may be grown in a laboratory environment which may be end user specific or manufactured from a specific user's genetic data or cells as a base material.

Described below are examples of fluid nozzle and opening arrangements that are customized to particular dental structures or features. While the position and/or orientation (e.g., angle) of the fluid openings or nozzles may be tailored to target one dental structure or feature, it should be understood that the position of fluid openings or nozzles may be determined based on optimizing fluid flow and/or biofilm or debris removal from more than one dental structure or feature.

Fluid Nozzles

An oral insert and/or mouthpiece, including the rigid substrate of a hybrid oral insert, may comprise one or more sets of fluid nozzles for removing biofilm or debris from the surface of a tooth (e.g., the contours of the occlusal, facial, lingual, mesial and distal surfaces of the teeth). A fluid nozzle may comprise a channel and a fluid opening, where the channel extends between an internal fluid manifold in order to provide fluid communication between the manifold and the fluid opening. In one variation, the fluid openings or nozzles for removing biofilms and/or debris from a tooth's surface may be oriented approximately perpendicular to the surface and placed within a predetermined distance (e.g., from about 0 mm to about 10 mm) of the tooth (to overcome a shear stress threshold of greater than approximately 0.014 psi across the target region). Alternatively or additionally, the fluid openings or nozzles may be oriented at any angle between 0° to about 90° relative to the long axis of a tooth, e.g., from about 0° to about 30° (for example, for back molars), from about 35° to about 55°, from about 45° to about 90°, about 45°, etc. The shape of the fluid opening of a nozzle may be any shape described herein (e.g., as described further below and depicted in FIGS. 3C-3R).

Figure 3G:
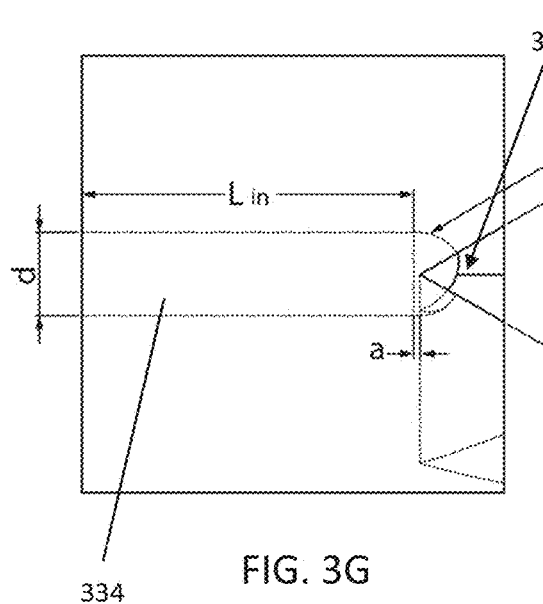
FIGS. 3G-3I depict a cross-sectional view, a front view, and a perspective view, respectively, of one variation of a two-lobed fluid nozzle or fluid opening.
Figure 3H:
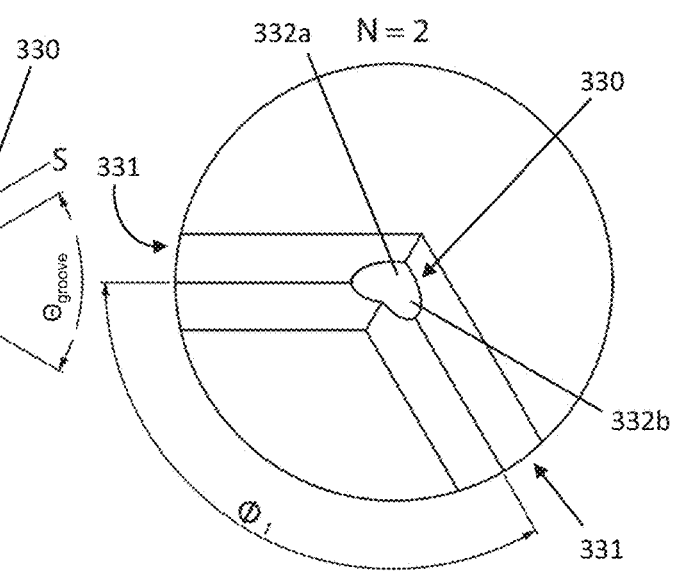
Figure 3I:
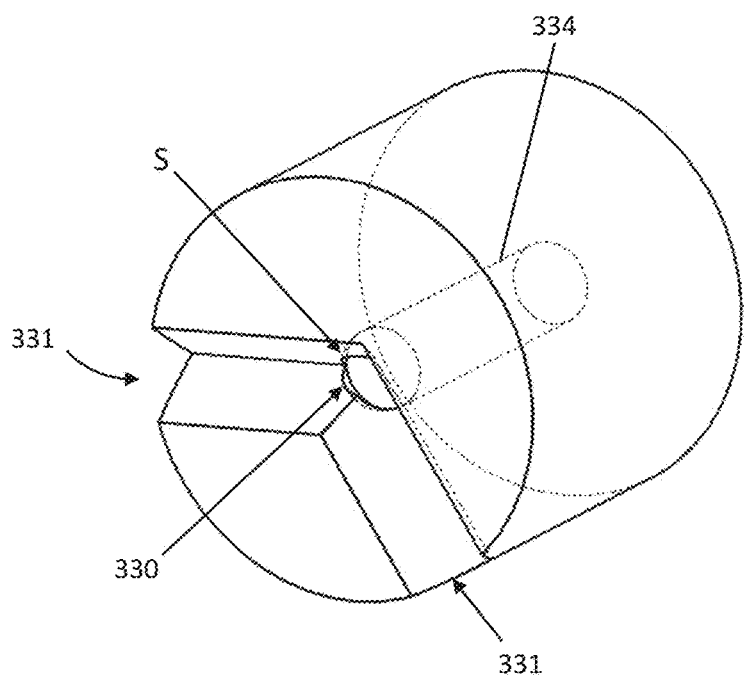
Figure 3J:
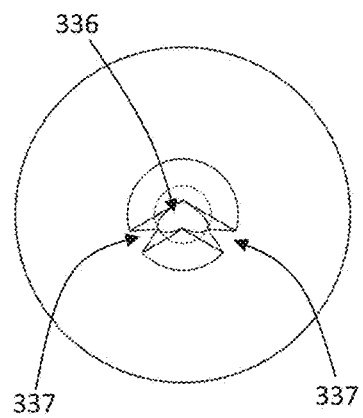
FIGS. 3J-3K depict a front view and a perspective view, respectively, of one variation of a two-lobed fluid nozzle or fluid opening.
Figure 3K:
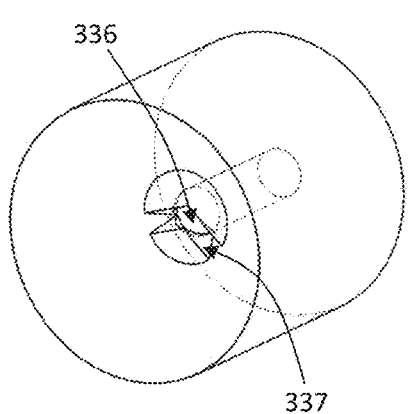
Figure 3L:
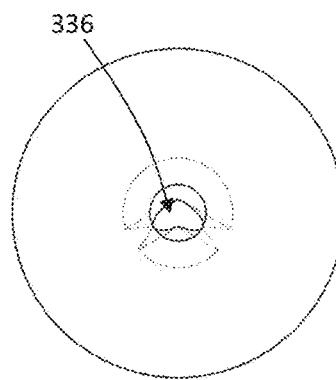
FIG. 3L depicts a front view of another two-lobed fluid nozzle or opening.
Figure 3M:
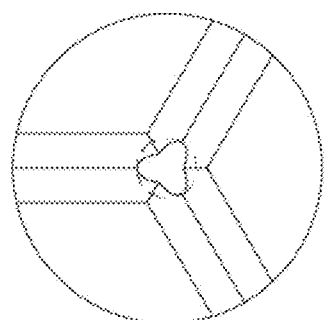
FIGS. 3M-3R depict front views of other variations of a three-lobed fluid nozzle or fluid opening.
Figure 3N:
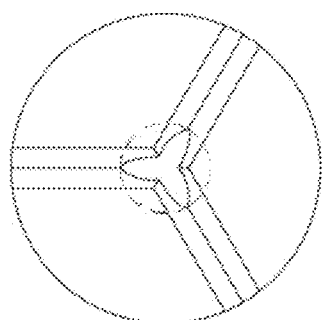
Figure 3O:
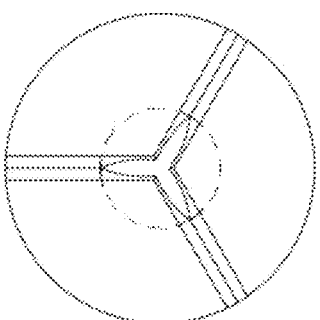
Figure 3P:
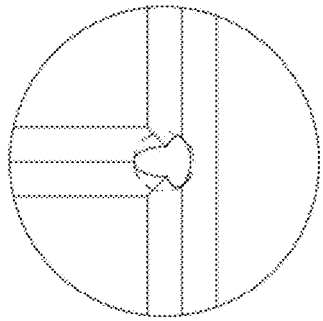
Figure 3Q:
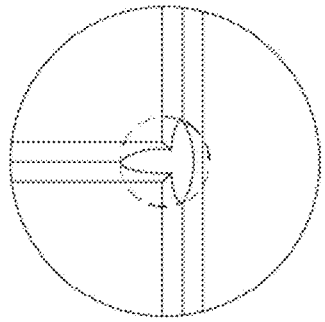
Figure 3R:
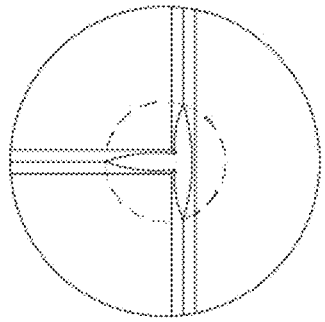

FIGS. 3B-3R depict various fluid opening or nozzle shapes and geometries that may be used in an oral insert or mouthpiece, alone or in combination with fluid openings of different shapes and sizes, as may be desirable. A fluid nozzle may comprise a channel or lumen that extends between an internal manifold within the oral insert and the fluid opening that directs fluid toward the user's teeth. The channel or lumen may be shaped as a cylinder and may have a length (Lin) and a diameter (d), for example, as depicted in FIGS. 3B and 3G. The length (Lin) may be from about 20 mm to about 20 mm, and the diameter (d) may be from about 2 mm to about 5 mm. A first end of the channel may connect to an internal manifold while the second end of the channel may terminate in a fluid opening having a size and shape that may be customized to the user's teeth. In some variations, there may be a curved surface (S) disposed over at least a portion of the fluid opening. For example, the curved surface (S) may be defined as a hemisphere with a diameter d, or as an ellipsoid where one of its semi-axes is of a length d/2. In some variations, the fluid opening may have a multi-lobular shape having N lobes and where the lobes have an angular distribution ($\Phi_1 \ldots \Phi_{N-1}$), for example, as depicted in FIGS. 3C and 3H. The customization of the diameter (d), groove angle ($\Theta_{groove}$) and groove offset (a) (and any other parameters of a nozzle) may facilitate the customization of a fluid flow profile according to the geometry of the oral features (e.g., facial, lingual, and/or occlusal surfaces, and/or interproximal spaces and/or gingival margins) of any individual tooth or group of teeth that are desired to be irrigated or cleaned.

FIGS. 3B-3F depict variations of fluid nozzles that have a fluid opening with a three-lobed or tri-lobal shape. FIGS. 3B-3D depict one variation of a nozzle with a fluid opening (310) having first, second, and third lobes (312a, 312b, 312c) that are arranged in a radially symmetric fashion (i.e., angular distribution is such that Φ1=120°, Φ2=120°. The fluid opening (310) may be at one end of a channel or lumen (314), which may have a length Lin and diameter d as described above. The three-lobed or tri-lobal shape may be referred to as a Y-shaped nozzle. In the variation of FIGS. 3B-3D, the Y-shaped nozzle may comprise three V-grooves (311) that creates the three-lobed shape of the fluid opening and may also create a curved surface (S) disposed over at least a portion of the fluid opening (310). The Y-shaped nozzle may generate a tri-lobal, fan-like, sheet spray. Optionally, fluid may also flow along the channels or grooves created by the V-grooves. FIGS. 3E-3F depict one variation of a fluid opening (316) that has three lobes similar to the opening (310), but with V-grooves (317) that are shorter than the V-grooves (311). The lobes of the fluid openings (310) and (316) may be wider than they are long.

FIGS. 3G-3L depict variations of fluid openings with a two-lobed or bi-lobal shape. FIGS. 3G-3I depict one variation of a nozzle with a fluid opening (330) having first and second lobes (332a, 332b) that are arranged in a bilaterally symmetric fashion (i.e., angular distribution is such that Φ1=120°. The fluid opening (330) may be at one end of a channel or lumen (334), which may have a length Lin and diameter d as described above. The two-lobed or bi-lobal shape may be referred to as a V-shaped nozzle. In the variation of FIGS. 3G-3I, the V-shaped nozzle may comprise two V-grooves (331) that creates the two-lobed shape of the fluid opening and may also create a curved surface (S) disposed over at least a portion of the fluid opening (330). The V-flat nozzle contains two V-grooves, generating a bi-lobal fan sheet spray. Optionally, fluid may also flow along the channels or grooves created by the V-grooves. FIGS. 3J-3L depict other variations of a two-lobed or V-shaped fluid opening or nozzle. FIGS. 3J-3L depict one variation of a fluid opening (336) that has two lobes similar to the opening (330), but with V-grooves (337) that are shorter than the V-grooves (331). The lobes of the fluid openings (330) and (336) may have widths that are similar to (or greater than) their lengths.

Figure 3S:
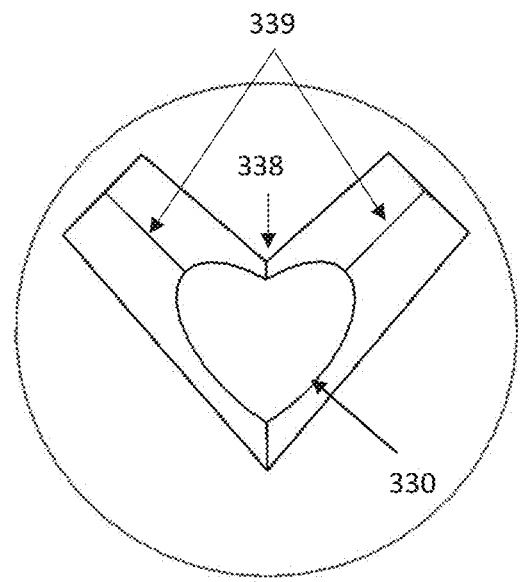
FIGS. 3S-3T depict front views of other variations of a fluid nozzle opening.
Figure 3T:
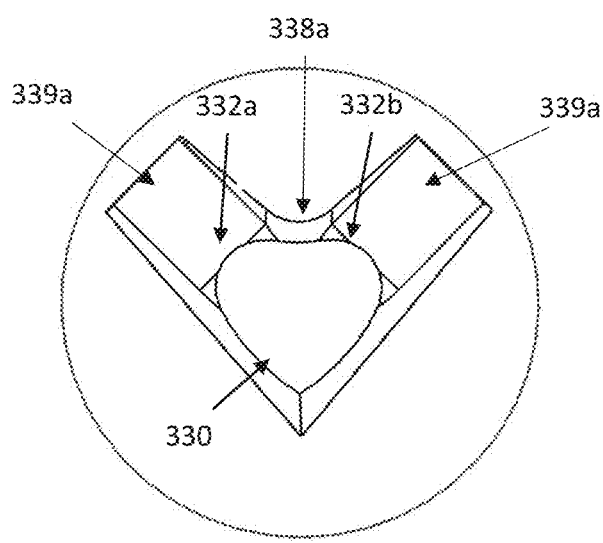

FIGS. 3M-3R depict additional variations of fluid openings or nozzles having a three-lobe or tri-lobal shape, but with varying values for the angles $\Phi_{lobe}$, $\Theta_{groove}$, and diameter (d). These variants may be selected from a design library and tuned to match an individual user's oral features, and/or may help to increase shear stress coverage across target regions or surfaces of the teeth. FIG. 3M depicts one variation of a fluid opening with three lobes that are radially symmetric and the widths of the lobes may be substantially constant as the lobes extend outward, and may have a curved lobe ending. FIG. 3N depicts one variation of a fluid opening with three lobes that are radially symmetric and the widths of the lobes may taper or narrow as the lobes extend outward, and may have a pointed lobe ending. The lengths of the lobes may be about 1.5 to about 2.5 times the widths of the lobes. FIG. 3O depicts one variation of a fluid opening with three lobes that are radially symmetric and the widths of the lobes may taper or narrow as the lobes extend outward, and may have a pointed lobe ending. The lengths of the lobes may be about 3 to about 5 times the widths of the lobes. FIG. 3P depicts one variation of a fluid opening with three lobes that where two of the lobes are about 180° from each other and the third lobe is about 90° from the other two lobes (e.g., forming a T-shape). The third lobe may have a length that is greater than or equal to the lengths of the first and second lobes. FIG. 3Q depicts one variation of a fluid opening with three lobes that are arranged similarly to the fluid opening in FIG. 3P (i.e., T-shaped), however, the widths of the lobes may taper or narrow as the lobes extend outward, and may have a pointed lobe ending. The lengths of the lobes may be about 1.5 to about 2.5 times the widths of the lobes. FIG. 3R depicts one variation of a fluid opening with three lobes that are arranged similarly to the fluid opening in FIG. 3P (i.e., T-shaped), and the widths of the lobes may taper or narrow as the lobes extend outward, and may have a pointed lobe ending. The lengths of the lobes may be about 3 to about 5 times the widths of the lobes. While the fluid openings or nozzles of FIGS. 3M-3R are depicted as having V-grooves, it should be understood that in other variations, there may not be V-grooves. While certain design or manufacturing methods are described herein as examples of generating fluid openings with particular shapes, it should be understood that any design or manufacturing methods may be used as desired, e.g., extrusion techniques, any 3-D printing techniques, and/or laser cutting techniques FIG. 3S depicts another front view of the fluid opening (referred to herein as "fluid opening" or "fluid nozzle") shown in FIG. 3G-3I, having a two-lobed or bi-lobal shape, and FIG. 3T depicts a front view of another variation of a two-lobed or bi-lobal shaped fluid nozzle having a filleted design. The fluid opening of FIG. 3S depicts a central V-groove (338) at the peak of the fluid nozzle, while FIG. 3T depicts a V-fillet (338a) at the peak of the fluid nozzle between the two lobes (332a and 332b), and cut fillets (339a) in place of V-grooves (339). The V-fillet (338a) may be an inwardly curved contour overlapping the peak of the fluid nozzle. This V-fillet (338a) may add a curve to the fluid nozzle (330) such that the shape of the fluid nozzle is more rounded than that of the fluid nozzle (330) of FIG. 3S, e.g., the side lobes of the nozzle in FIG. 3T may have a greater radius of curvature than the side lobes of the nozzle in FIG. 3S. The cut fillets (339a) similarly may be inwardly curved contours along the exterior sections of the fluid nozzle. The filleted fluid nozzle may further facilitate smoother, directed fluid flow, and/or may provide a wider fluid jet. The curves of the filleted fluid opening may reduce or limit fluid turbulence caused by multi-directional fluid flow, especially when the user's mouth is nearly entirely filled with fluid during a cleaning cycle.

Figure 3U:
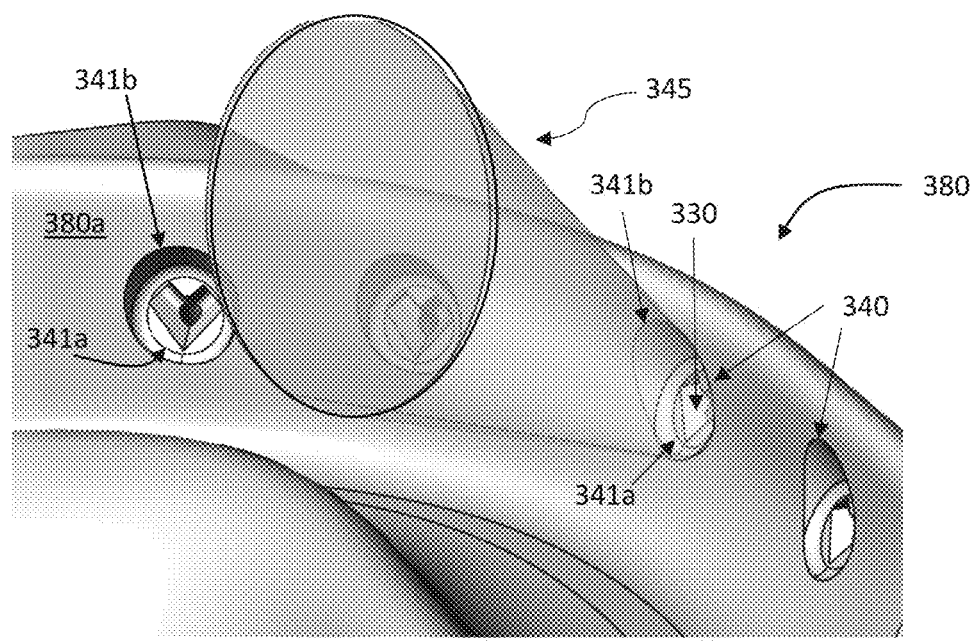
FIGS. 3U-3V depict a side perspective view and a front view, respectively, of a recess having a fluid nozzle opening.

FIG. 3U depicts a perspective view of a portion of an oral insert, depicting a plurality of recesses (340) along the outer surface of the oral insert (380), with a fluid nozzle (330) located within each recess (340). The shape of each recess (340) within the oral insert may be determined at least in part based on a simulated approximation of the spread of a fluid jet from the nozzle, which may be represented by the clearance volume (345). The shape of the recess (340) can then be configured to provide an unimpeded flow of fluid from each fluid nozzle (330). As shown, the recess (340) may have a generally circular, oval, conical, or ellipsoidal shape. FIG. 3U also shows that each recess (340) may have a first end (341a) at the opening of the fluid nozzle (330) located within the recess, and the recess may extend between the first end (341a) and an opening along the outer surface of the oral insert, referred to herein as a second end (341b). The second end (341b) may be flush with the outer surface (380a) of the oral insert (380), such that the second end (341b) aligns with the curvature of the outer surface (380a), while the first end (341a) may be recessed into the inner surface of the oral insert. Additionally, the recess (340) may have one or more concave contours, such that the interior surfaces of the recess are curved inward. The recess may have a flare shape such that a cross-sectional area of the opening along the outer surface (i.e., the second end 341b) is greater than a cross-sectional area of the fluid nozzle opening (i.e., the first end 341a). Additionally, the first end (341a) may have a circular shape, while the opening along the outer surface may have an ellipsoidal shape.

Figure 3V:
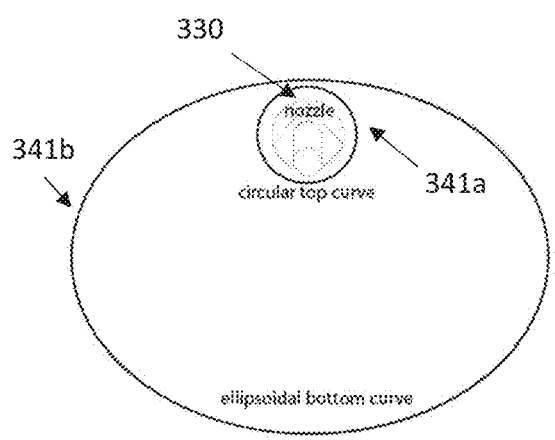

FIG. 3V depicts a front view of a fluid nozzle within a recess. As shown as an example, the first end (341a) of the recess and the second end (341b) may face and be aligned with one another (as shown in FIG. 3U). However, as shown in FIG. 3V, when viewed from a front view perspective, the circular ends may not be concentric. It should be understood that the first end (341a) and the second end (341b) may be provided as concentric circles as may be desirable to better suit the anatomy of a user, for example.

Figure 3W:
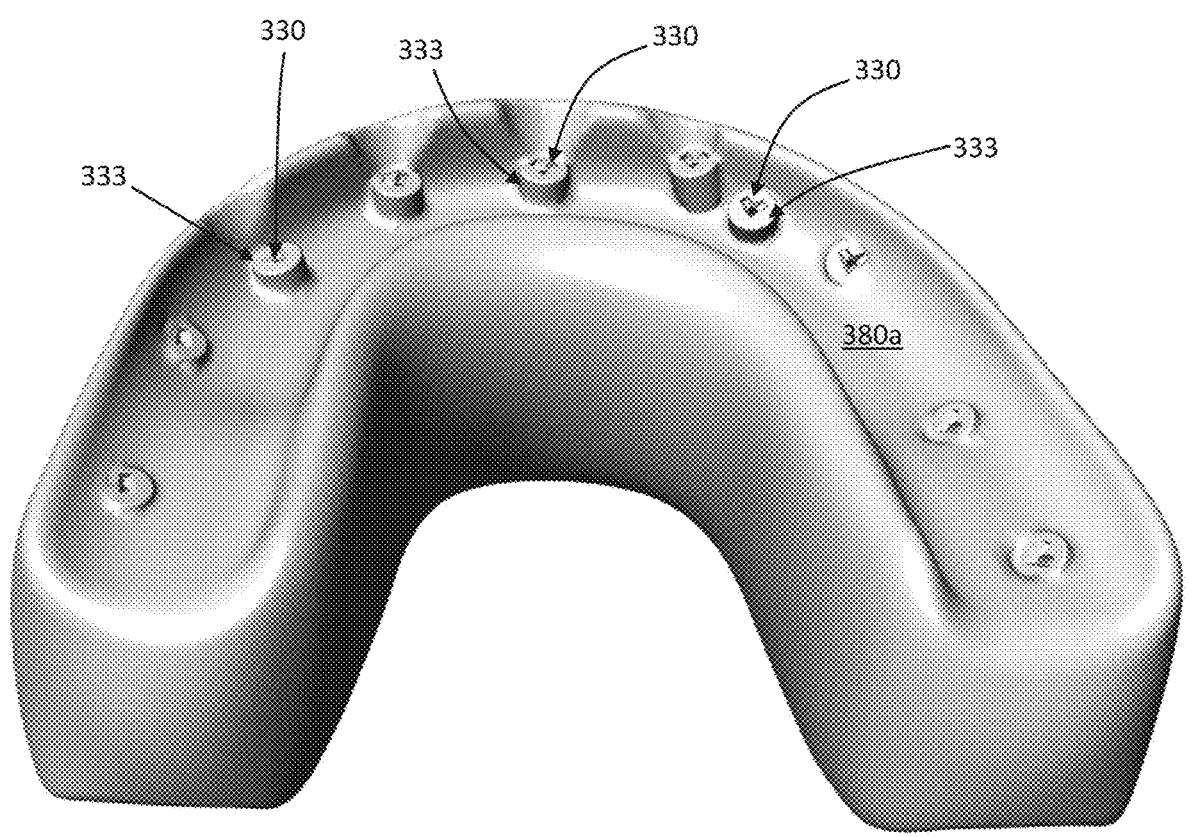
FIG. 3W depicts a posterior, top perspective view of one variation of an oral insert.

FIG. 3W depicts a posterior, top perspective view of one variation of an oral insert. As an example, the fluid nozzles (330) may be located on protrusions (333) that extend from the outer surface (380a).

It should be understood that the fluid openings may also be provided along the outer surface of the oral insert without being recessed into the surface, or protruding from the surface. That is, the fluid openings (330) may be flush with the outer surface (380a) of the oral insert (380).

The rigid substrate of a hybrid oral insert or a rigid mouthpiece may comprise one or more of any of the fluid nozzles described above with a variety of shapes to address and clean different areas of the teeth. Any combination of any of the fluid nozzles described herein may be combined with any number of oral inserts or mouthpieces (e.g., in the same or different troughs of a mouthpiece, etc.), as may be desirable.

Fluid Manifolds

As described above, an oral insert or mouthpiece may comprise one or more fluid manifolds within the internal portion of the oral insert that are in fluid connection with the plurality of fluid nozzles. An individual manifold may regulate fluid flow to a set of nozzles, and may adjust the fluid flow to those nozzles separately from the fluid flow to a different set of nozzles (which may be connected to a different manifold). In some variations, the one or more manifolds of a mouthpiece may be connected to a single fluid inlet (e.g., via a conduit from the handle or base station reservoir). Manifolds may facilitate fluid ingress or egress, as may be desirable. One or more nozzles may be configured to release fluid into the oral cavity should the pressure in the manifold exceed a threshold fluid pressure. These release nozzles may have larger apertures than the non-release nozzles and may be placed such that they simply irrigate the oral cavity while relieving excess manifold pressure. In some variations, fluid nozzles may be distributed across a customizable number of manifolds within an oral insert or mouthpiece in order to accommodate differently-sized mouths and to manage the amount of fluid flowing into the mouth simultaneously. In some variations, a base station may direct fluid into each manifold in phases during the cleaning cycle. The one or more fluid manifolds within the internal portion of the oral insert may terminate at a series of manifold openings in a manifold connector port of the oral insert.

A customized mouthpiece may comprise, for example, an embedded RFID/NFC chip, or any similar identification technology (e.g., 1-WIRE ID® chips), that communicates, to the base station and/or a reader located in a distal portion of the handle, the number of manifolds present in the mouthpiece. This may allow the base station to only direct fluid to existing manifolds. The base station may direct a constant or pulsing (e.g., from about 1 Hz to about 25 Hz), but user-adjustable, flow into each manifold of the mouthpiece. For example, control buttons on the handle and/or base station may allow a user to adjust the fluid pressure to a comfortable level. Fluid pressure may also be reduced for pediatric mouthpieces, or for those with orthodontic appliances. The NFC/RFID chip in the mouthpiece may store patient-specific data (e.g., product use frequency, and/or past, present, or future operational settings data) that may be transmitted to a NFC/RFID reader in the base station and/or handle, and optionally, the base station (e.g., a system controller in the base station) may recommend a fluid flow mode based on patient-specific data (e.g., age, size, preferred fluid flow parameters, compliance metrics, usage metrics etc.). For example, a system controller in the base station may adjust or modify the fluid flow from the reservoir to the oral insert. In some variations, the NFC/RFID chip may include re-writable and/or non-rewritable memory (e.g. OTPROM, EPROM, EEPROM, or flash memory) that may be used to store mode and/or setting information for a particular user. In some variations, this information may be changed or re-written at the end of every use, thus providing an up-to-date record of the most recent mode and/or settings used. This NFC/RFID chip may also be used to track and store product usage information such as a unique patient identification information, mouthpiece serial number and production date, and/or number of treatments that have been performed. Since this information is contained within the oral insert, the insert may then be used with any other compatible base station of a similar oral care system. This may facilitate the portability of the oral insert. By storing a user's preferred settings in the NFC/RFID chip, the user may only need to transport the oral insert (i.e., and not the entire system) when traveling or on holiday. In some variations, the base station may automatically adjust fluid pressure depending on the size of the person's mouth, the number of manifolds in their unique mouthpiece, size and shapes of the manifolds, and the like. Alternatively or additionally, an oral insert or mouthpiece may comprise any of the identification tags or chips described above, with a corresponding reader in the handle and/or base station.

Fluid Effluence Conduit of an Oral Insert

In some variations, an oral insert may comprise a fluid effluence conduit. FIGS. 4A-4D depict one variation of an oral insert (400) comprising a fluid effluence conduit (402) that is configured to direct fluid from a posterior region (404) of the oral insert (which would be seated in a posterior or lingual region of the oral cavity) to an anterior region (408) of the oral insert (which would be located in an anterior or facial region of the oral cavity). The oral insert (400) may be made of a rigid material, and it should be understood that the oral insert (400) may be used with or without an optional conformable and/or elastomeric substrate. The effluence conduit (402) may comprise a central channel (410) and two lateral channels (412a, 412b) that are in fluid communication with the central channel (410). Alternatively, a fluid effluence conduit may comprise a single central channel or port that extends between the posterior region (404) and the anterior region (408) of the oral insert (400). The central channel (410) may comprise an anterior protrusion portion (414) that extends from the curved trough regions (416) of the oral insert that are configured to receive the user's teeth. In some variations, the entire central channel (410) may protrude from the trough regions (416). The central channel may be U-shaped such that each side of the U-shape is in communication with one of the lateral channels (412a, 412b). The internal wall of the central channel (410) may comprise one or more centrally-directed curves to merge fluid flow toward the mid-line or center of the mouthpiece. In some variations, the cross-sectional profile of the effluence conduit may be an oblong shape with a relatively low height-to-width ratio so that the user does not have to open their mouth uncomfortably wide in order to insert the mouthpiece, while having a sufficient cross-sectional fluid flow area to permit egress of a relatively large fluid ingress during an oral cleaning session.

Figure 4A:
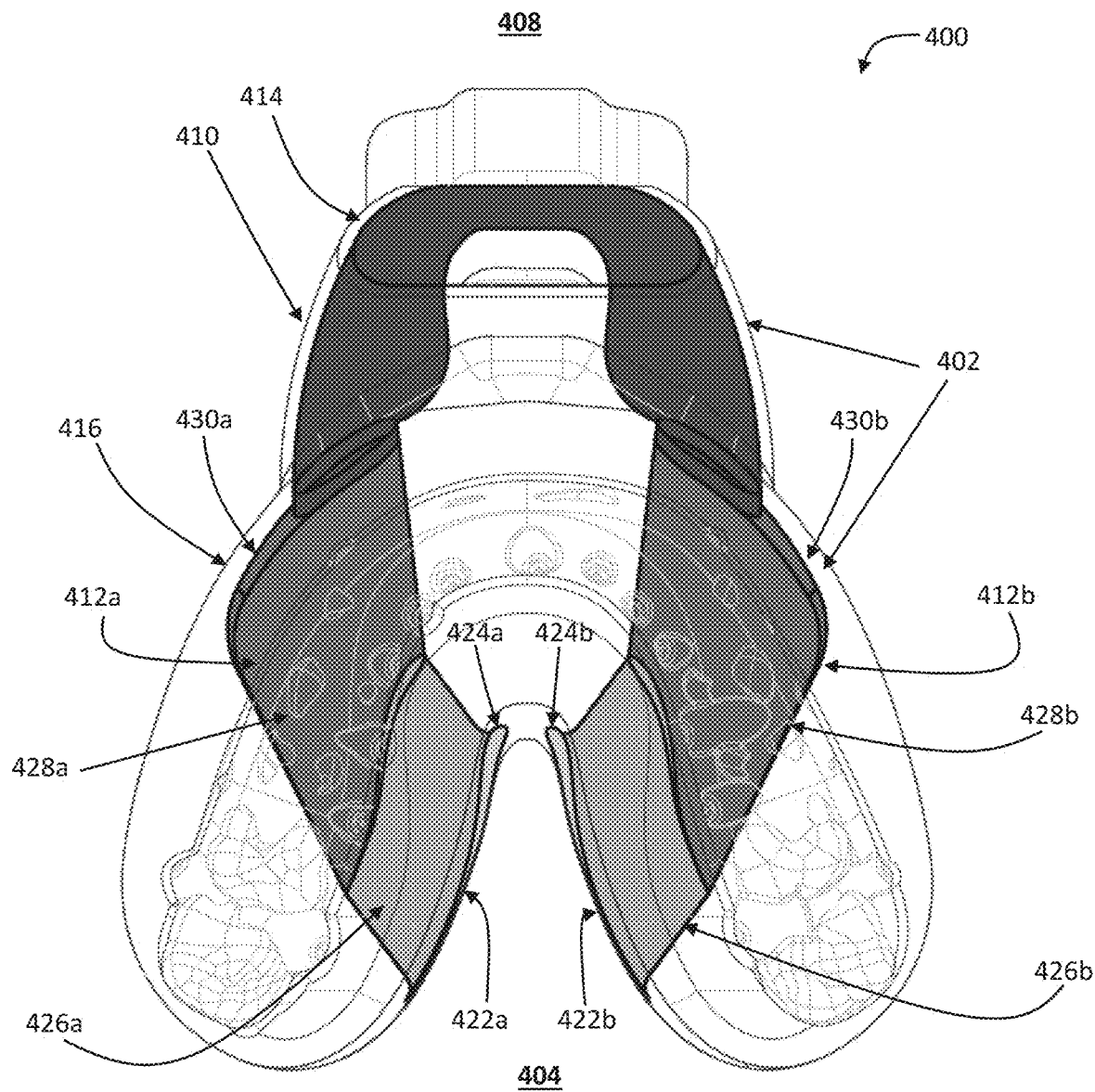
FIG. 4A depicts a top partial cutaway view of one variation of an oral insert.
Figure 4B:
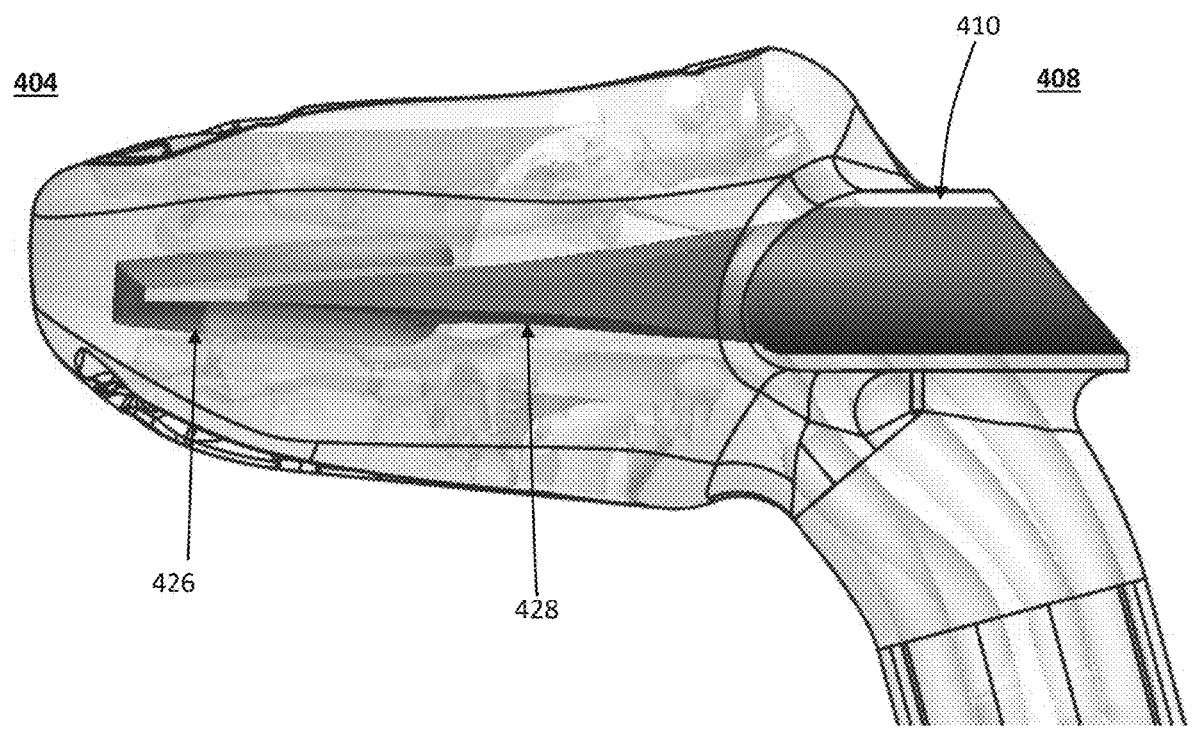
FIGS. 4B-4C depict side partial cutaway views of the oral insert of FIG. 4A.

In one variation, the lateral fluid cavity may comprise regions of varying size and geometry. For example, the lateral fluid cavities or channels (412a, 412b) may each have a posterior swept section (426a, 426b) that has a substantially constant cross-sectional geometry, and an anterior lofted section (428a, 428b) that has a cross-sectional geometry that gradually increases in size toward the anterior region of the oral insert. For example, the width of the anterior lofted section (428a, 428b) may gradually increase toward the anterior region of the oral insert. The anterior lofted section may also comprise centrally-directed contours (430a, 430b) to direct fluid flow toward the central channel (410). FIG. 4B depicts a side view of the oral insert of FIG. 4A. The fluid effluence conduit (402) is located between the upper (maxillary) portion and lower (mandibular) portion of the oral insert. This may promote the drainage of fluid from the fluid nozzles of the upper and lower portions of the oral insert into the lateral fluid channels of the effluence conduit. The overall height of the effluence conduit (402) increases from the posterior region (404) to the anterior region (408), as the fluid streams are combined together toward or within the central channel (410).

Figure 4C:
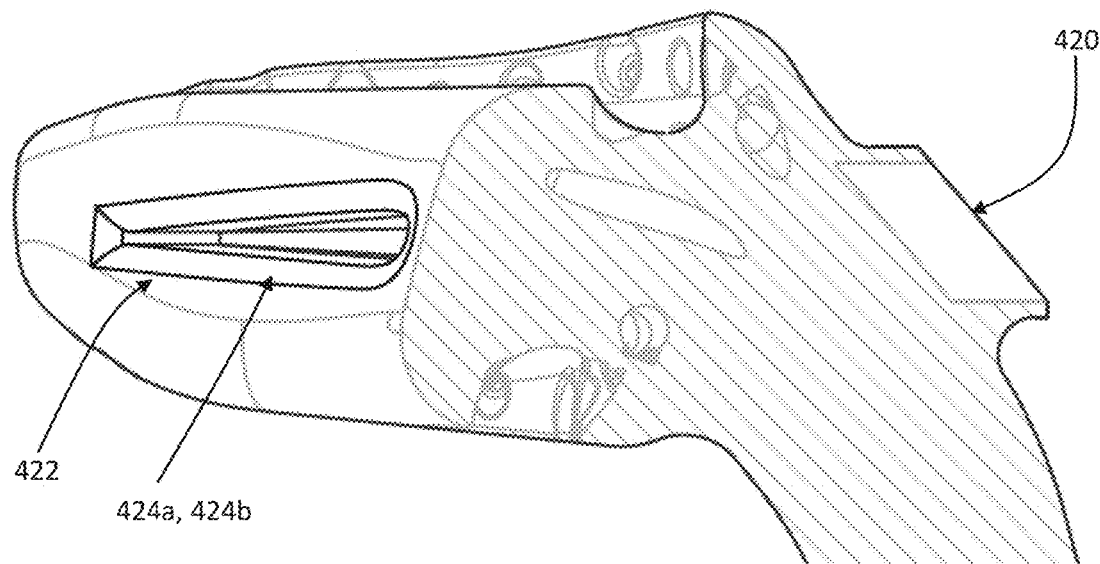
Figure 4D:
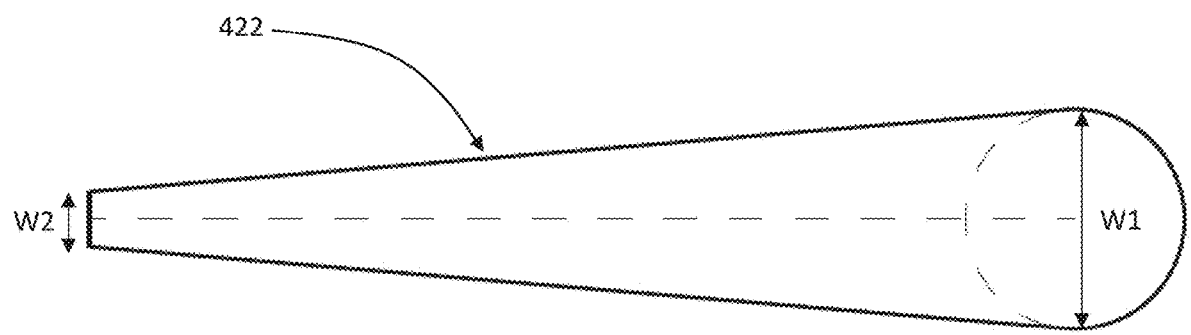
FIG. 4D depicts a cross-sectional view of one variation of a posterior opening of an oral insert.

The central channel (410) may terminate at an anterior opening (420) and each of the lateral or side fluid cavities or channels (412a, 412b) may be connected to a posterior opening (422a, 422b). The surface of the oral insert around the perimeter of the anterior opening and/or the posterior openings may have one or more concave or convex contours. For example, as depicted in FIGS. 4A and 4C, the perimeters of the posterior openings (422a, 422b) may comprise one or more concave and/or convex contours that may help to ease or reduce the fluid pressure gradient (e.g., pressure drop) as fluid flows from the posterior oral cavity region into the posterior openings of the oral insert. In some variations, the perimeter of the posterior openings may be curved, where the curved lip (424a, 424b) may facilitate the flow of fluid into the lateral fluid cavities or channels. The shape of the posterior openings (422a, 422b) may also be selected to facilitate the flow of fluid into the lateral fluid cavities or channels. FIG. 4D depicts a cross-sectional view of one variation of a posterior opening (422). The posterior openings (422) has a tapered shape, where the region having the largest width (W1) is located toward the center of the oral insert and the region with the smallest with smallest width (W2) is located laterally.

Figure 4E:
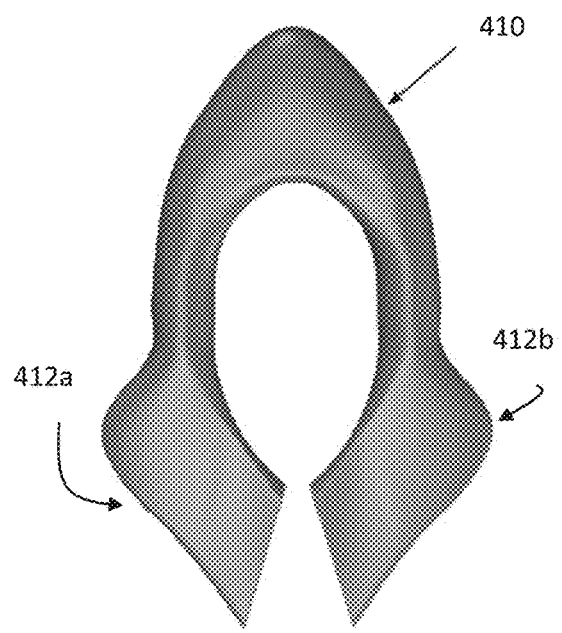
FIGS. 4E-4H depict three top views and a posterior view, respectively, of other variations of a portion of the fluid effluence conduit of a variation of an oral insert.
Figure 4F:
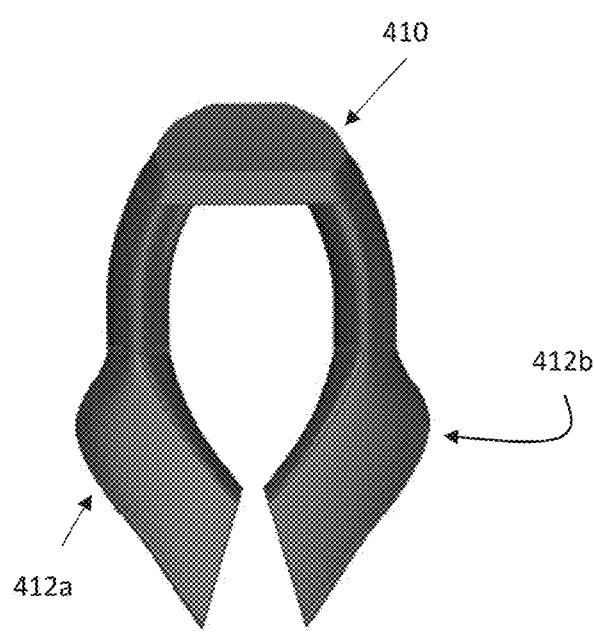
Figure 4G:
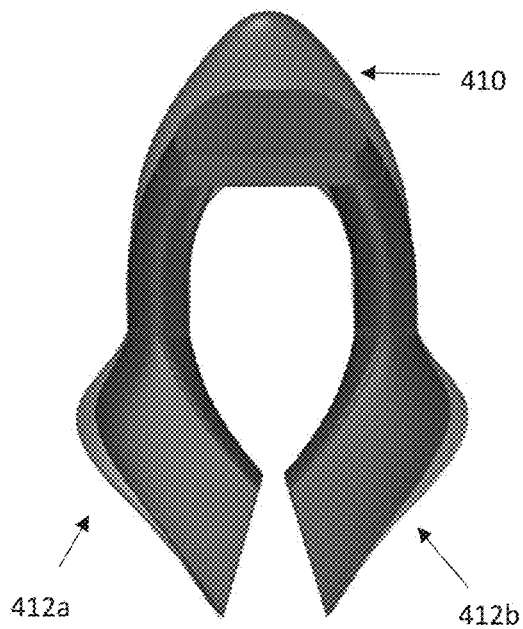

FIGS. 4E-4G depict three top views and a posterior view, respectively, of other variations of a portion of the fluid effluence conduit (402a, 402b, 403c), having channels for fluid flow. The fluid effluence conduits, also referred to herein as fluid effluence ports, include channels. For visual clarity, only the side channels (412a, 412b) and the central channel (410) are shown in FIGS. 4E-4G. However, it should be understood that the channels shown herein may be integral with the other portions of the fluid effluence conduit as shown, for example, in FIGS. 4I-4N, which are described in further detail hereinafter.

Figure 4H:
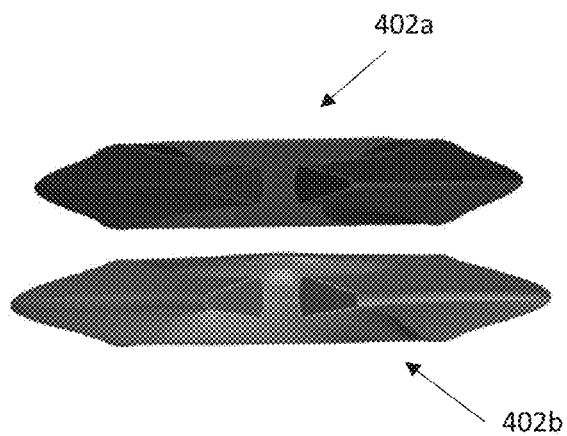

As previously described, the fluid effluence conduits may include side channels (412a, 412b) that merge together on an anterior side (404) to form the central channel (410). The side channels may be provided in a wide arch (FIG. 4E) or a narrow arch (FIG. 4F, 4G), which can be seen more clearly in the posterior view shown by FIG. 4H. FIG. 4H depicts a wide arch channel configuration (402a) and a narrow arch channel configuration (402b).

It should be understood that the width and shape of the fluid effluence channels may be customized to more comfortably fit a user's dental anatomy, or the size, shape, and width of the fluid effluence port may be selected from library of predetermined widths in order to best suit a user, or to facilitate a desirable rate of fluid flow, such as, for example, facilitating a rapid egress of fluid from the user's mouth, or directing fluid more efficiently into a collection chamber.

Figure 4I:
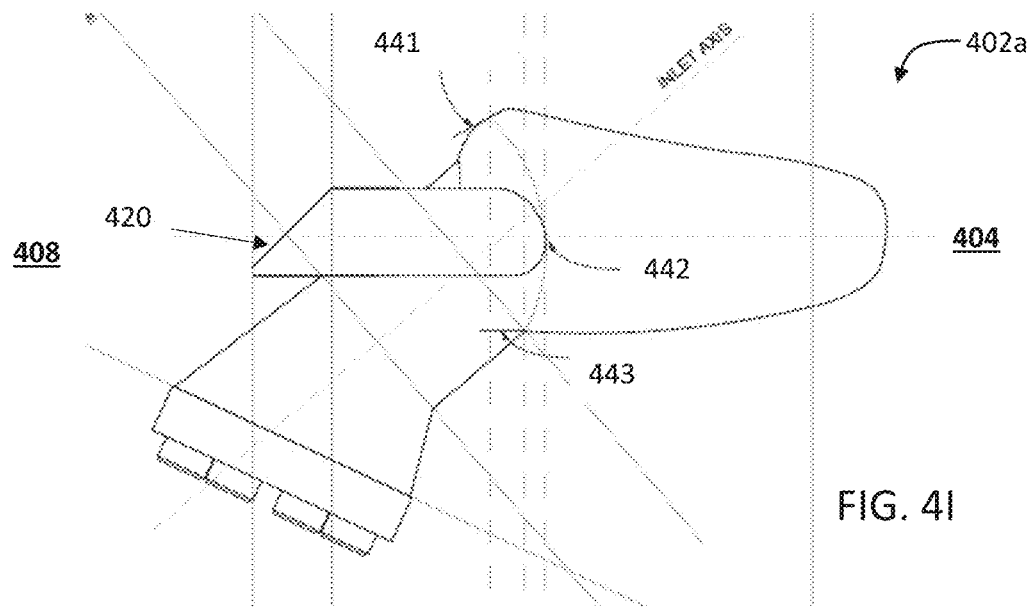
FIGS. 4I-4K depict side views of variations of a fluid effluence conduit having a variety of top and bottom curvatures.
Figure 4J:
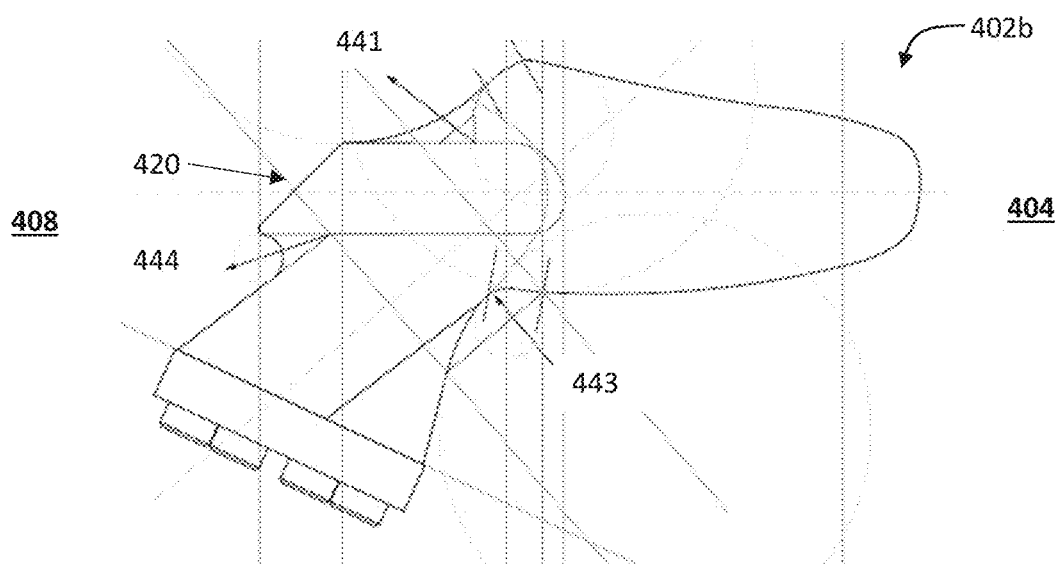
Figure 4K:
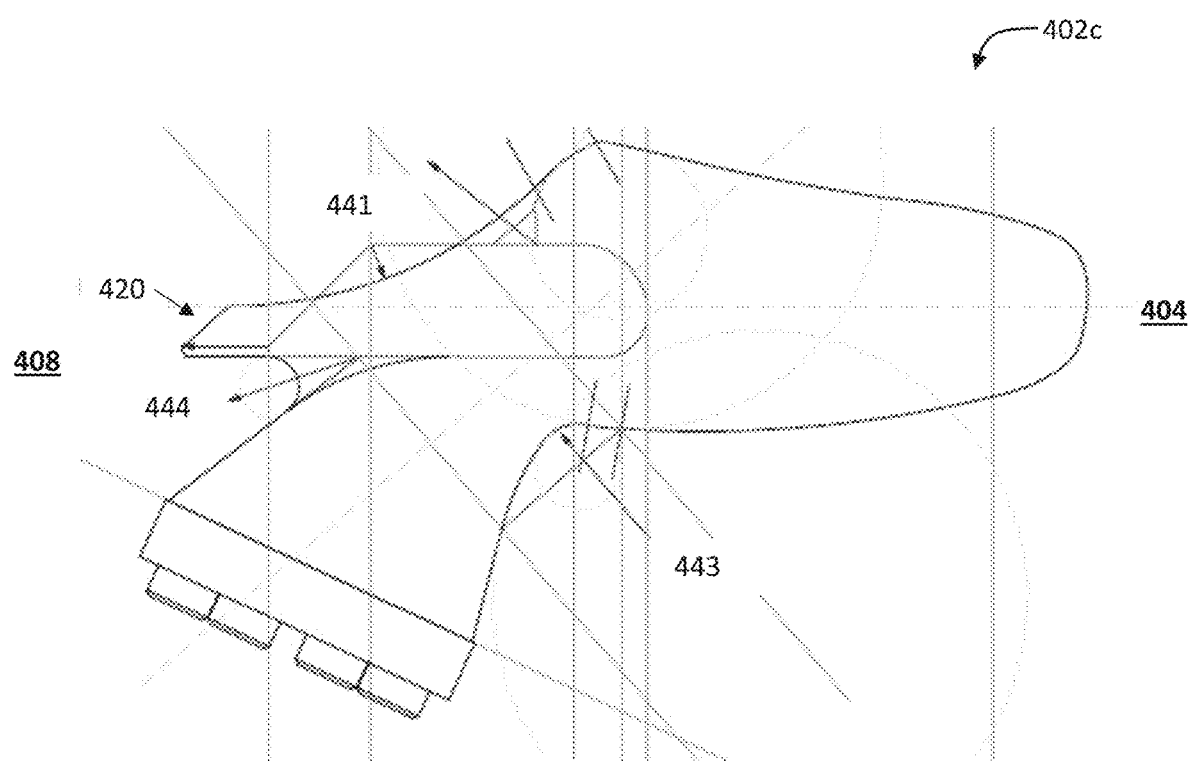

FIGS. 4I-4K depict side views of variations of a fluid effluence conduit (402a, 402b, 402c) having a variety of top and bottom exterior surface curvatures. Again, as in the fluid effluence conduits depicted in FIGS. 4E-FH, the fluid effluence conduits may be configured to direct fluid from an anterior region (404) of the oral insert to a posterior region (408) of the insert. Fluid may then exit from an anterior port (420). The fluid effluence conduit may include several surfaces for the sealing of a user's lips to the conduit, such that a tight seal is formed and fluid is not spilled from the user's mouth during use of the oral care system. For example, the curvature of the surfaces may narrowed or tapered towards the sides that are to be sealed by the sides of a user's lips, which may be closer together than the lips at the front of the user's face, where the curvature of the surfaces may be more rounded than the side curvatures. The surfaces may also include grooves or a plurality of grooves to more closely match the contours of a user's lips, such that the user's lips maintain continuous (or nearly continuous) contact with the surface of the oral insert. The conduit may, for example, include an upper lip seal surface (441) a side lip seal surface (442), and a lower lip seal surface (443). These surfaces may be provided in various curvatures and contours configured to follow the anatomy of a user's lips such that a user may more easily and comfortably seal their lips around the conduit without spilling fluid during use. Variations of these surfaces are depicted in FIGS. 4I-4K, for example.

FIG. 4J depicts an upper lip seal surface (441) that has a curvature from the top of the conduit to the anterior port (420). As an example, the upper lip seal surface may include a higher rounded area towards the middle of the surface as compared to the sides of the upper lip seal surface, to more closely match the anatomy of a user's lips. Similarly, the lower lip seal surface may include a lower rounded area towards the middle of the surface as compared to the sides of the lower lip seal surface, to more closely match the anatomy of a user's lips. The conduit also includes a curvature (444) below the anterior port which may aid in fluid flow egress from the conduit, or may also aid in the user gripping the conduit, for example. Also shown is a flat surface provided at the lower lip seal surface (443), which may provide a more effective, comfortable, or seal to fit certain users' facial anatomy.

FIG. 4K depicts a conduit having a continuous contour from the upper lip seal surface (441) to the anterior port (420), and a flat surface provided at the lower lip seal surface (443). Again, these various curvatures and contours may provide a more effective, comfortable, or tight seal to fit certain users' facial anatomy.

Figure 4L:
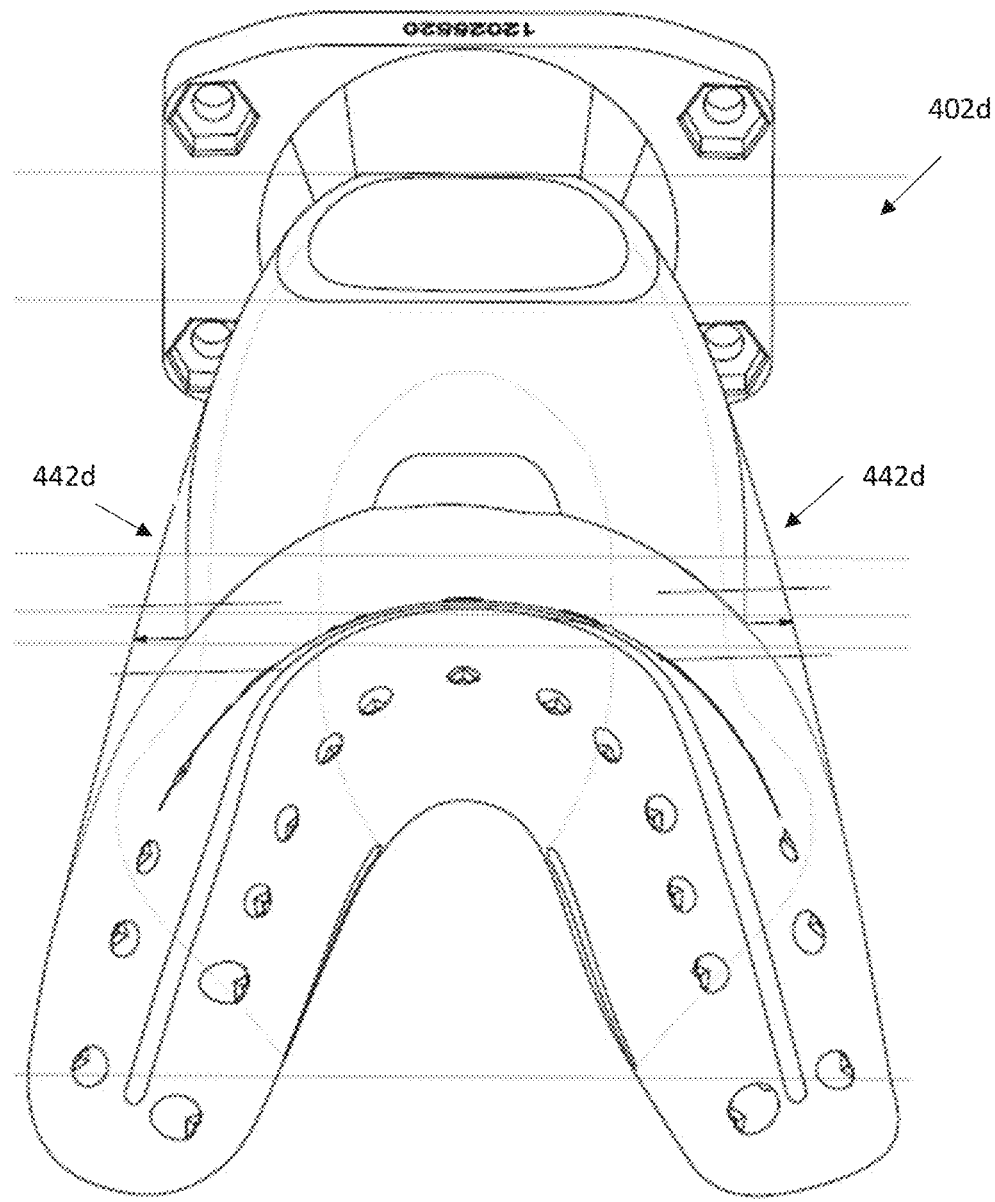
FIGS. 4L-4N depict top views of variations of fluid effluence conduits having a variety of side curvatures.
Figure 4M:
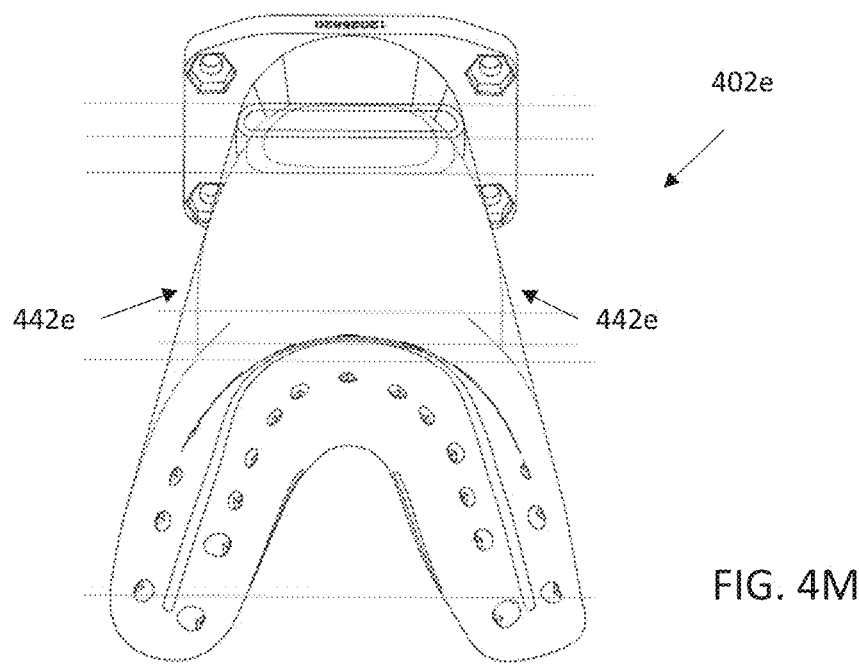
Figure 4N:
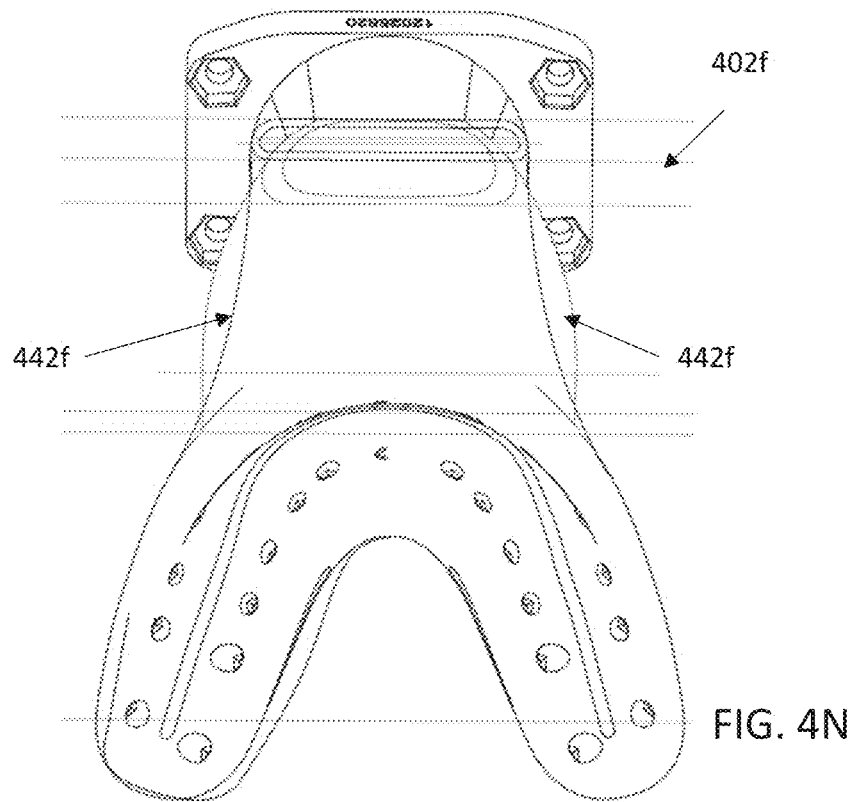

FIGS. 4L-4N depict top views of variations of fluid effluence conduits (402d, 402e, 402f) having a variety of side curvatures configured to provide a secure seal between the lips of the user and the fluid effluence conduit. The side curvatures may be provided at the side lip seal surfaces of the conduits, and may be provided at the left and right sides of the conduit.

FIG. 4L depicts a conduit (402d) having slightly rounded side lip seal surfaces (442d). These surfaces may therefore have a slight convex shape. FIG. 4M depicts a conduit (402e) having generally straight surfaces (442e) from the anterior region to the posterior region of the conduit. FIG. 4N depicts a conduit (402f) having side lip seal surfaces (442f) being curved inwards towards the interior of the conduit. These surfaces may therefore have a concave shape.

It should be understood that the various top and bottom curvatures and contours of the fluid effluence conduits depicted in FIGS. 4I-4K may be combined with the side curvatures and contours depicted in FIGS. 4L-4N in any combination that may be desirable to best suit a user's anatomy, or to promote a desirable or efficient fluid flow. It should also be understood that other suitable shapes, curvatures, or contours may be provided on the various surfaces of the conduit used for sealing a user's lips to the conduit. The selection of the side lip seal, upper lip seal, and lower lip seal surfaces may generally facilitate an efficient fluid flow from the conduit, while providing comfort and a tight seal to the user.

Oral Insert-Handle Attachment Mechanisms and Locking Mechanisms

The oral care systems described herein may also comprise a securing or attaching mechanism to removably couple together a mouthpiece (i.e., oral insert) and a handle. The oral insert and handle may be coupled or attached together in various ways. For example, the handle may include an attachment mechanism configured to detachably retain the oral insert. The attachment mechanism may facilitate ease of attachment and removal, such that various oral inserts may be usable with the same handle, for example. To facilitate the removable coupling of the oral insert and the handle, the oral care system may be provided with an attachment mechanism having an oral insert portion and a handle portion, wherein the oral insert portion is configured to couple with and lock to the handle portion. The lock may then be unlocked to separate the oral insert portion and the handle portion.

An attachment mechanism may be provided as portions that are removably coupled. These portions may be a female portion and a male portion, wherein the male portion includes at least a protrusion, and the female portion includes a cavity, recess, or groove that is configured to receive and retain the protrusion of the male portion. In some variations, the male portion includes any element that is received by the female portion. In some variations, the oral insert portion may be provided as a female portion of the attachment mechanism, and the handle portion may be provided as a male portion of the attachment mechanism. In some variations, the oral insert portion may be provided as a male portion of the attachment mechanism, and the handle portion may be provided as a female portion of the attachment mechanism.

The portions of the attachment mechanism may connected to the handle and to the oral insert with a variety of suitable mechanisms, such as, for example, welding, adhesives, screws, heat-staking, snap-fits, rivets, ultrasonic welding, interference fit, radial or axial pins, push-nuts, nut and bolt engagement, and/or the like. As another example, the handle and/or the oral insert may be constructed to be integral with a portion of the attachment mechanism.

Figure 11A:
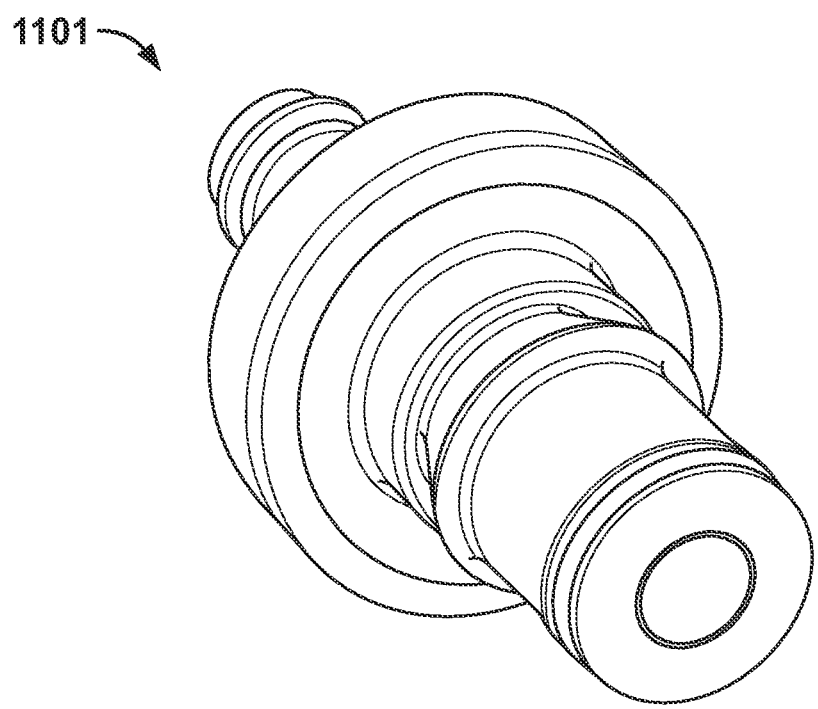
FIGS. 11A-11B depict a variation of a corresponding male and female portions, respectively, for an oral insert-handle attachment mechanism using a push button release.
Figure 11B:
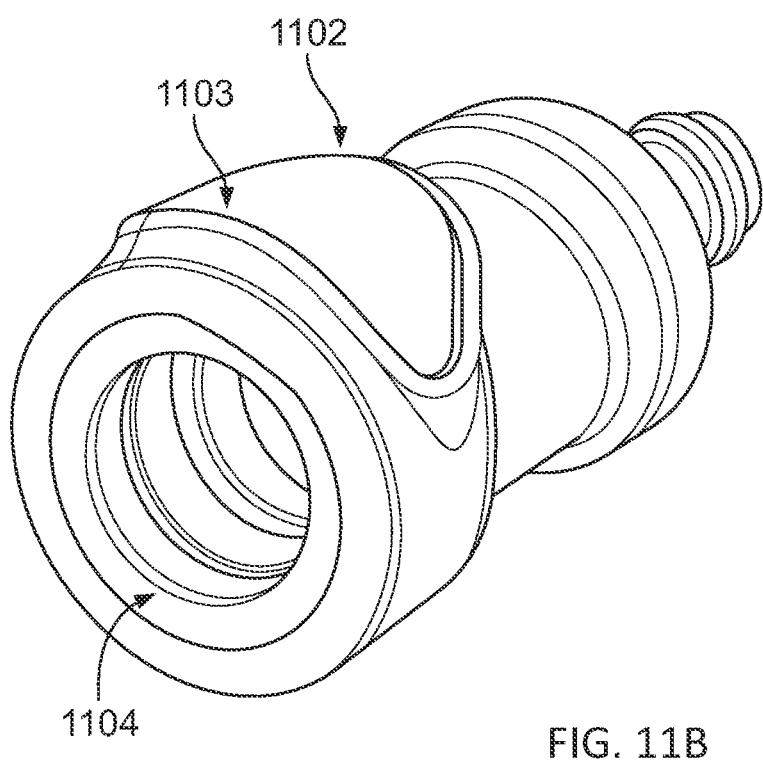

FIGS. 11A-11B depict a variation of a corresponding male portion (1101) and a female portion (1102), respectively, for an oral insert-handle attachment mechanism using a push button release. The push button attachment mechanism may facilitate a quick connection and unlocking by the user, by requiring the push of button (1103) to attach and to detach the male and female portions. The push button attachment mechanism may allow for the inclusion of one or more radial seals (1104) to more securely hold the portions together and prevent fluids from entering into the interior of the handle, and/or leaking out of the handle, for example.

Figure 11C:
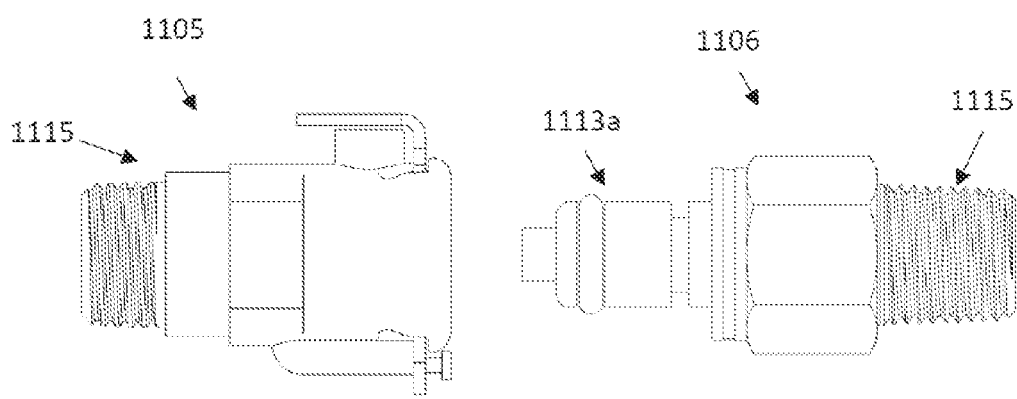
FIG. 11C depicts a side view of another variation of corresponding female and male portions, respectively, for an oral insert-handle attachment mechanism using a sliding latch release attachment mechanism.

FIG. 11C depicts a side view of another variation of corresponding female (1105) and male (1106) portions, respectively, for an oral insert-handle attachment mechanism using a sliding latch release. FIGS. 11D-11E depict perspective views of the female (1105) and male (1106) portions, respectively, of the sliding latch release attachment mechanism. FIG. 11F depicts a front view of the female (1105) portion of the sliding latch release attachment mechanism. The male portion (1106) may include a protrusion (1113a), which may be received by the female portion (as best seen in FIG. 11D). The female portion (1105) may be provided with a hole (1113b) with a sliding latch (1107), which may further include a receiving slot (1113c) for more securely holding the protrusion (1113a) of the male portion. In the view shown in FIG. 11D, the sliding latch (1107) may move up and down to engage the lock (1109). The edges of the sliding latch (1107) may engage a groove (1108) in the mating portion in order to lock the two portions together. As an example, the lock (1109) may include a spring-loaded lock pin for engagement with the male portion (1106), which may include a lock engagement groove (1110). Both the female (1105) and male (1106) portions may include screw threads (1115) for attaching each portion to either the oral insert or the handle, for example. The spring-loaded lock pin may also be automatically activated (initiating the motion, and subsequent locking, of the latch into the groove on the male side) via the axial motion of the two portions relative to each other, wherein the face of the male portion (1106) depresses the pin, releasing the sliding latch so that it may slide into the groove as the portions are coupled together.

Figure 11G:
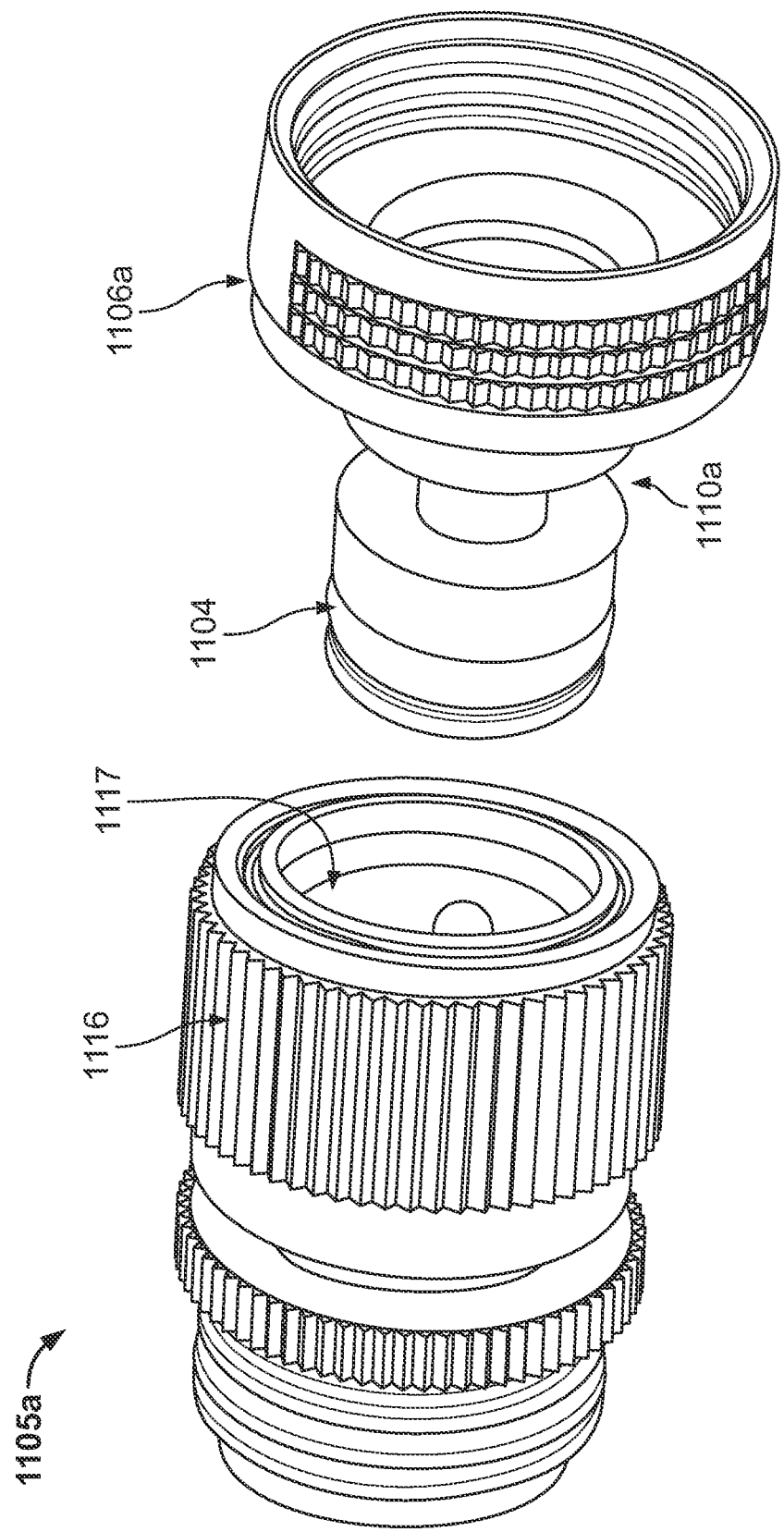
FIG. 11G depicts an exploded view of another variation of corresponding female and male side portions, for a mouthpiece-handle attachment mechanism using a hose quick coupling or sleeve latch attachment.

FIG. 11G depicts an exploded view of another variation of corresponding female (1105a) and male (1106a) portions, for an oral insert-handle attachment mechanism using a hose quick coupling or sleeve latch attachment. The hose quick coupling or sleeve latch attachment may also allow for the use of one or more radial seals (1104), as described above. This attachment mechanism may be operated in a variety of ways. In one variation, the ring (1116) on the female portion (1105a) may be manually retracted by hand in a horizontal or lateral direction, and the male portion (1106a) inserted into the female portion, and the ring (1116) released in order to revert the ring to its original position to fit over and engage a groove (1110a) on the male portion and lock the portions together. To disconnect the two portions, the ring may be retracted from the groove (1110a) In another variation, the male portion (1105b) may be coupled with a female portion without engagement of the ring. A latching may result automatically from the insertion of the male portion (1106a) into the female portion (1105a), such as by engagement of a groove (1110a) on the male portion with the interior wall (1117) of the female portion, which may create a seal with the inserted male portion. Release of the male portion from the female portion in this variation may be accomplished in any suitable manner, such as by pushing a release button, or pulling back a collar. A release button may, for example, cause a lateral motion of the male portion from the female portion, disengaging the groove (1110a) from the female portion. Pulling back a collar, for example, may also laterally move the female portion from the groove (1110a).

Figure 11H:
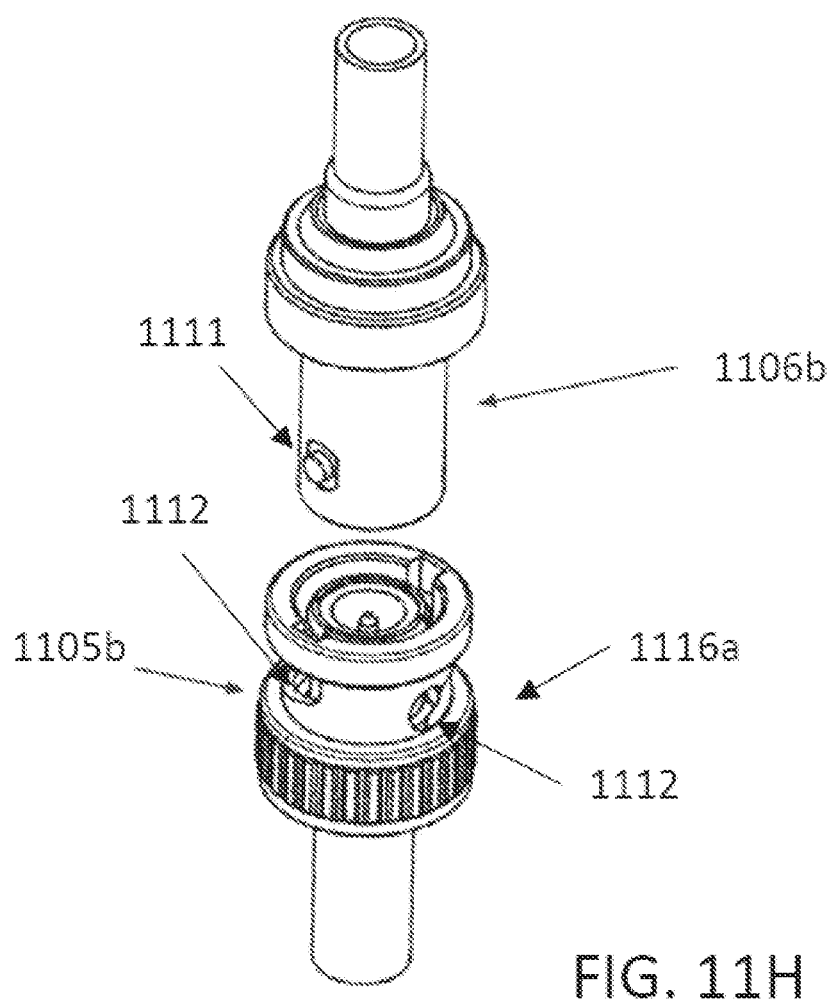
FIG. 11H depicts an exploded view of another variation of corresponding female and male side portions, for a mouthpiece-handle attachment mechanism using a bayonet-style lock.

FIG. 11H depicts an exploded view of another variation of corresponding female (1105b) and male (1106b) portions, for an oral insert-handle attachment mechanism using a "bayonet style" lock. In one variation, one portion, such as the male portion (1106b), includes two or more protruding pins (1111), and the second portion, such as the female portion (1105b), includes a rotating ring (1116a), referred to herein as a ring or collar, having at least the same number of receiving grooves and the number of protruding pins. The receiving grooves (1112) may be substantially L-shaped, having a vertical portion and a horizontal portion. Once the pins are inserted all the way into the grooves, the collar can rotate, either automatically with a spring or the like, or manually. The groove can also include a notch, such as at the end of the horizontal portion of the L-shape of the groove, to aid in retention of the pins. A compliance mechanism, which may include a spring such as a torsional spring or an axial spring, may be included for the operation of the bayonet style lock. A torsional spring may act to rotate the collar (1116a) over the pin (1111), and an axial spring may act by pulling the collar (1116a) down against the pins, such that they are held firmly in place within the receiving grooves (1112). The release of the bayonet style lock may be achieved by rotating the collar (1116a) such that the pins (1111) are aligned with a vertical portion of the grooves (1112), thus allowing the male portion (1106b) to be able to be removed axially.

It should be understood that the female and male side portions as described above may be used for either the oral insert side or the handle side portion of the attachment mechanism. It should also be understood that, while the oral insert and the handle may be provided as portions that may be removably coupled, the oral insert and the handle may also be provided as permanently locked pieces. In a permanently locking arrangement, the use of the oral care system may be simplified for some users, such that portions of the system do not require assembling, coupling, or removal and reattachment prior to use. The permanently locking arrangement may be provided such that an oral insert can first be attached into the handle portion, and the two portions may then be permanently mated or locked together.

Figure 17:
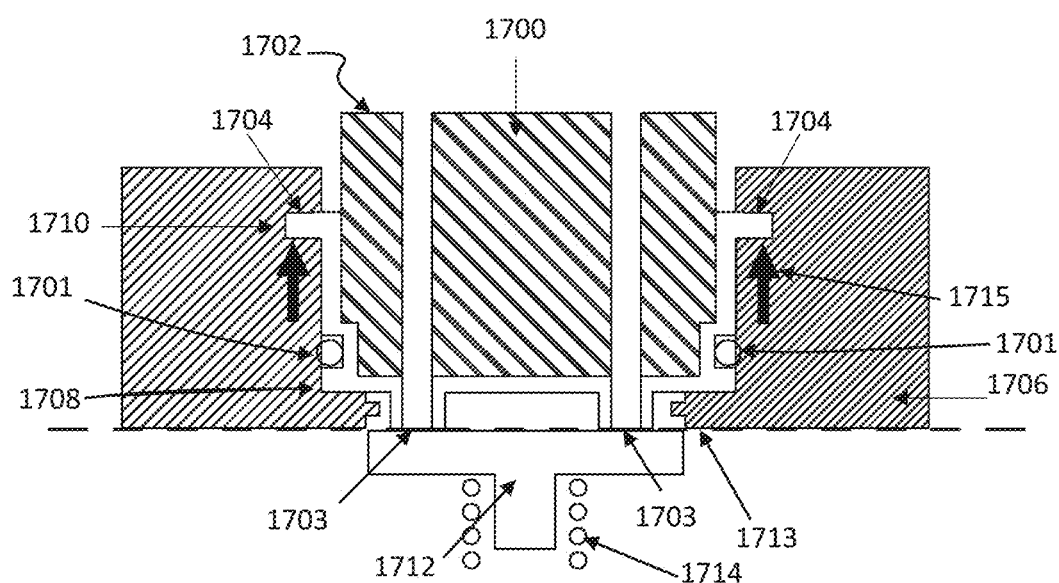
FIG. 17 depicts a cross-sectional view of a block representation of one variation of an oral insert-handle attachment mechanism.

In some variations, the attachment mechanism for releasably attaching the oral insert or mouthpiece to the handle may comprise one or more springs that may be configured to securely engage the oral insert with the handle. In addition to facilitating the engagement between the oral insert and the handle, the one or more springs may also be configured to help provide a water-tight engagement between the fluid switcher assembly and the manifold connector of the oral insert. One variation of an oral insert-handle attachment mechanism is schematically depicted in FIG. 17. The oral insert or mouthpiece (1700) may comprise a manifold connector (1702) and one or more pins (1704) located about the outer perimeter of the manifold connector (1702). For example, there may be two pins (1704) protruding from the outer perimeter of the manifold connector (1702) and they may be located radially opposite each other. The pins on the manifold connector of the oral insert may comprise a male portion of the attachment mechanism. Optionally, there may be a seal or a gasket (1701) located around the outer perimeter of the manifold connector in proximity of the manifold openings (1703) of the manifold connector. The attachment mechanism on the handle (1706) may comprise a recess (1708) sized and shaped to retain the manifold connector (1702), one or more vertical grooves (not shown) within the walls of the recess (1708) at locations that correspond with the locations of the one or more pins (1704), and a horizontal groove (1710) that intersects the bottom of the vertical grooves. The recess (1708) and the vertical and horizontal grooves may comprise a female portion of the attachment mechanism. The oral insert may be releasably engaged with the handle by aligning the pins (1704) with the vertical grooves of the recess (1708), pushing the manifold connector (1702) into the recess (1708) by sliding the pins along the vertical grooves until the pins reach the intersection of the vertical and horizontal grooves, and then twisting the manifold connector (1702) such that the pins slide along the horizontal groove (1710) away from the vertical grooves until they reach a stop (e.g., that limits further horizontal or twisting motion). When the oral insert is engaged with the handle, the manifold openings (1703) may be aligned with the openings of a manifold block of the handle fluid switcher assembly, or, as in the variation depicted in FIG. 17, the manifold openings (1703) may be in contact with a rotor (1712) of the handle fluid switcher assembly. As described further below, the rotor (1712) may comprise one or more fluid apertures that are configured to sequentially align with the manifold openings (1703) of the manifold connector as it rotates. In some variations, the fluid switcher assembly may comprise a spring (1714) that is located about a shaft of the rotor (1712). In the variation of FIG. 17, the rotor is a flat plate rotor attached to a vertical shaft. The spring (1714) may be disposed between the flat plate of the rotor and a rotatable bearing (not shown) that allows the spring (1714) to rotate with the rotor. When the oral insert is engaged with the handle, the manifold connector pushes against and compresses the spring (1714), i.e., with a downward force. The spring exerts an opposite force, i.e., an upward force, represented by arrows (1715), that presses the pins (1704) against the walls of the horizontal groove (1710). This spring force may additionally secure the oral insert within the recess of the handle. One or more seals or gaskets (1713) may be located on the edges or surfaces of the manifold openings (1703) and/or fluid aperture of the rotor (1712), and the upward spring force may help increase the contact pressure along the sealing surface. This may help maintain a water-tight seal between the oral insert and the handle. In this variation, the upward force of the spring (1714) may facilitate both the secure engagement of the oral insert to the handle and reinforce a water-tight interface between the rotor and the manifold connector.

When the oral insert is removed from the handle (e.g., by twisting the oral insert until the pins align with the vertical grooves and then pulling the oral insert out by sliding the pins along the vertical grooves away from the horizontal groove), the spring (1714) may press the flat plate upward. In some variations, the recess (1708) may comprise a protrusion (1716) along the inner surface of the recess that limits the upward travel of the flat plate in the absence of an oral insert. Optionally, the portion of the recess below the protrusion (1716) may have an increased coefficient of friction so that rotor rotation may be impeded when the handle is not attached to an oral insert.

Fluid Switcher Assembly

Fluid from the reservoir (which may be pressurized by a system pump) may be directed through a fluid regulator that controls the flow across the one or more fluid manifolds in the oral insert. For example, the fluid regulator may direct fluid to one manifold at a time (e.g., sequentially) and/or may direct fluid to two or more manifolds at a time. In some variations, the fluid regulator may comprise a fluid switcher assembly that controls the delivery and distribution of the fluid to the oral insert manifolds. A fluid switcher assembly may comprise a motor and a switcher connected to the motor, such the motion of the switcher by the motor determines the delivery of fluid to the manifolds. In some variations, the fluid switcher assembly may comprise a rotor such as a rotary valve. Alternatively or additionally, a fluid switcher assembly may comprise a solenoid valve or fluid turbine. Changing the relative position of the switcher and the fluid manifolds using the motor may change the fluid flow through the manifolds. The switcher may comprise a valve having a cylindrical piston or barrel within a tubular fluid conduit, where the barrel may rotate within the tubular fluid conduit to allow fluid to flow to certain manifolds based on the alignment of fluid slot(s) or aperture(s) of the barrel with the manifolds. Alternatively, the switcher may comprise a valve having a cylindrical piston or barrel that is configured to translate linearly along a tubular fluid conduit. The piston or barrel may comprise a fluid slot or aperture and as the piston or barrel is rotated within, or linearly translated along, the tubular fluid conduit, the fluid aperture may align with a fluid manifold (or a subset of manifolds linearly arranged along the fluid conduit), thereby allowing fluid to flow to that manifold (or that subset of manifolds) and not the others. In some examples, the piston or barrel may comprise a fluid channel terminating at an aperture, and as the piston or barrel is rotated within the tubular fluid conduit, the fluid aperture may align with a fluid manifold (or a subset of manifolds radially arranged around the fluid conduit circumference), thereby allowing fluid to flow to that manifold (or that subset of manifolds) and not the others.

Alternatively or additionally, the switcher may comprise a rotor that is rotated by the motor. The rotor may comprise a rotatable flat plate with a fluid slot or aperture. The fluid switcher assembly may be configured to directly engage with the manifold connector of an oral insert or may indirectly engage with the manifold connector via an intermediate fluid component, such as a manifold block that has a plurality of fluid channels that are configured to be aligned with the manifold openings in the manifold connector. As the motor rotates the rotor, the fluid aperture is sequentially aligned with different manifold openings, thereby allowing fluid to flow to those manifolds. In some variations, the switcher (e.g., barrel, piston, and/or flat plate) may have a second fluid aperture such that two manifolds may receive fluid flow simultaneously. The number of fluid apertures in the switcher and/or the relative size of the fluid apertures and the manifold openings and spacing, as well as the motor speed, may be tuned to attain a desired pulsatile fluid flow. In addition, one or more water-tight seals or gaskets may be located at junctions between the components of the fluid switcher assembly to limit or reduce any fluid leakage. The handle attachment mechanism that releasably retains the oral insert via the manifold connector may also have one or more water-tight seals or gaskets to help reduce fluid leakage along the fluid pathway from the reservoir to the oral insert.

Figure 12A:
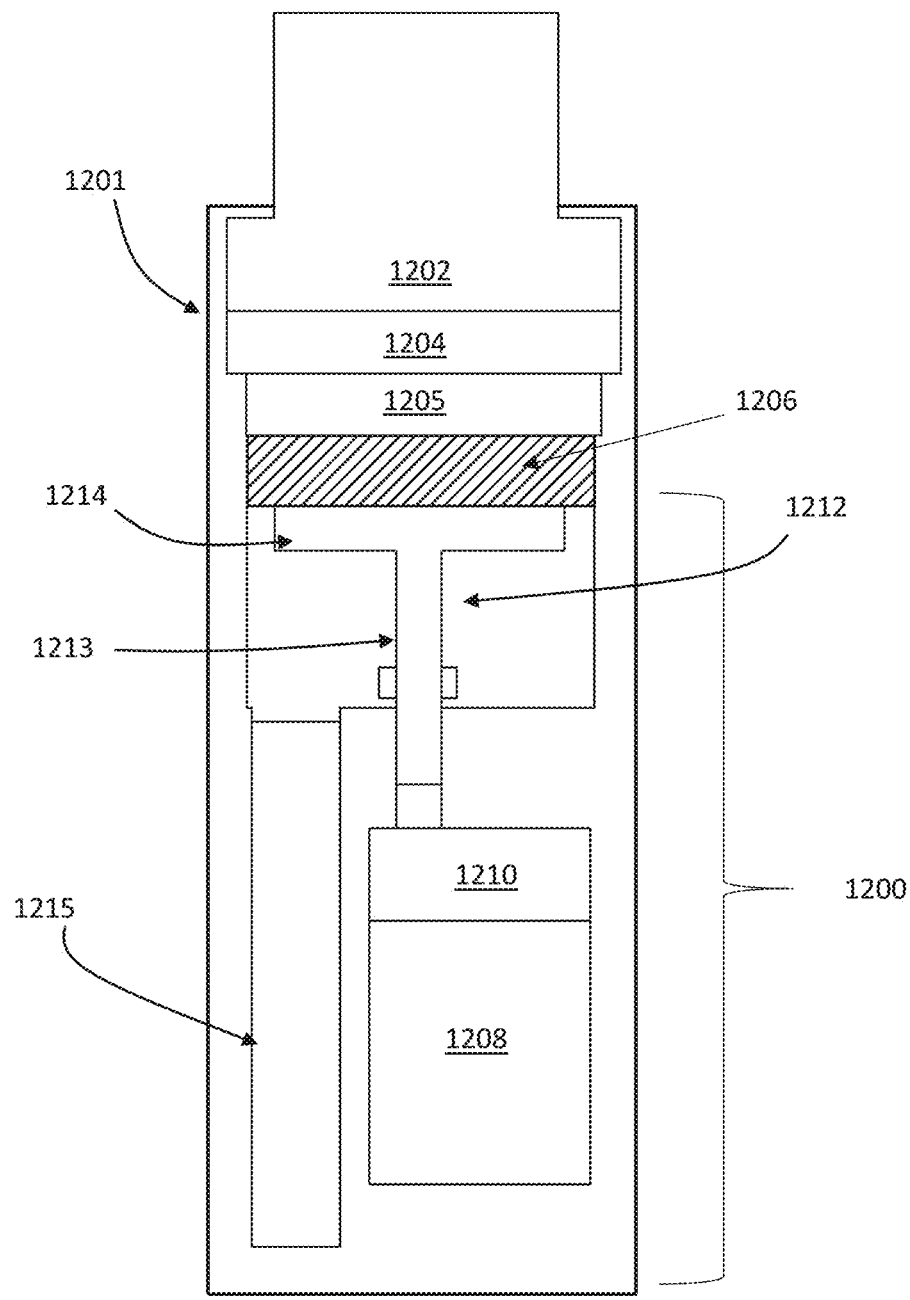
FIG. 12A depicts a block representation of one variation of a fluid switcher assembly.

FIG. 12A depicts a block representation of one variation of a fluid switcher assembly (1200) that may be located within a housing of the handle (1201). The lower portion of the manifold connector (1202) of the oral insert may be releasably engaged with the handle using any of the attachment mechanisms described herein. The handle attachment mechanism may comprise a sealing mechanism (1204) to facilitate a water-tight engagement between the manifold connector (1202) and the fluid switcher assembly (1200). Optionally, in some variations, the fluid switcher assembly may comprise a manifold block (1206) and/or a vibration damper (1205). The fluid switcher assembly (1200) may also comprise a motor (1208) and a gearbox (1210) that are connected to a rotor (1212). The rotor (1212) may comprise a shaft (1213) that is attached to the motor and gearbox on a first end, and attached a flat plate (1214) on the second end. As described elsewhere, in some variations, the motor and gearbox may be mounted upon or within an elastomeric or rubber enclosure to dampen vibrations. The flat plate (1214) may have one or more fluid slots or apertures (not shown) that aligns with different fluid manifold openings as the flat plate is rotated by the motor. In some variations, the flat plate (1214) is circular and the shaft (1213) may be attached at a center of the circular flat plate. The fluid (which may be pressurized) may be provided to the fluid switcher assembly via a fluid line (1215).

Figure 12B:
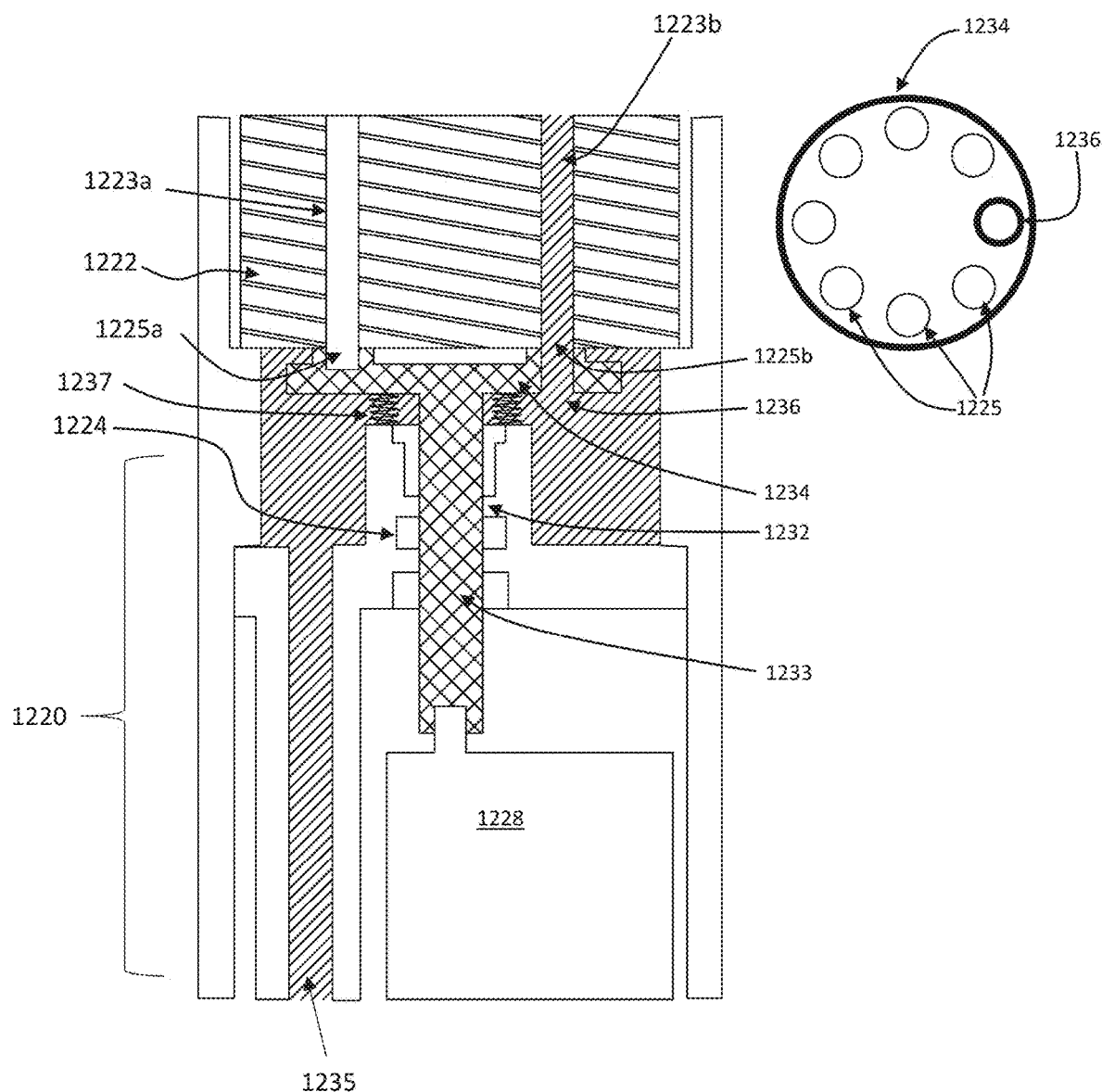
FIG. 12B depicts a cross-sectional schematic representation of one variation of a fluid switcher assembly.

FIG. 12B depicts a cross-sectional schematic representation of one variation of a fluid switcher assembly (1220). The lower portion of the manifold connector (1222) of the oral insert may be releasably engaged with the handle using any of the attachment mechanisms described herein. The cross-sectional view of FIG. 12B depicts two manifolds (1223a, b) extending through the connector (1222) that terminate at manifold openings (1225a, b), however, the connector may have any number of manifolds and corresponding openings, for example, 2, 3, 4, 5, 6, 7, 8, 9, 10, 12, etc. manifolds and/or manifold openings. The handle attachment mechanism may comprise a sealing mechanism to facilitate a water-tight engagement between the manifold connector (1222) and the fluid switcher assembly (1220). The fluid switcher assembly (1220) may also comprise a motor and gearbox (1228) that are connected to a rotor (1232). The rotor (1232) may comprise a shaft (1233) that is attached to the motor and gearbox on a first end, and attached a flat plate (1234) on the second end (in some variations, the shaft and the flat plate may be integrally formed). The flat plate (1234) may have one or more fluid slots or apertures (aperture (1236) as shown in the upper right inset of FIG. 12B, which depicts the flat plate and its fluid aperture with thickened lines) that aligns with different fluid manifold openings as the flat plate is rotated by the motor (manifold openings (1225) as shown in the upper right inset of FIG. 12B, with thinned lines). In some variations, the flat plate (1234) is circular and the shaft (1233) may be attached at a center of the circular flat plate. The flat plate (1234) may have one or more fluid apertures (1236) that aligns with different fluid manifold openings as the flat plate (1234) is rotated by the motor. The fluid (which may be pressurized) may be provided from the fluid reservoir to the fluid switcher assembly via a fluid line (1235). While FIG. 12B depicts the fluid switcher assembly as directly contacting with the manifold connector of an oral insert, it should be understood in other variations, the fluid switcher assembly may contact with a manifold block that is in contact with the manifold connector of an oral insert. Optionally, one or more springs may be located between the flat plate and a rotor mount or bearing, which may help provide sealing compression. For example, there may be two or more springs (1237) located in a radially-symmetric arrangement about the flat plate (e.g., around the shaft), and/or there may be a spring (e.g., a coil spring) that is disposed around the shaft and contacting the central region of the flat plate. There may be one or more seals or gaskets (1224) disposed about the shaft (1233) to help prevent fluid from flowing into the motor and gearbox compartment.

Figure 13A:
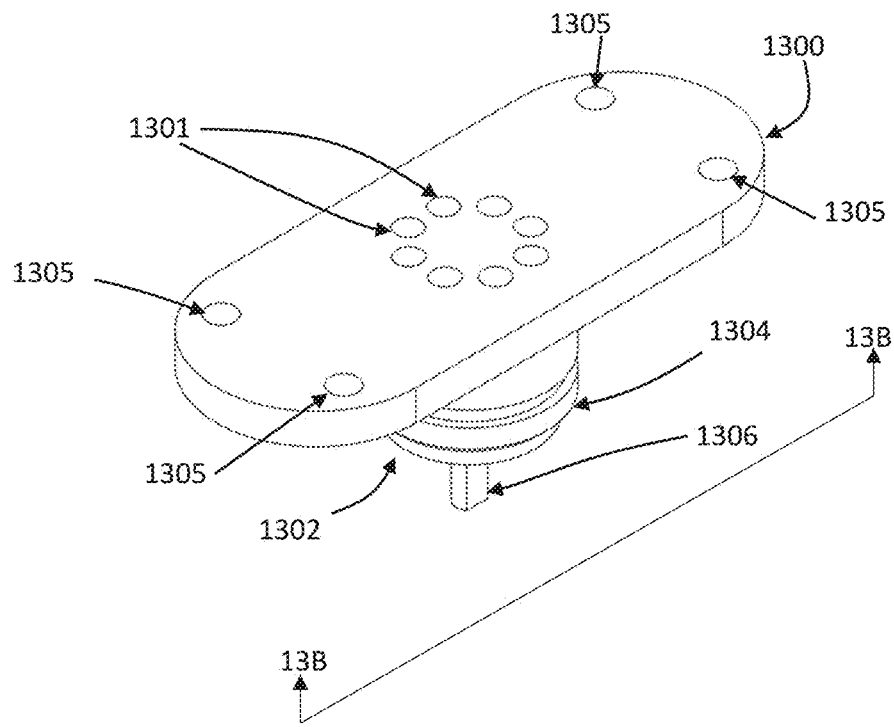
FIGS. 13A-13G depict variations of a manifold connector and a rotor comprising a flat plate.

FIGS. 13A-13G depict variations of a manifold connector and a rotor comprising a flat plate mounted on a shaft that may be rotated by a motor, which may be used with any of the fluid switcher assemblies described herein. It should be understood that while these examples depict the interaction between a manifold connector of an oral insert and a rotor of a fluid switcher assembly, similar structures and interactions may also apply to the interface between a manifold block of the handle and a rotor of the fluid switcher assembly. FIG. 13A depicts a manifold connector (1300) of an oral insert interfacing with a rotor (1302), which may be a flat plate rotor having a circular flat plate (1304) and a shaft (1306) extending from the center of the circular flat plate (1304). The manifold connector (1300) may comprise a plurality of manifold openings (1301) arranged in a circle. The flat plate (1304) may comprise one or more fluid apertures (1308).

Figure 13B:
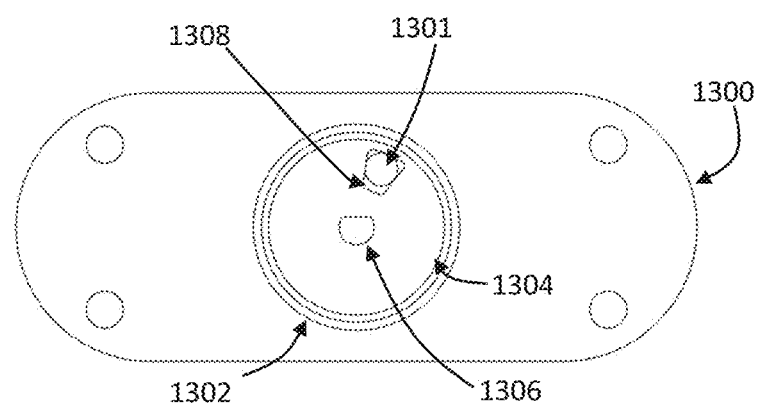

FIG. 13B is an end view from line 13B-13B of the manifold connector and rotor assembly of FIG. 13A. flat plate rotor (1302) having the fluid aperture (1308) aligned with a manifold opening (1301). The manifold opening may be either of a manifold connector (1300) of an oral insert, or a manifold block of the handle, for example. In some variations, the manifold connector (1300) may comprise one or more mounting openings (1305) through which a one or more fasteners (e.g., screws, pins, etc.) may be inserted to attached the manifold connector to the body of the oral insert.

Figures 13C, 13D:
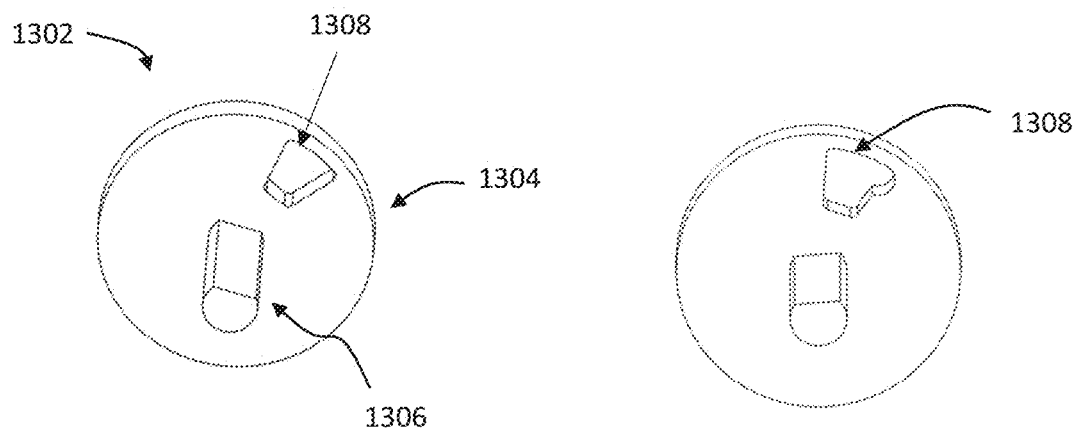
Figure 13E:
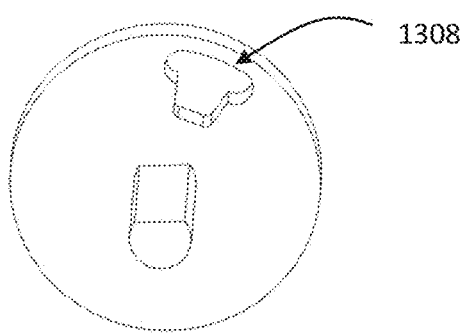

FIG. 13C is a bottom perspective view of the flat plate rotor (1302). The flat plate rotor (1302) may comprise one or more fluid slots or apertures, for example, a fluid slot or aperture (1308). The fluid aperture (1308) may have a trapezoid shape, but may have any desirable shape and in some variations, may be circular, elliptical, oval, rectangular, rectangular with rounded corners, triangular, triangular with rounded corners, etc. In some variations, the fluid aperture may have an asymmetrical or irregular shape, for example, an oval with a lateral extension or lobe (FIG. 13D) or multiple lateral extensions or lobes (FIG. 13E). As the flat plate rotor is rotated by a motor (not shown), the fluid aperture (1308) aligns with a subset of the manifold openings of the manifold connector (1300), allowing fluid to flow into those manifolds but not others. In some variations, a width of the fluid aperture (1308) may be selected such that the fluid aperture constantly maintains a fluid connection with at least one manifold opening. For example, the fluid aperture may have a width that is larger than the spacing between manifold openings. A fluid aperture with one or more laterally extending lobes (e.g., FIGS. 13D-13E) may also help ensure that the fluid flow through the switcher is continues through to at least one manifold opening. For example, a fluid aperture may be sized and shaped such that as it transitions from alignment with a first manifold opening to a second manifold opening, it maintains a fluid connection between either or both the first and second manifold openings, i.e., it "makes" a fluid connection with the second manifold opening before it "breaks" its connection with the first manifold opening. A flat plate rotor may have more than one fluid aperture, which may allow for fluid flow to more than one manifold. For example, a flat plate rotor may have a first fluid aperture at 0° and a second fluid aperture at 180°, which may allow simultaneous fluid flow to manifolds that are radially opposite each other. This may help offset or balance any radially-directed forces that may result from pressurized fluid as it is being switched from one manifold to another.

Figure 13F:
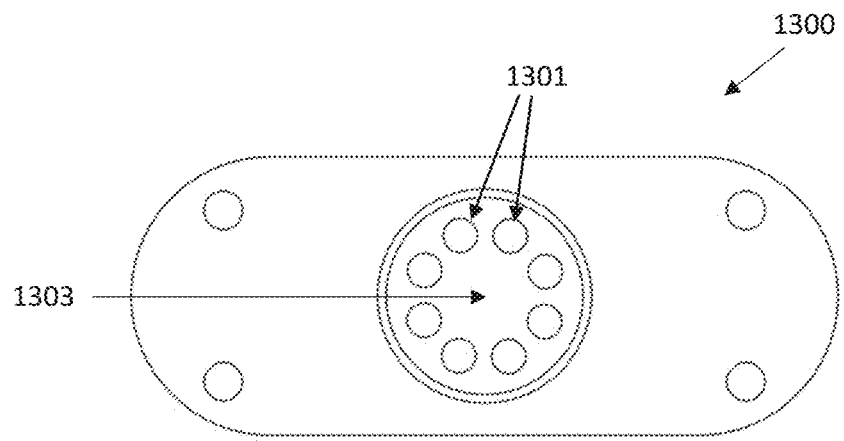
Figure 13G:
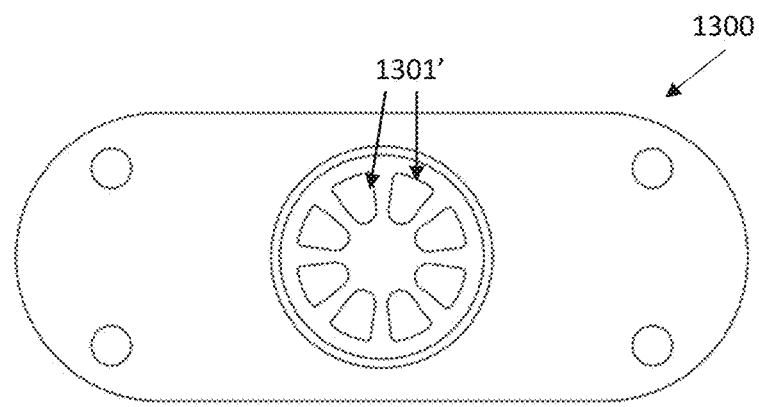

FIGS. 13F-13G depict front views of variations of a manifold connector (1300) or manifold block. The manifold connector (1300) may comprise at least one manifold opening (1301) per manifold. In these examples, the oral insert may have eight fluid manifolds that terminate at eight fluid openings in the manifold connector (1300). It should be understood that other variations may have a different number of manifolds and manifold openings, as described above. The manifold openings (1301) may be circular and radially distributed about the center (1303) of the connector (1300). The manifold openings (1301) may be evenly located about the center (1303) such that the angular span and/or spacing between each manifold opening is the same, but in other variations, the manifold openings may be arranged with variable angular spans and/or spacing. The angular span and/or spacing between the manifold openings may be determined at least in part by the number and size of individual fluid manifolds. The size and shape of the fluid aperture on the corresponding flat plate rotor may be selected in accordance with the size, shape, and arrangement of the manifold openings in the manifold connector, as described above. FIG. 13F depicts another variation of a manifold connector (1300) or manifold block. This variation may be similar to the variation of FIG. 13E, but the manifold openings (1301') may have a triangular or tapered shape with rounded corners.

FIGS. 14A-14F are schematic depictions of a rotary valve that may be used with any of the fluid switcher assemblies described herein. These schematic depictions of the relative sizing and interaction between a rotary valve having a cylindrical barrel with a fluid channel and a manifold connector or manifold block with radially arranged fluid manifold openings, however, it should be understood that similar functional principles may be applicable to other variations of a switcher (e.g., solenoid valve, rotatable flat plate, other types of rotary valves, etc.) and fluid manifolds connectors or manifold blocks (e.g., having a different number of openings, different arrangement of openings, different opening shapes, etc.). FIGS. 14A-14B and 14D-14F depict a manifold connector or manifold block (1400) having eight oval-shaped manifold openings (1402) and a barrel or cylindrically shaped rotary valve (1404) with a fluid slot or aperture (1406). The rotary valve (1404) may have a shaft that is connected to a motor that rotates the valve such that the fluid aperture (1406) moves circumferentially to each manifold opening (1402). Because the fluid flowing through the fluid switcher assembly may be pressurized, fluid may build up quickly in the fluid switcher assembly if the fluid aperture is momentarily blocked as it transitions between manifold openings. This may result in irregular fluid flow, where the flow may speed up and slow down as the rotary valve runs through its rotation. This change in flow may result in the handle accelerating and deaccelerating, which may generate vibrational forces that may be transmitted through to the oral insert. Vibration caused by extreme changes in fluid flow may cause discomfort or pain for the user. In the worst case where the rotary valve "dead heads" (i.e., breaks the connection to a previous manifold before it makes a connection with the next manifold), an uncomfortable fluid hammer-like effect may be transferred to the patient.

Figure 14A:
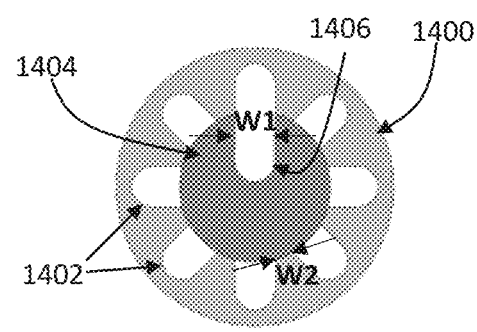
FIGS. 14A-14B depict schematic representations of a variation of a rotary valve that may be used with a fluid switcher assembly.
Figure 14B:
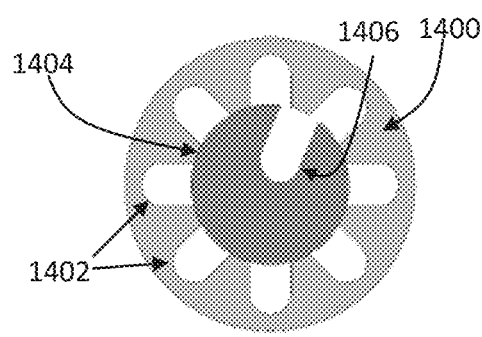

FIGS. 14A-14B depict one variation of a fluid switcher assembly with a rotary valve that is configured to reduce changes in fluid flow by ensuring that the fluid aperture of the rotary valve constantly maintains a fluid connection with at least one manifold as it rotates. The fluid aperture of the rotary valve may be sized and/or shaped to span at least one manifold opening, and while rotating between manifolds, to span two manifold opens so that the fluid flow may taper off for the first manifold as the valve rotates to the second manifold. A width W1 of the fluid aperture (1406) may be greater than a width W2 of the space between the manifold openings (1402). This may help ensure that the fluid flowing through the fluid aperture (1406) of the rotary valve (1404) is always connected to a fluid manifold, and does not "dead head" at a wall of the manifold connector or manifold block. While the rotary valve (1404) is transitioning between two manifolds, a reduced fluid flow may be provided to each manifold. Sizing the fluid aperture to overlap with multiple manifold openings while rotating may help maintain a more consistent fluid flow and help reduce fluid-switching vibrations that may cause discomfort to the user.

Figure 14C:
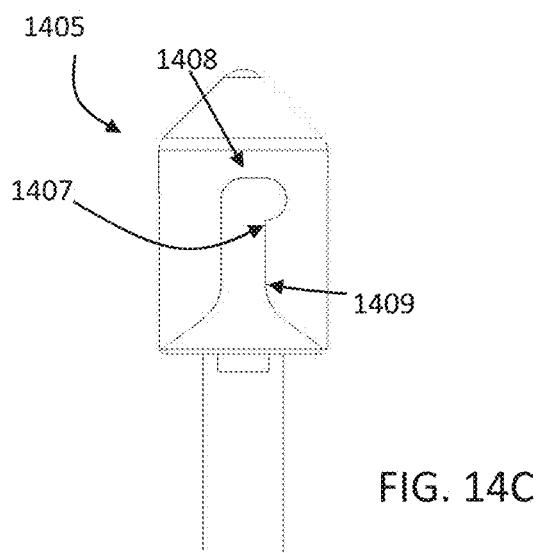
FIG. 14C depicts a perspective view of one variation of a cylindrical rotary valve.
Figure 14D:
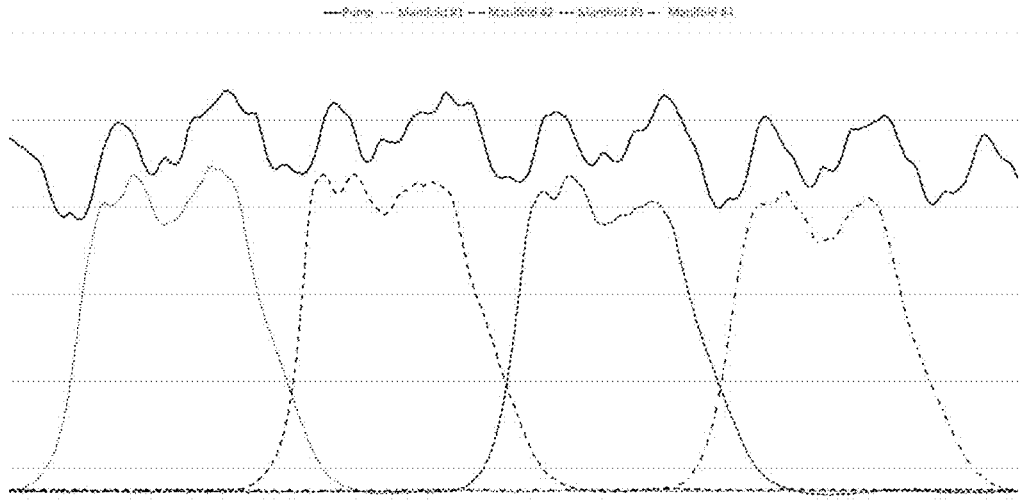
FIGS. 14D-14E depict simulation plots of the fluid pressure at each manifold in a system for different variations of a rotary valve slot.
Figure 14E:
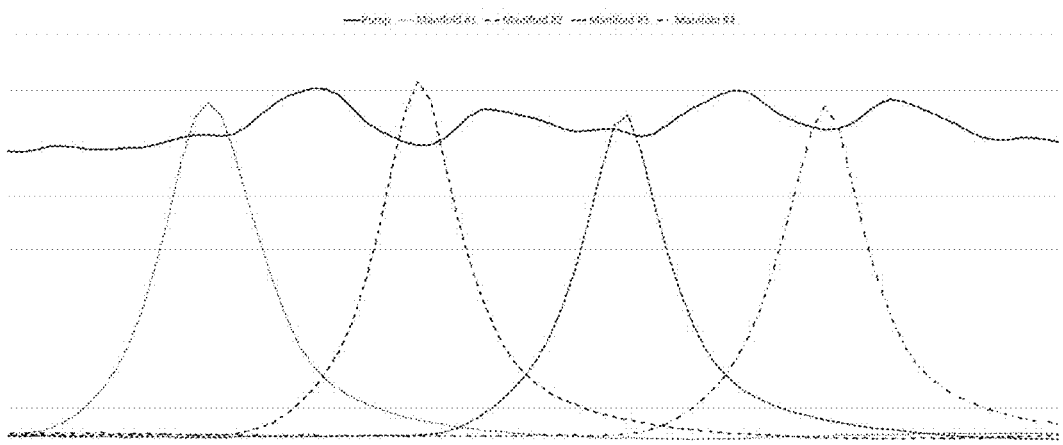

FIG. 14C depicts one variation of a rotary valve (1405) that has a fluid aperture or slot (1407) that has a laterally extending portion (1408) that is perpendicular to the axis of the vertical portion (1409) fluid slot (1407). The extension portion (1408) may span a larger angular range than the vertical portion (1409). While the vertical portion (1409) is aligned with a first manifold, the extension portion (1408) may overlap with a second adjacent manifold, thereby providing fluid flow to both the first and second manifolds. The fluid flow to the second manifold may be less than the flow to the first manifold, since the cross-sectional area of the extension portion (1408) is less than the cross-sectional area of the vertical portion (1409). A rotary valve with a fluid aperture that has an extension portion may help to smooth fluid flows as the valve rotates and transitions between manifolds. The relative size of the extension or overlap region may have different fluid flow characteristics that may affect the fluid velocity at the fluid nozzles of the mouthpiece, and/or vibration to the user (e.g., through the handle and/or via the oral insert), and may be adjusted to obtain the desired fluid flow characteristics. FIG. 14D depicts a simulation plot of the fluid pressure at each manifold in a system where the size of the extension region of the rotary valve slot is relatively small compared to the side of the vertical region of the slot (i.e., small fluid overlap between manifolds). The top line represents the fluid pressure at the system pump, and each of the curves (e.g., solid line, short dashed line, dotted line, long-short dashed line) represents the fluid pressure at a particular manifold over time. In this switcher assembly configuration, the fluid pressure at the system pump varies substantially, which may cause increased vibrations at the handle and/or oral insert. However, the fluid pressure at each manifold reaches a high level for a sustained period of time, which may provide a high fluid jet exit velocity at the fluid nozzles and facilitate cleaning efficacy. FIG. 14E depicts a simulation plot of the fluid pressure at each manifold in a system where the size of the extension region of the rotary valve slot is relatively large compared to the side of the vertical region of the slot (i.e., large fluid overlap between manifolds). The top line represents the fluid pressure at the system pump, and each of the curves (e.g., solid line, short dashed line, dotted line, long-short dashed line) represents the fluid pressure at a particular manifold over time. In this switcher assembly configuration, the fluid pressure at the system pump is more consistent, which may reduce or eliminate vibrations at the handle and/or oral insert. However, the fluid pressure at each manifold does not reach high levels for sustained period of time. This may result in lower fluid jet exit velocities at the fluid nozzles as compared to the small-overlap configuration.

FIGS. 14F-14H depict other variations of a fluid switcher assembly with a rotary valve that is configured to help reduce handle vibrational forces as the rotary valve transitions between manifold manifolds. Additionally or alternatively to the variations of FIGS. 14A-14C, the rotary valves (1404) may have two or more fluid apertures, and/or may comprise an eccentric mass. FIG. 14F depicts a fluid switcher assembly where the rotary valve has one fluid apertures (e.g., similar to the variations of FIGS. 14A-14B) that transitions between the manifolds by sequentially aligning with each of the manifold openings (1402). When the aperture of the valve is fully aligned with a manifold opening, the full fluid flow through the manifold may generate a force that has a radial component, represented by the arrow (1405). As the valve rotates, this radial force vector may cause vibrations that may be transmitted to the user (e.g., via the handle). FIG. 14G depicts one variation of a rotary valve (1404) that has a first fluid aperture (1406a) and a second fluid aperture (1406b) that is located opposite the first fluid aperture. The angular spacing of the first and second fluid apertures may be such that when the first fluid aperture is aligned to a first manifold opening, the second fluid aperture is aligned to a second manifold opening that is opposite the first manifold opening. Alternatively, the angular spacing of the first and second fluid apertures may be such that when the first fluid aperture is aligned to a manifold opening, the second fluid aperture is transitioning between two manifold opening (i.e., not aligned to a single manifold opening). The radial force generated by the first aperture (1406a) aligning with a first manifold opening and the radial force generated by the second aperture (1406b)

aligning with a second manifold opening may cancel each other out, which may help reduce the net vibrational force experienced by the user.

A fluid switcher assembly may comprise one or more water-tight seals (e.g., gaskets) may be located at junctions between its components of the fluid switcher assembly to limit or reduce any fluid leakage. For example, a seal may be provided about the shaft of the rotor, between the rotor and the manifold connector or manifold block, between the manifold block and the manifold connector, between the manifold block and the interior walls of the handle housing, between the manifold connector and the interior walls of the handle housing, and/or along the walls of fluid-containing compartments of the switcher assembly to help prevent fluid leakage to the motor. FIGS. 15A-15B depict variations of radial seals, which may be located in grooves located around, for example, the circumference of a protrusion or a recess. FIG. 15A depicts a cross-sectional schematic view of one variation of radial rod seals (1500) that are located at the interface between a manifold connector (1502) of an oral insert and a manifold block (1504) of the fluid switcher assembly. The manifolds (1506) within the manifold connector (1502) may terminate a manifold opening (1508) located at the end of a protrusion (1510). The protrusions (1510) may be configured to fit into cylindrical recesses in the manifold block (1504). The radial rod seals (1500) may be located within a circumferential groove in the wall of the cylindrical recesses of the manifold block (1504). Alternatively, FIG. 15B depicts a cross-sectional schematic view of a variation of radial piston seals (1520) that are located at the interface between a manifold connector (1522) of an oral insert and a manifold block (1524) of the fluid switcher assembly. The manifolds (1526) within the manifold connector (1522) may terminate a manifold opening (1528) located within a recess, such as a cylindrically shaped recess (1530). The manifold block (1524) may comprise protrusions (1525) that may be configured to fit into the recesses (1530) in the manifold connector (1522). The radial piston seals (1520) may be located within a circumferential groove in the wall of the outer diameter of the protrusions (1525) of the manifold block (1524).

FIGS. 16A-16B depict variations of face seals, which may be seals that are located along the surface of the interface between two or more components. FIG. 16A depicts one example of an overmolded face seal (1600) that may be attached along the surface of a manifold block (1602) of a handle that interfaces with a manifold connector (1604) of an oral insert, at or around the manifold openings of the manifold block. Alternatively, FIG. 16B depicts one example of a retained face seal (1610) that may be retained within a groove (1611) that circumscribes the manifold openings of the manifold block (1612) of a handle. The retained face seal (1610) may create a water-tight interface with the surface of the manifold connector (1614) at or near the manifold openings. A fluid switcher assembly and/or handle attachment mechanism may comprise one or more of the seal configurations described herein, alone or in combination, as may be desirable.

Vibration Reduction/Damper Mechanism

Figure 18:
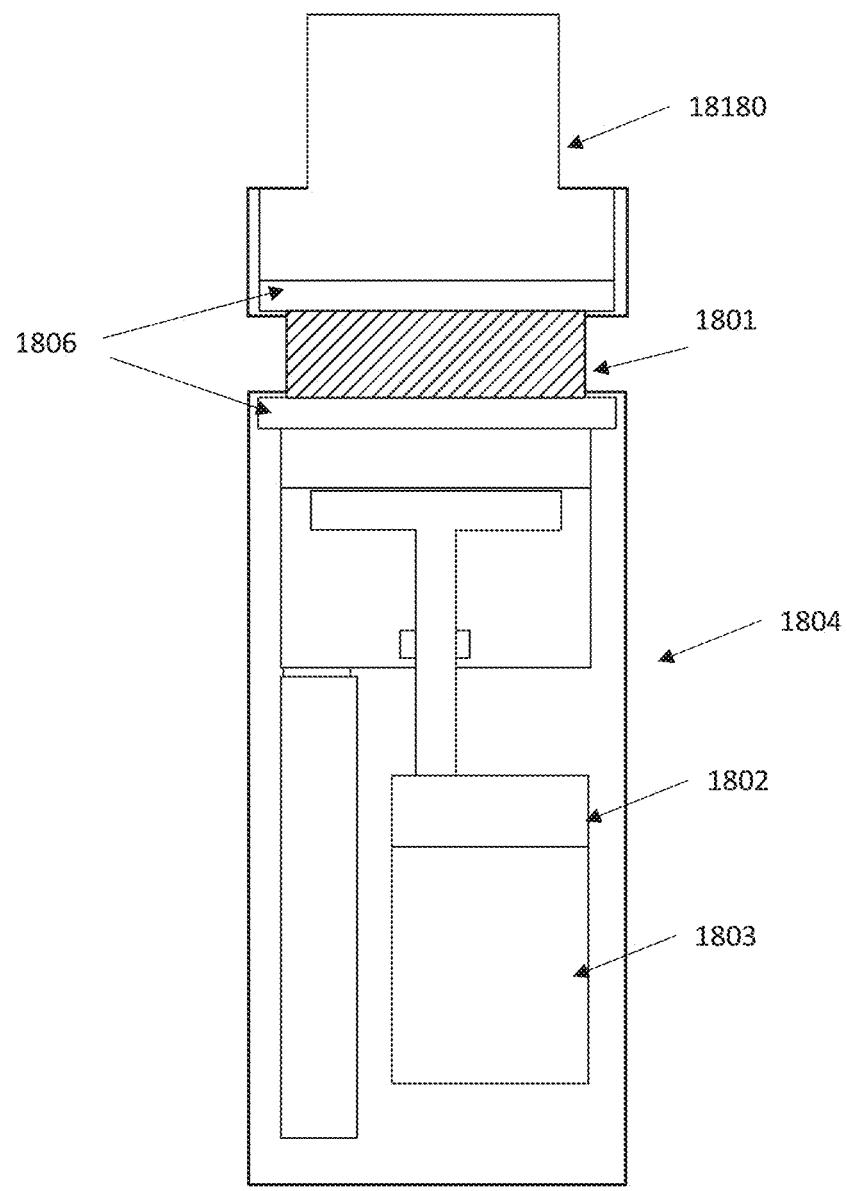
FIG. 18 depicts a side cutaway block representation of a variation of a handle and mouthpiece of an oral cavity cleaning system, including a vibration isolation mechanism.

FIG. 18 depicts a side cutaway block representation of a variation of a handle (1804) and an oral insert (18180) of an oral cavity cleaning system, including a vibration isolation mechanism, referred to herein as a vibration isolation mechanism, or a vibration reduction mechanism. A vibration isolation mechanism may be used to dampen, reduce, absorb, or otherwise eliminate vibrations caused by the mechanics and fluid pumping performed in the handle, such that the vibrations transmitted to the user's mouth are minimized or eliminated. Additionally, minimizing vibrations transmitted to the user may also reduce annoyance or pain to the inner ear of the user. These vibrations may, for example, be caused by a gearbox (1802) and a motor (1803), which may be housed within the handle (1804). The vibration isolation mechanism may be provided as a vibration damper (1802), referred to herein as a vibration damper or vibration dampener, which may be elastomeric, and may be located between the fluid switcher assembly and the oral insert (18180). The vibration damper (1802) may also be sandwiched between rigid plates (1806) to further reduce vibrations and hold the vibration damper securely in place. A vibration damper may be made of one or more of nitrile rubber, silicone rubber, natural rubber, thermoplastic elastomers (TPE), thermoplastic urethanes (TPU), Sorbothane®. It should be understood that the handle (1804) may be provided at a sufficient length to accommodate the vibration damper, and/or the vibration dampener with rigid plates. Alternatively or additionally, some variations of a handle may comprise an elastomeric motor mount to which the motor and/or gearbox may be attached. The elastomeric motor mount may encompass and/or enclose at least a portion of the motor and/or gearbox to absorb or otherwise dampen vibrations from the motor and/or gearbox mechanism. In some variations, an oral care system may comprise a vibration damper in the handle (e.g., as depicted in FIG. 18) as well as an optional vibration damper that may be engaged with an oral insert (e.g., an elastomeric substrate as depicted in FIGS. 5G-5J and described below). Some oral care systems may only have a vibration damper in the handle and no vibration damper in the oral insert, while other oral care systems may only have a damper in the oral insert but none in the handle.

Fluid Reservoir and Vortex Plate

Figure 19A:
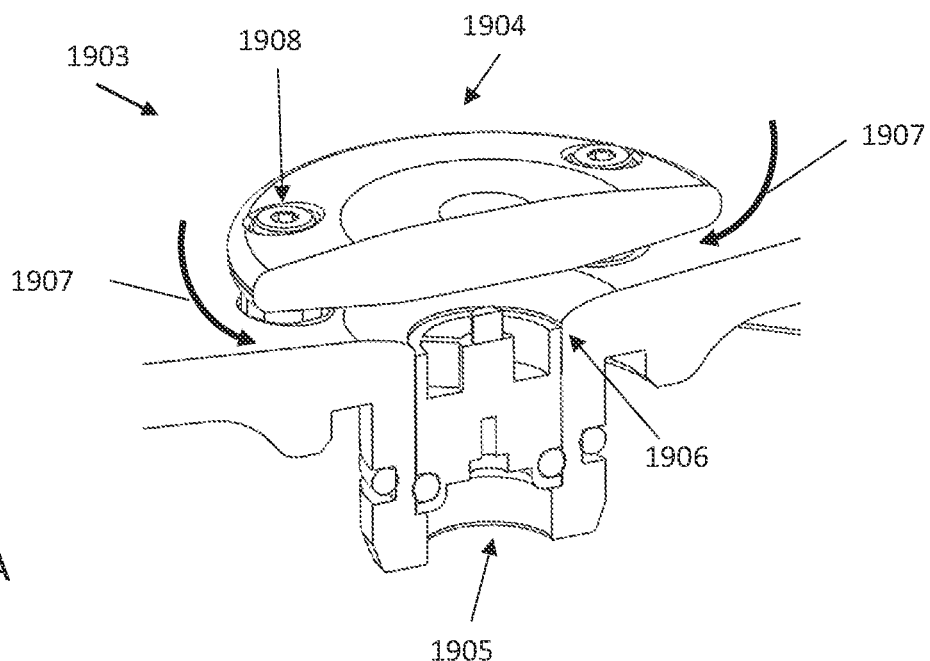
FIG. 19A depicts a side, perspective cutaway view of a variation of a vortex plate within the interior of a fluid reservoir.
Figure 19B:
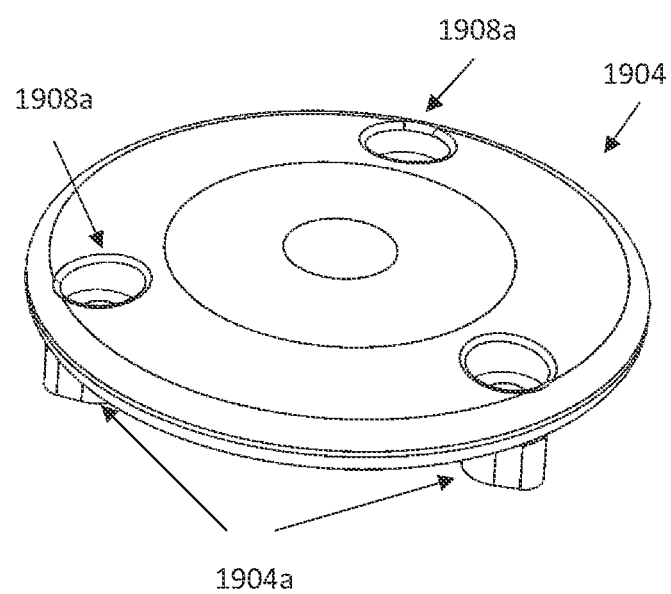
FIG. 19B depicts a top, perspective view of a variation of a vortex plate.

FIG. 19A depicts a side, perspective cutaway view of a variation of a vortex plate within the interior of a fluid reservoir (1903). FIG. 19B depicts a top, perspective view of a variation of a vortex plate (1904), referred to herein as a vortex plate or an elevated plate. The cutaway view of FIG. 19A shows that the vortex plate (1904) may be positioned above the tank drain (1905) of the fluid reservoir (1903). To provide jets of fluid into the manifold and the fluid nozzles at a high speed, fluid may exit the fluid reservoir (1903) at a high flow rate during treatment. When a high flow rate is used, fluid may be drawn from the reservoir at a rate of at least about 40 mL/s to about 100 mL/s, e.g., about 40 mL/s, about 50 mL/s, from about 70 mL/s to about 100 mL/s, which can result in the creation of a vortex. Should the vortex reach the check valve intake (1906), referred to herein as a "fluid opening," "check valve intake" or a "check valve") of the tank drain (1905), it may cause air to be sucked into the pump of the oral cavity cleaning system. This may cause compressible air bubbles to be injected into the fluid flow stream. The effect of a vortex may be exacerbated by an initial swirling of fluid due to the pouring or tap-filling operation into the fluid reservoir during use of the system. Thus, the vortex plate (1904), disposed over the check valve (1906) of the tank drain (1905), may be configured such that there is a gap between the elevated plate and the fluid opening, to provide fluid out of the fluid reservoir to the handle. The positioning of the vortex plate (1904) may allow for the lateral flow of fluid from the side, represented by arrows (1907), so that the fluid flow is not co-linear or co-axial with the direction of fluid flow through the check valve intake (1906). Directing the fluid to flow toward the check valve from the side instead of directly in-line with the check valve intake (1906) may help prevent the formation of a vortex.

To facilitate the prevention of a vortex formation, the vortex plate (1904) may be provided with a size larger than the size of the check valve intake (1906) opening. For example, the width or diameter of the vortex plate may be larger than the width or diameter of the fluid opening, such as approximately twice the width or diameter of the opening. Exemplary diameters are 30 mm for the diameter of the vortex plate, and 15 mm for the diameter of the check valve intake. A larger vortex plate creates a longer lateral fluid flow path, may help ensure that a greater proportion of the fluid flow is moving laterally as compared to a smaller vortex plate, which may have a shorter lateral fluid flow path.

The vortex plate (1904) may be positioned above the fluid opening (1906) by support legs (1904*a*), for example. The support legs may be of any suitable height for reducing or preventing the formation of a vortex while allowing the flow of fluids underneath the vortex plate. The support legs (1904*a*) may also function to secure the vortex plate (1904) to the fluid reservoir by allowing a screw (1908) or other securing means to pass through the support legs. The vortex plate (1904) may thus be provided with securing holes (1908). As an example, the vortex plate may include three securing holes.

Elastomeric Substrate of a Hybrid Oral Insert

Figure 5A:
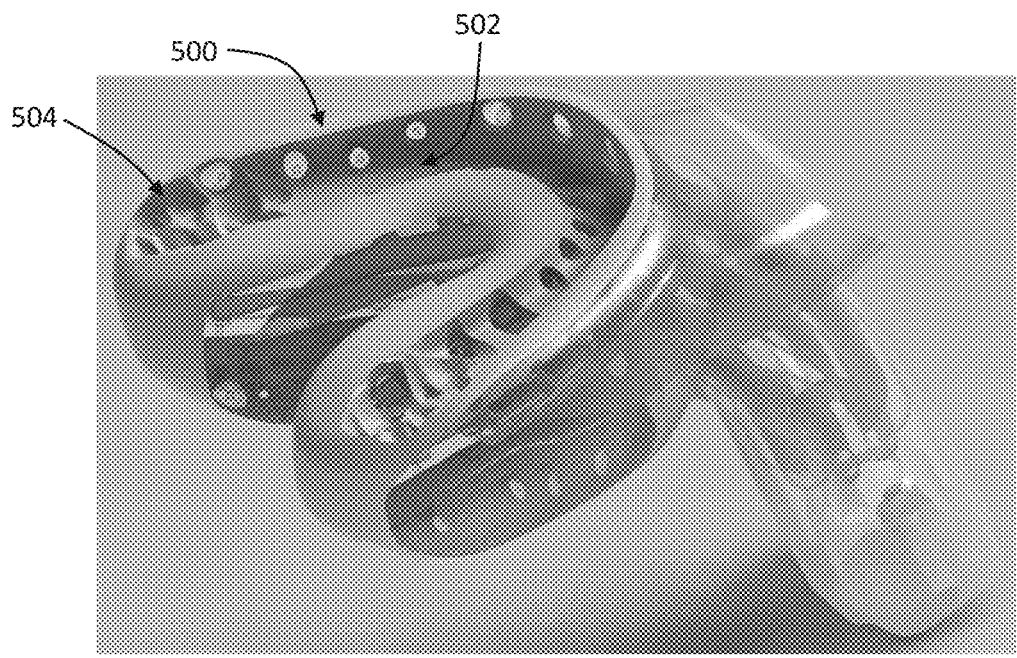
FIGS. 5A-5C depict perspective views of one variation of a hybrid oral insert.
Figure 5B:
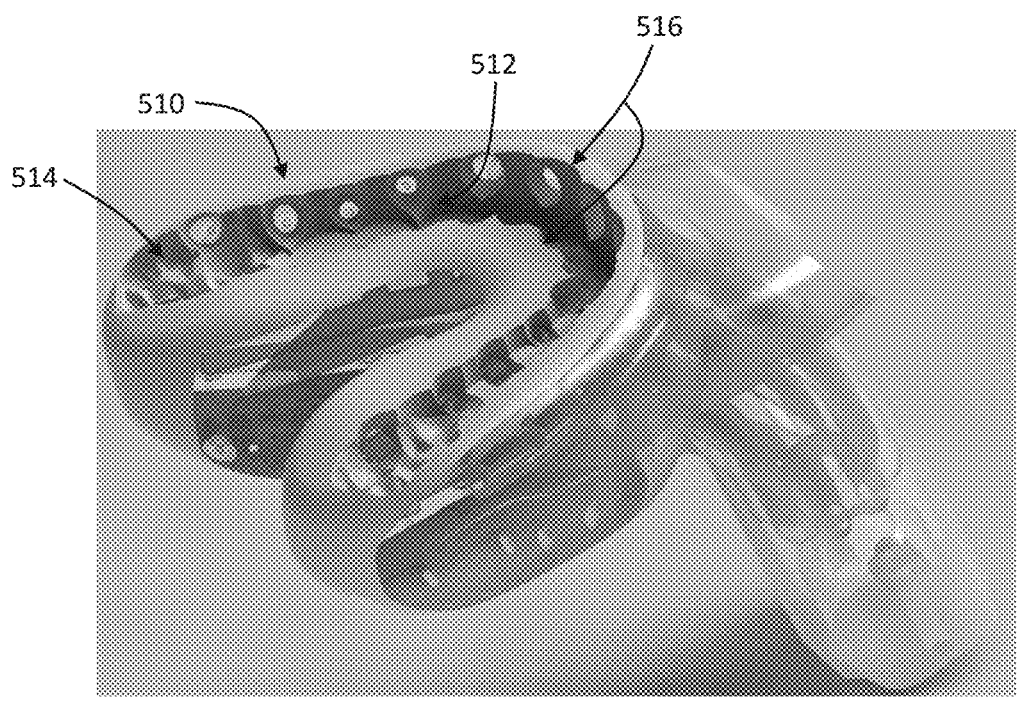
Figure 5C:
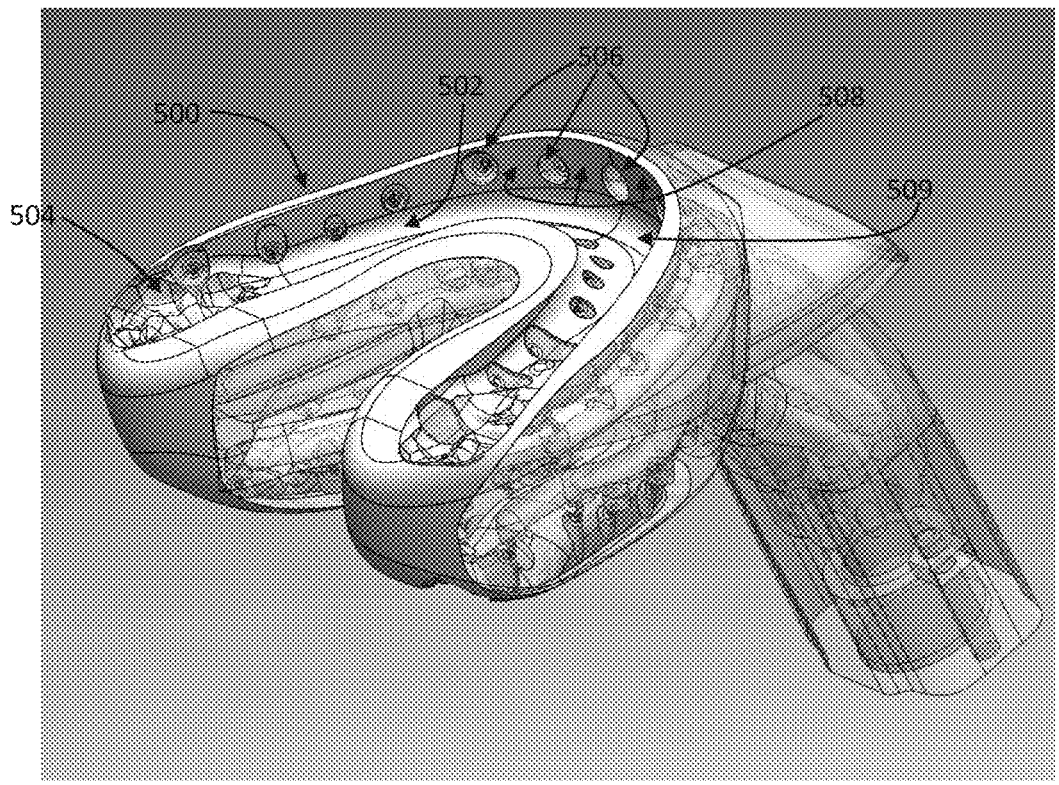
Figure 5D:
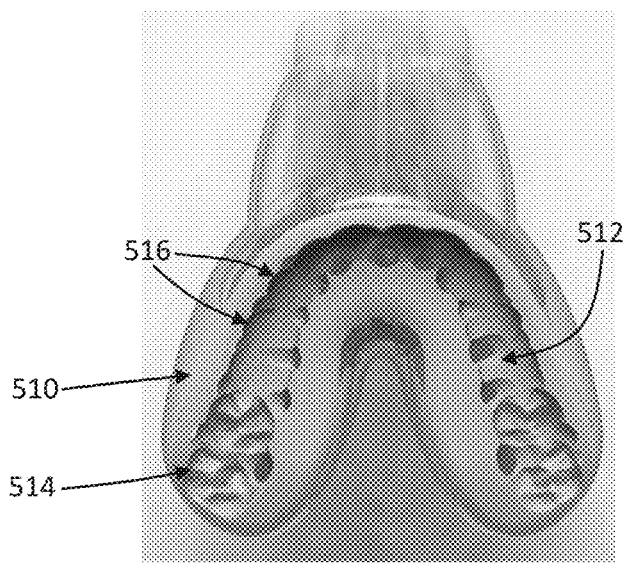
FIG. 5D depicts a top view of one variation of an elastomeric substrate.

FIGS. 5A-5F depict one variation of an optional elastomeric substrate that may be included with a hybrid oral insert. The elastomeric substrate may be made of a material that is conformable, compliant, and/or flexible so that the interface between the hybrid oral insert and the user's oral anatomy may be comfortable and ergonomic. An elastomeric substrate may comprise a plurality of openings that are situated in locations that correspond with the locations of the fluid nozzles and openings of the rigid substrate so as not to impede with the fluid flow. The elastomeric substrate may comprise an upper trough and a lower trough for receiving a user's upper and lower teeth, and the contours of the inner surface of these trough regions (i.e., the teeth/gum contacting surfaces) may vary. For example, FIGS. 5A and 5C depict one variation of an elastomeric substrate (500) where the inner surface of the trough (502) has contours (504) that approximate the contours of some of the posterior teeth (e.g., molars), but no contours that approximate the contours of the anterior teeth. FIGS. 5B and 5D depict one variation of an elastomeric substrate (510) where the inner surface of the trough (512) has contours (514) that approximate the contours of some of the posterior teeth (e.g., molars), and some additional contours (516) that approximate the contours of the anterior teeth. FIG. 5D is a top view of the elastomeric substrate (510), with the openings omitted for clarity, depicting the contours (516) that approximate the anatomical contours of the user's teeth.

Optionally, any of the elastomeric substrate described herein may comprise textured surfaces with grooves, protrusions, surface undulations, bristles, any patterned or repeating surface contours so that mechanical vibration or agitation of the elastomeric substrate against the surface of the user's teeth, gums and/or inner cheek can facilitate the removal of debris and/or disrupt the formation of biofilms. Such vibratory motion may include motion along a single axis (e.g., motion along a line) and/or motion along multiple axes (e.g., circular motion, motion in a randomized pattern, motion along a series of lines or curves, etc.). These textured surfaces and/or protrusions may be located at regions that correspond with the buccal, lingual, occlusal, and/or incisal edges or surfaces of a user's teeth, and may be, for example, located in regions between the openings that correspond to the fluid nozzle openings of the rigid substrate. Regions of the elastomeric substrate that may be texture-free may include areas just above the user's gum line and/or any sensitive areas identified by the user and/or dentist. For example, as indicated in FIG. 5C, the surfaces or regions (508) of the elastomeric substrate (500) that are between the openings (506) may optionally comprise textured surfaces or protrusions (e.g., bristles, finger-like projections, ribs, flanges, flaps, and the like). In some variations, the surfaces or regions (509) of the elastomeric substrate that are configured to contact (or nearly contact) the occlusal and/or incisal edges or surfaces of the teeth may comprise textures or protrusions. As another example, the anatomical contours (516) of the elastomeric substrate (510) depicted in FIG. 5D may also provide a sufficient level of contact with tooth surfaces to facilitate the removal of debris and/or disrupt the formation of biofilms when the elastomeric substrate mechanical vibration or oscillation.

As described above, an elastomeric substrate may comprise an upper trough region or surface and a lower trough region or surface. In some variations, a hybrid oral insert may optionally comprise one or more stand-off structures that extend between the upper trough region and the lower trough region of an elastomeric substrate. The stand-off structure may comprise a pillar, a rod, tube, and/or any such elongate element that couples the upper surface and the lower surface of the elastomeric substrate to each other. The stand-off structure may also help to maintain a minimum distance or space between the upper and lower surfaces of an elastomeric substrate. In some variations, the stand-off structure may comprise the same material as the upper and lower regions of the elastomeric substrate. An elastomeric substrate, as well as the one or more stand-off structures, may comprise one or more of the following materials: polysiloxane (silicone), thermoplastic elastomers (TPE) e.g. Kraton, polyurethanes (TPU), UV curable photopolymers or extrudable polymers. Alternatively, the stand-off structure may be made of a more rigid material than the elastomeric substrate. The stand-off may be manufactured utilizing one or more 3-D printing processes and/or injection molding and/or over-molding. Materials may include UV-curable photopolymers such as Carbon MPU100, Whip Mix Surgical Guide, KeySplint Soft™, 3D Systems™ VisiJet SL Clear™, 3DSystems™ Accura ClearVue™ NextDent™ Model Clear™ or Stratasys™ Med620™, UV curable ceramics, powder polymers, powder metals, powder alloys, powder ceramic, powered organic material, filament-based plastics, filament-based metals, filament based ceramics, filament-based organic materials, injection moldable thermoplastics. The stand-off structure(s) may be produced in the same manner as and/or using the same material as the rigid substrate.

Figure 5E:
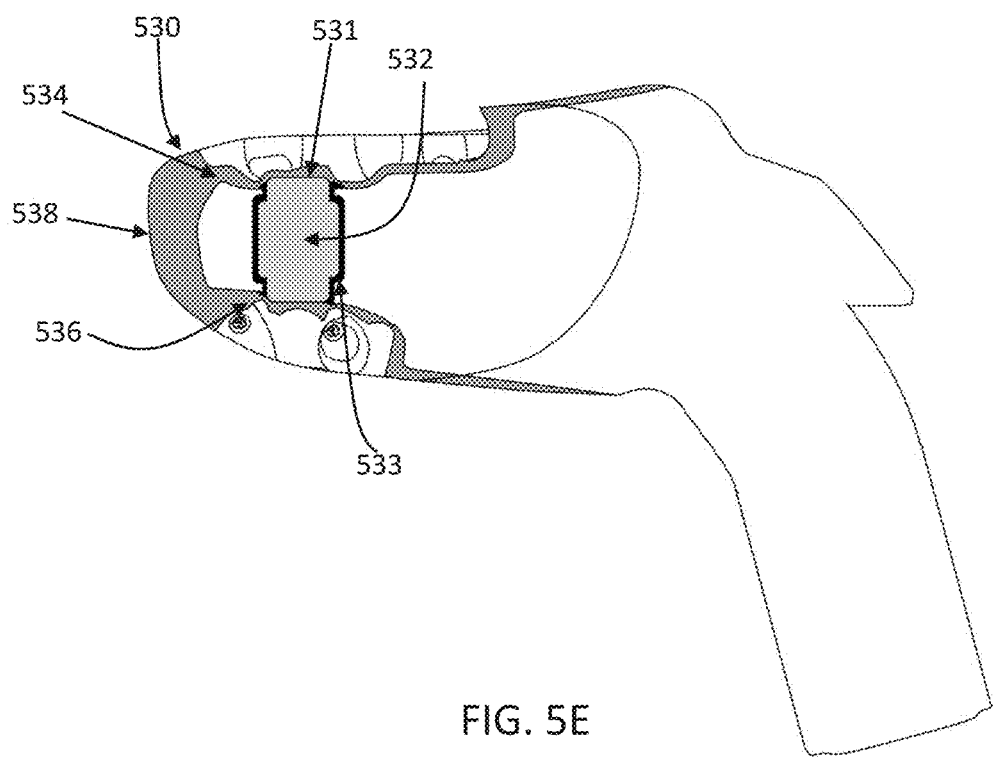
FIG. 5E depicts a cross-sectional view of one variation of a hybrid oral insert.
Figure 5F:
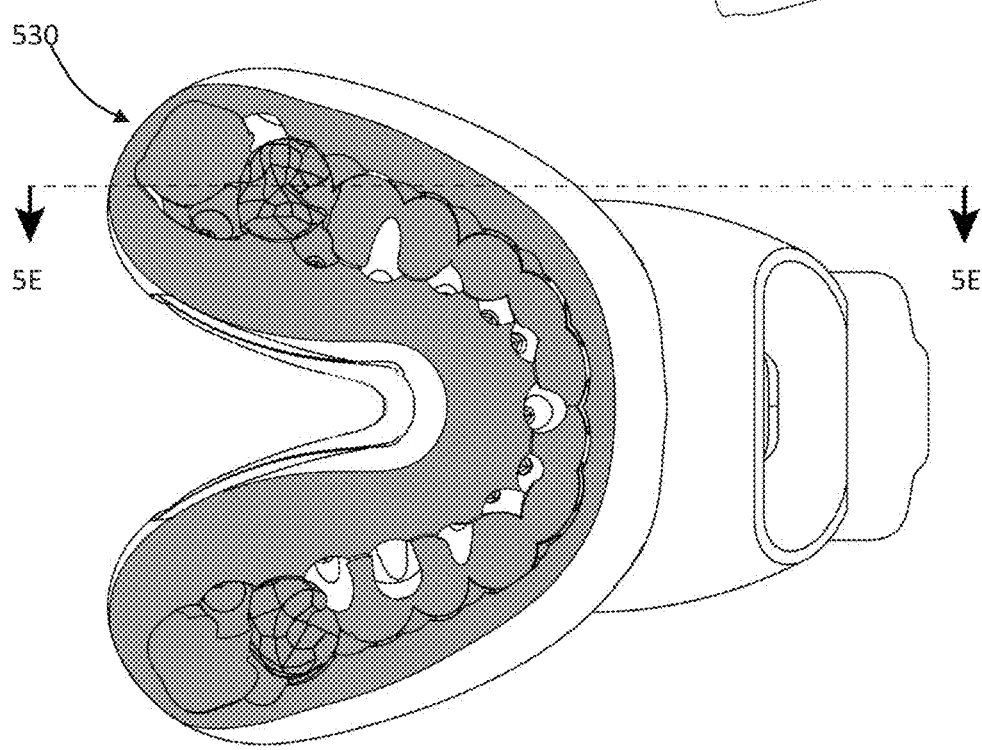
FIG. 5F depicts a top view of one variation of an elastomeric substrate.

FIGS. 5E and 5F are cross-sectional and top views, respectively, of an elastomeric substrate (530) comprising a stand-off structure (532) that spans between the upper trough/surface (534) and the lower trough/surface (536) of the elastomeric substrate elastomeric substrate. A second stand-off structure is located on the other side of the elastomeric substrate (not depicted), in a symmetric (or substantially symmetric) position with respect to a central axis of the oral insert. In some variations where the elastomeric substrate is configured to vibrate, the stand-off structures act as a compliant suspension system to help isolate the motion of the elastomeric substrate from the jaw structure. A stand-off structure may comprise a keying structure (531)

that is configured to couple the contours of trough (which may correspond with the contours of a user's teeth) to the stand-off structure. For example, the portion of the upper trough (534) that interfaces with the stand-off structure may comprise a groove or indentation having a shape that corresponds with a protrusion or raised region of the keying structure (531). A stand-off structure may optionally comprise a chamber or cavity (533) along its outer perimeter that may be configured to provide space or clearance to allow the oral insert to move independently of the stand-off structure. In some variations, the elastomeric substrate may have a posterior wall portion (538) that wraps around the posterior teeth (e.g., the molars) so that the posterior portion of the rigid substrate does not directly contact the lingual structures of the oral cavity, which may promote a more comfortable and ergonomic fit. While the variation depicted in FIGS. 5E and 5F depict two stand-off structures (one on the left and other on the right), it should be understood that in other variations, there could be a single stand-off structure, or more than two stand-off structures, e.g., 3, 4, 5, 6, 7, 8, 9, 10 more stand-off structures.

In some variations, the elastomeric substrate may be over-molded or otherwise permanently affixed onto the rigid substrate such that it is not removable from the rigid substrate (without damaging or tearing it), while in other variations, the elastomeric substrate may be releasable attached to the rigid substrate. A releasable elastomeric substrate may be replaced when it wears out from contacting and/or vibrating against a user's teeth, and may help reduce the wear on the rigid substrate by acting as a buffer between the rigid substrate and the teeth. A elastomeric substrate may comprise an attachment mechanism that may comprise one or more of adhesives, magnetic components, interlocking features, fasteners, and the like. For example, the elastomeric substrate may be attached to the rigid substrate by one or more of the following mechanisms: bonding with adhesives, magnetic attachment, press-fit, snap-fit, any interlocking features (e.g., corresponding protrusions and grooves, hook-and-loop engagement), etc. The elastomeric substrate may alternatively or additionally be attached to the rigid substrate using pins, bolts, screws, and/or snaps.

Vibration Mechanism

Some variations of a personalized oral care system may further comprise a vibration mechanism. Examples of vibration mechanisms include, but are not limited to electromagnetic motors, an eccentric rotating mass (ERM) rotating mass motor and/or a linear resonant actuator (LRA). The vibratory motion may be random, linear or rotational motion. The mechanical motion generated by the vibration mechanism may be transferred to the rigid substrate that then transfers the motion to the elastomeric substrate. For example, a vibration mechanism may be located on the base station and/or handle, and the vibrations may be transmitted to the hybrid oral insert using one or more mechanical transducers. Alternatively or additionally, the vibration mechanism may be directly coupled to the elastomeric substrate, so that the mechanical motion from the vibration mechanism causes a corresponding agitation or vibration in the elastomeric substrate. For example, the vibration mechanism may be located between the elastomeric substrate and the rigid substrate.

Figure 6A:
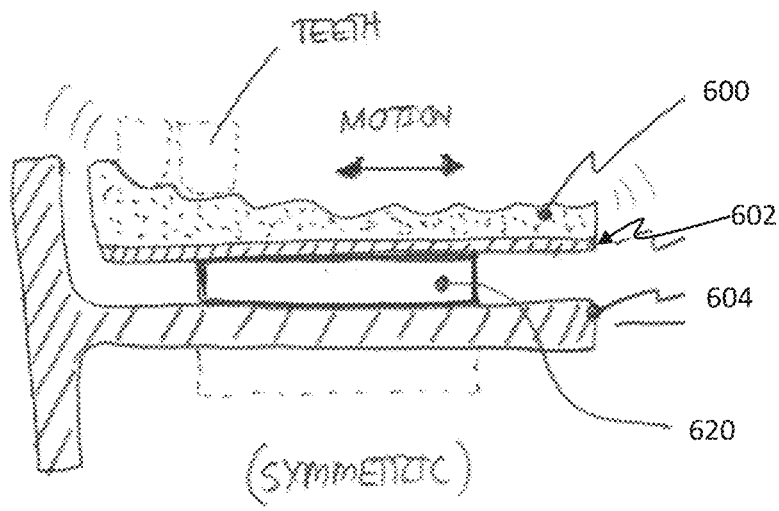
FIGS. 6A-6C are schematic cross-sectional depictions of various vibration mechanisms for a hybrid oral insert.
Figure 6B:
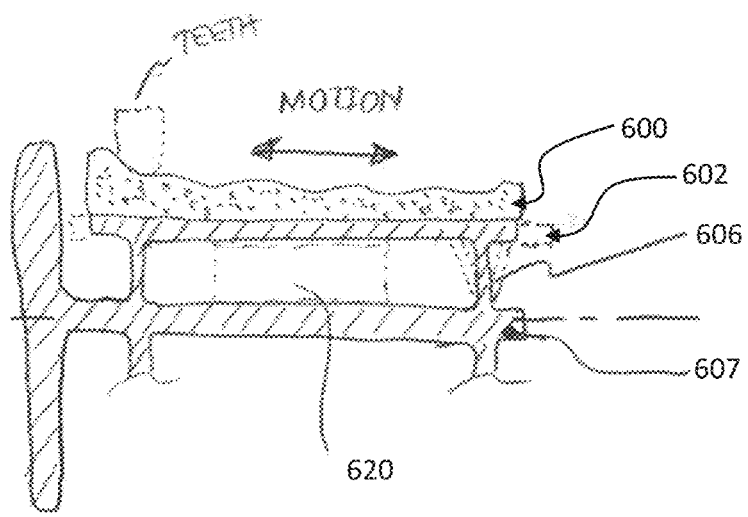

FIGS. 6A-6B depict variations of vibration mechanisms that may be directly coupled to an elastomeric substrate. In these variations, the vibration mechanism may be part of the hybrid oral insert, and there may be one or more electrical wires extending from the vibration mechanism in the oral insert to the handle and/or base station to provide power and control signals. FIG. 6A depicts one variation of a hybrid oral insert comprising an elastomeric substrate (600) that is mounted on a rigid support structure (602), a rigid substrate (604), and a vibration mechanism (620) disposed between the rigid support (602) of the elastomeric substrate and the rigid substrate (604). The elastomeric substrate (600) and the rigid substrate (604) may be any of those described above. The vibration mechanism (620) may be any mechanism described above, for example, a ERM and/or LRA. The rigid support (602) may be attached to the vibration mechanism (620) without being attached to the rigid substrate (604). The vibration mechanism (620) may be configured to confer mechanical motion laterally, as represented by the arrows in FIG. 6A, across or along the surface of the user's teeth.

FIG. 6B depicts one variation of a hybrid oral insert comprising an elastomeric substrate (600) that is mounted on a rigid support structure (602), a rigid substrate (607), one or more stand-off structures (606) that extend between the rigid support (602) and the rigid substrate (607), and a vibration mechanism (620) disposed between the rigid support (602) of the elastomeric substrate and the rigid substrate (607). The stand-off structures (606) may be rigid (e.g., made of the same material as the rigid substrate and/or rigid support structure), and/or may have some degree of compliance and/or flexibility that allow them to accommodate and/or deflect with any mechanical motion of the elastomeric substrate (600) and support structure (602). The elastomeric substrate (600) and the rigid substrate (607) may be any of those described above. The vibration mechanism (620) may be any mechanism described above, for example, a ERM and/or LRA. The rigid support (602) may be attached to the vibration mechanism (620), but may be coupled to the rigid substrate via the stand-off structures. The vibration mechanism (620) may be configured to confer mechanical motion laterally, as represented by the arrows in FIG. 6B, across or along the surface of the user's teeth.

Figure 6C:
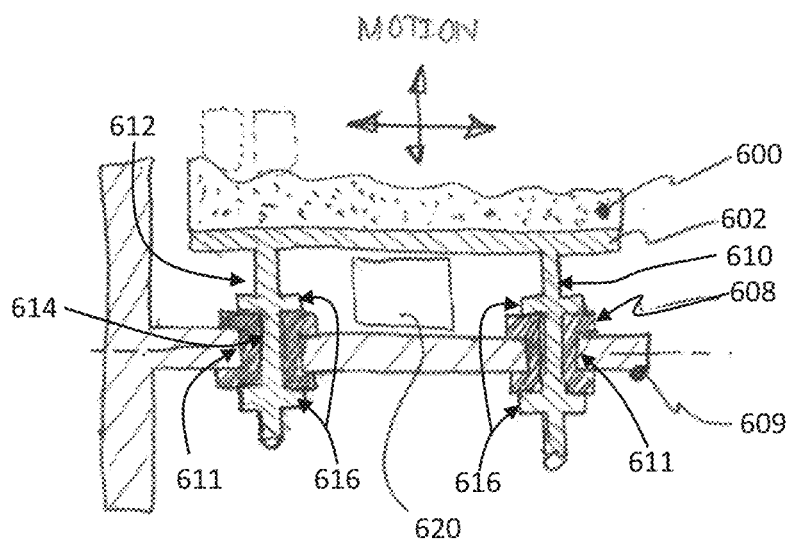

FIG. 6C depicts one variation of a hybrid oral insert comprising an elastomeric substrate (600) that is mounted on a rigid support structure (602), a rigid substrate (609), one or more stand-off structures (610) that extend between the rigid support (602) and the rigid substrate (609), and a vibration mechanism (620) disposed between the rigid support (602) of the elastomeric substrate and the rigid substrate (609). The stand-off structures (610) may be rigid (e.g., made of the same material as the rigid substrate and/or rigid support structure), and/or may have some degree of compliance and/or flexibility that allow them to accommodate and/or deflect with any mechanical motion of the elastomeric substrate (600) and support structure (602). In this variation, there may also be one or more elastomer suspension structures (608) located at the interface between stand-off structure (610) and the rigid substrate (609), so that the stand-off structures do not directly contract the rigid substrate. The suspension structures (608) may absorb some of the motion of the elastomeric substrate and the rigid support, so that their motion is further de-coupled from the rigid substrate (as compared with the variation depicted in FIG. 6B). The suspension structures (608) may be made of any desired elastomeric material, such as those described above for the elastomeric substrate. In some variations, the suspension structures (608) may be cylindrical or tubular, having an outer lip on either side to retain its position relative to the rigid substrate (609), which may have openings (611) to receive the suspension structures (608). The stand-off structures (610) may have an elongated portion (612) of varying diameters, where a reduced diameter portion (614) is sized to fit through a lumen of the suspension structure (608), and one or more increased diameter portions (616) that help to secure its position relative to the suspension structures (608). The elastomeric substrate (600) and the rigid substrate (604) may be any of those described above. The vibration mechanism (620) may be any mechanism described above, for example, a ERM and/or LRA. The rigid support (602) may be attached to the vibration mechanism (620), but may be coupled to the rigid substrate via the stand-off structures. The vibration mechanism (620) may be configured to confer mechanical motion in multiple dimensions/axes (e.g., along at least two axes of motion), as represented by the arrows in FIG. 6C.

Figure 5G:
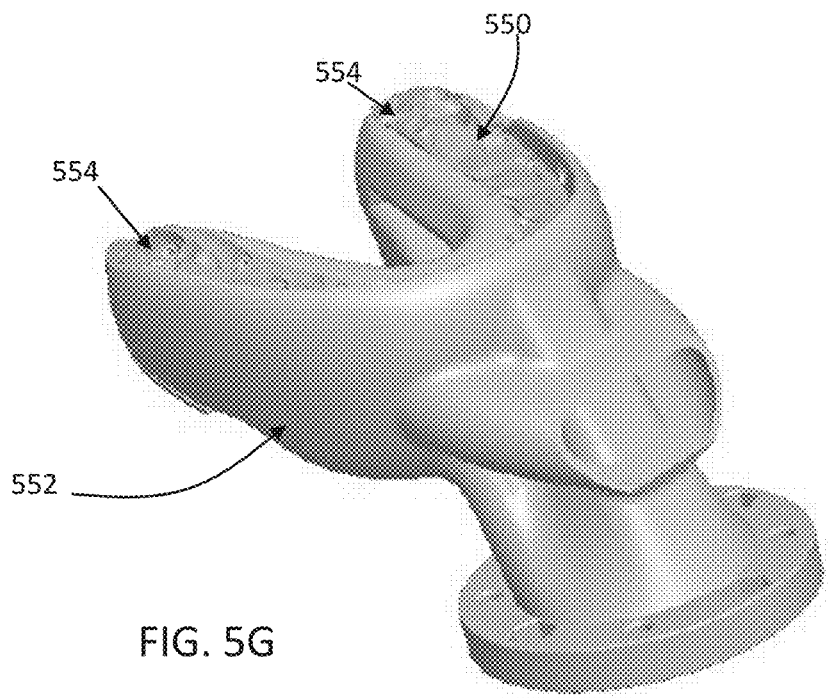
FIG. 5G depicts a perspective view of one variation of an oral insert with an elastomeric substrate.
Figure 5H:
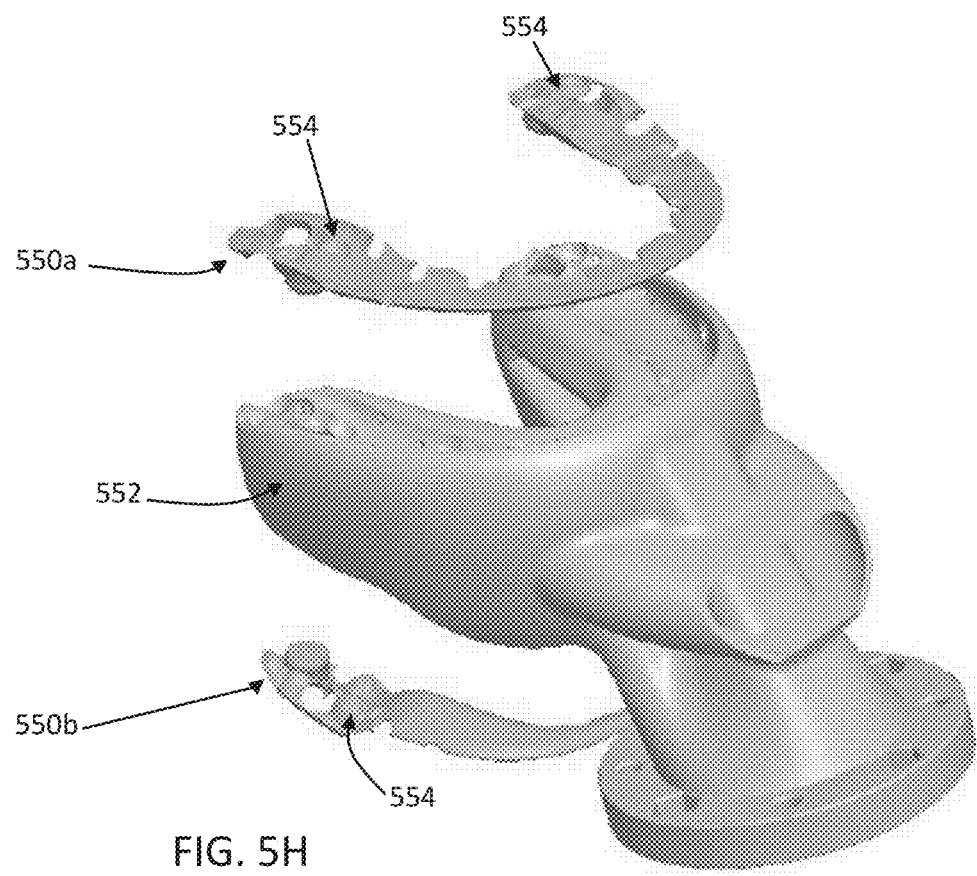
FIG. 5H depicts an exploded view of a variation of an oral insert with an elastomeric substrate.
Figure 5I:
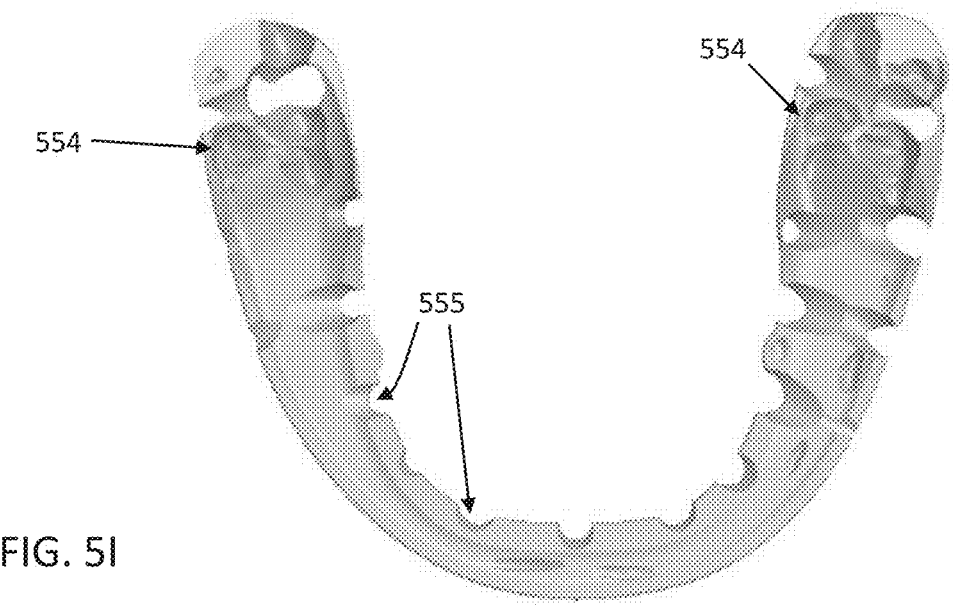
FIGS. 5I-5J depict variations of an elastomeric substrate that may be used with any of the oral inserts described herein.
Figure 5J:
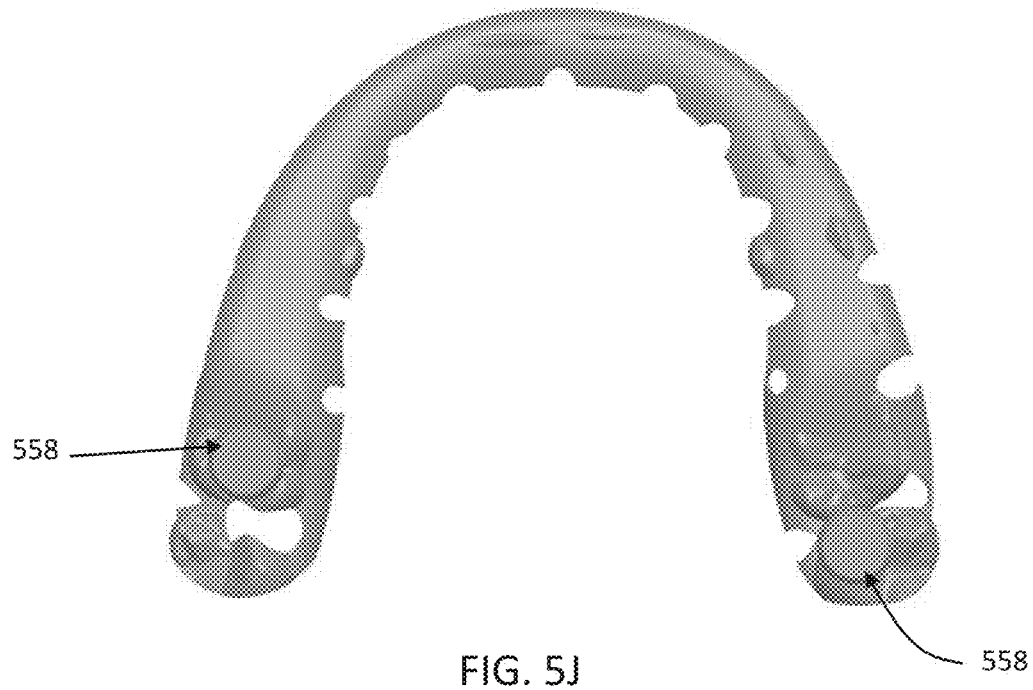

In some variations, an oral insert may optionally comprise a compliant or elastomeric insert to help mitigate unwanted vibration forces that may result from abrupt changes in fluid flow characteristics and/or the motors in the fluid switcher assembly and/or system pump. A hybrid oral insert comprising a rigid substrate and an elastomeric vibration damper substrate may help reduce the amount of vibration that is transmitted to the user's jaws (which may cause user discomfort). FIGS. 5G-5H depict one variation comprising a rigid oral insert (similar to any of the oral inserts described herein) and an elastomeric substrate. The rigid oral insert together with the elastomeric substrate may comprise a hybrid oral insert. 5I-5J depict variations of an elastomeric substrate (550) that may be used with any of the oral inserts (552) described herein (which may comprise a rigid material) to help absorb vibratory forces to reduce their transmission to the user's jaw. In some variations, the elastomeric substrate (550) may comprise flat, arch-shaped pieces of elastomer that may be configured to be disposed along the bottom surface of the upper and lower portions of the oral insert. For example, the elastomeric substrate (550) may be configured to be disposed over the surface of the upper and lower teeth-retaining portions that face the occlusal surface of the user's teeth. In some variations, the elastomeric substrate may be 3D-printed in accordance with the user's oral anatomy. Turning to FIGS. 5H-5I, some variations of elastomeric substrates (550) may comprise one or more keying features (554) that may include a plurality of protrusions and indentations that may correspond with the surface geometry of the surface of the user's teeth (e.g., contours of the occlusal surface of the back molars). The keying features (554) may help seat the elastomeric substrate within the teeth-retaining portions of the oral insert. The elastomeric substrate may comprise a pattern of apertures (555) to correspond with the nozzle openings of the oral insert. In some variations, as depicted in FIG. 5H, the elastomeric substrate (550) may comprise an upper substrate (550*a*) and a lower substrate (550*b*), for the upper and lower portions of the oral insert, respectively. Optionally, as depicted in FIG. 5J, the elastomeric substrate (550) may comprise one or more interlocking features (558) located on its underside (i.e., the side of the elastomeric substrate that contacts the oral insert) that may be configured to engage with a corresponding lock feature on the oral insert (not shown). In some variations, the interlocking feature (558) may comprise a protrusion that is sized and shaped to mate with a corresponding recess in the oral insert. The thickness of the elastomeric substrate may be selected to provide a tactile feedback as to how much biting force should be exerted onto the oral insert and/or to help the user correctly seat the oral insert in their mouth.

Dental Shim Device

The customized oral inserts described herein (e.g., hybrid oral inserts, oral inserts with only a rigid substrate, etc.) may be generated based on imaging data that contains information about the contours of the user's oral geometry, including the size, location, and contours of the user's teeth, as well as the alignment between the upper teeth and lower teeth (e.g., positions of the upper arch and the lower arch relative to each other). The oral geometry and alignment data may be used by a processor to generate a customized oral insert that has fluid nozzles positioned at specific dental structures to facilitate cleaning and/or user comfort. In order to capture alignment data that represents the relative position between the upper teeth and the lower teeth (e.g., alignment of the upper arch relative to the lower arch and vice versa), a dental shim device may be placed in the user's oral cavity to position and maintain the upper teeth and lower teeth in a selected position.

In one variation, the dental shim device may comprise one or more or orientation registration markers located on a surface of the shim device that may be captured in the same image and/or field-of-view as the upper teeth and/or lower teeth. The registration markers may be used as visual reference cues or landmarks so that the relative position and/or alignment between the upper teeth and lower teeth may be determined based on the relative position of the upper teeth to the registration markers and the relative position of the lower teeth to the registration markers. The orientation registration markers may have an asymmetric arrangement and/or may be shaped and positioned such that the position of individual upper and lower teeth relative to the one or more orientation registration markers is unique. Imaging data that includes both teeth and registration markers in the same image and/or field-of-view may facilitate determining the alignment between the upper arch and lower arch by registering relative positions of the upper and lower teeth to the one or more orientation registration markers. Orientation registration markers may comprise one or more 3-D structures and/or visual indicia located on the surfaces of the oral shim device, e.g., the surfaces that may be imaged in the same field-of-view as the user's oral structures. For example, the one or more visual indicia may include cross-hatch patterns and/or raised and/or depressed regions that are shaped as semi-circles and/or blocks and/or notches, and/or vertical grooves or protrusions at known locations relative to each other.

An oral shim device may comprise first and second alignment portions that each have an upper surface and a lower surface that contact the upper and lower teeth and a bridge portion that spans between the first and second alignment portions. Orientation registration markers may be disposed along the surfaces of the alignment portions and the bridge portion that may be scanned and captured in the same image and/or field-of-view as the user's teeth and/or gums, for example, along the facial surfaces of the alignment portions and the bridge portion. The first and second alignment portions may each comprise a sidewall sized to retain a fixed vertical offset between the upper and lower teeth. The vertical dimension of the alignment portion sidewall may be from about 5 mm to about 25 mm. In some variations, the alignment portion side wall may be tapered from the posterior to anterior region. The vertical dimension for a tapered alignment portion may vary from about 12 mm to about 15 mm, from about 14 mm to about 17 mm, from about 16 mm to about 18 mm, etc. from one region to the other. The sidewall may be made of a rigid material. The upper and lower surfaces of the alignment portions may be made of a compliant material that may conform to the contours of a user's teeth. This may facilitate positioning and maintaining (e.g., seating) the teeth in a fixed position relative to the shim device, and may help to reduce or prevent any positional shifts that may alter the alignment between the upper teeth, lower teeth, and the shim device during the acquisition of imaging data. The length of the bridge portion may have an overall curved shape that approximates a curve of a dental arch and/or aligns with the curve or width of a dental arch (either or both of the upper arch and the lower arch). In some variations, the bridge portion may comprise a continuous flexible material that may be pre-curved to approximate a dental arch curvature, and/or may comprise one or more segments (e.g., curved or straight segments) connected via hinges that may be arranged to approximate a dental arch curvature.

Another variation of a dental shim device may comprise an upper tray having an upper handle and a surface that contacts the upper teeth of an upper dental arch, a lower tray having a lower handle and a surface that contacts the lower teeth of an lower dental arch, and an adjustable mating joint that engages the upper tray and lower tray. The adjustable mating joint may be configured to provide a desired vertical offset between the upper tray and the lower tray. The adjustable mating joint may comprise a concave groove on the upper tray and a protrusion (e.g., ball) on the lower tray opposite the concave groove (or vice versa). The protrusion may be movable within the concave groove to accommodate a range of angles between the upper tray and the lower tray which may vary for different users. The concave groove may have an inner surface with a concave cavity and may optionally have one or more curves within the concave cavity that are configured to engage the corresponding/mating protrusion to retain the offset and/or angle. The teeth-contacting surface of the upper tray may comprise a compliant material configured to be conformable to contours of the upper teeth, and the teeth-contacting surface of the lower tray may comprise a compliant material configured to be conformable to contours of the lower teeth. In use, the upper tray and the lower tray may be inserted into the user's oral cavity, aligned such that the components of the mating joint are engaged, and then clamped together as the user closes their jaws. The vertical distance between the two handles (e.g., the distance between two markers or notches on the handles) may be measured and recorded (e.g., stored in a machine-readable memory medium) while the user's jaws are closed (e.g., in a fixed or set position). The trays may then be removed from the user's oral cavity and imaging data of the impressions on the compliant material may be acquired by a scanner. The vertical distance between the two handles, imaging data of the dental impressions in the trays, and the offset between the upper and lower teeth provided by the dental shim device may be used to calculate the angle between the upper and lower trays when clamped or positioned in the user's mouth and to determine the relative alignment between the upper teeth and lower teeth.

The compliant material located along the teeth-contacting surface of a dental shim device (e.g., along the upper and lower surfaces of the alignment portions, along the internal surfaces of the upper and lower trays) may be moldable to the contours of the teeth and/or gums. Examples of compliant materials that may be used with any of the dental shim devices described herein may include one or more of a rubber-like material, dental wax, dental impression material, gingival barrier material, gel, paste, and foam. The compliant material may optionally be curable from an elastic state to a rigid state, for example, using one or more of chemical curing, thermal curing, room-temperature curing, and light curing.

Figure 7A:
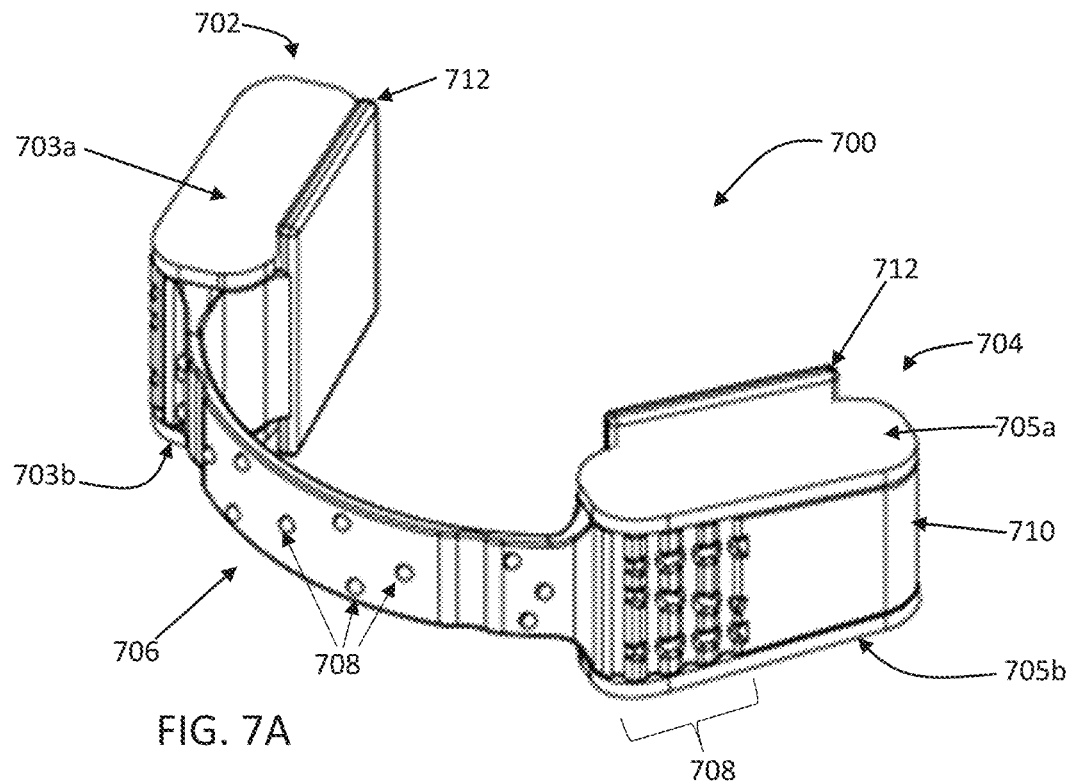
FIG. 7A depicts a perspective view of one variation of dental shim device.
Figure 7B:
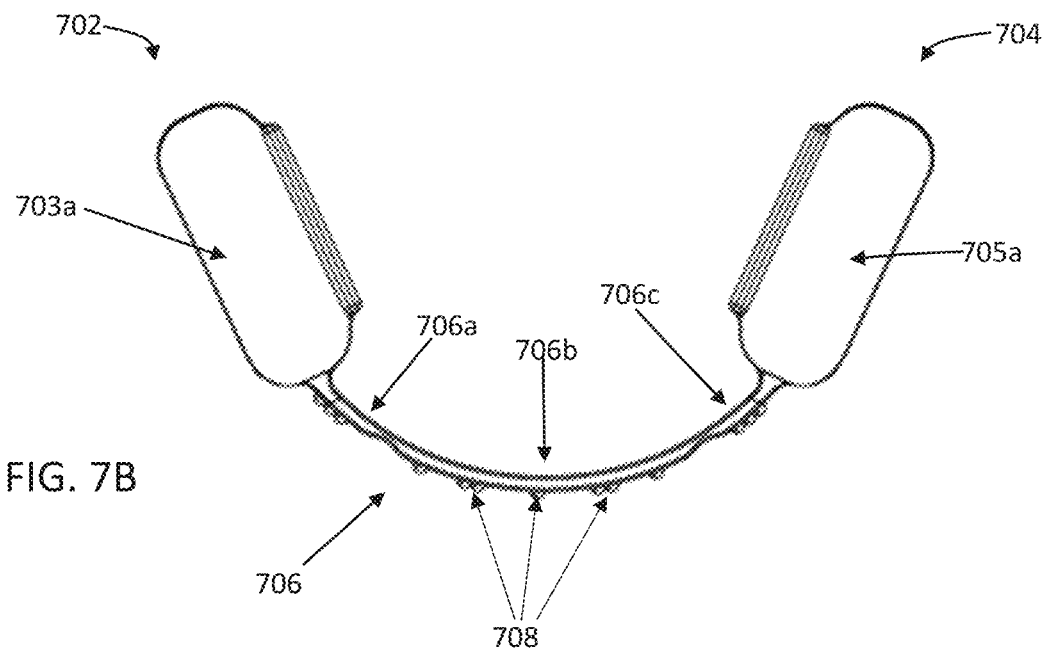
FIG. 7B depicts a top view of the dental shim device of FIG. 7A.
Figure 7C:
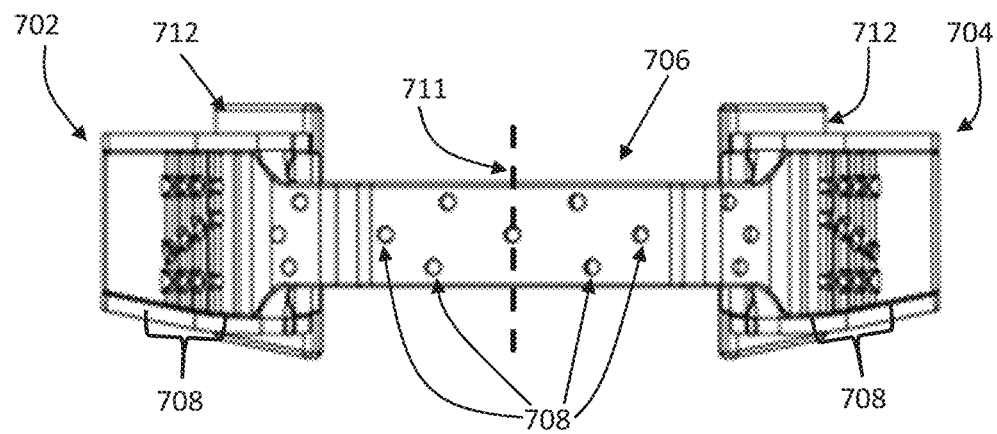
FIG. 7C depicts a front view of the dental shim device of FIG. 7A.
Figure 7D:
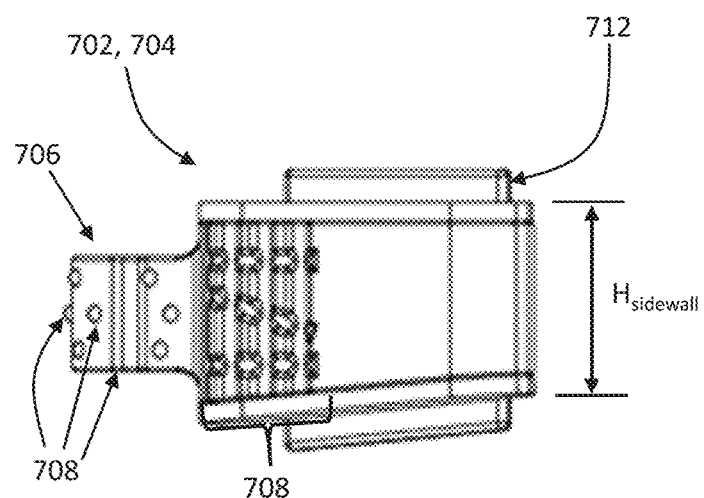
FIG. 7D depicts a side view of the dental shim device of FIG. 7A.

FIG. 7A depicts one variation of a dental shim device that may be used with an intraoral scanner to acquire imaging data of the contours of the user's oral structures and the relative alignment between the upper teeth/arch and the lower teeth/arch. The dental shim device (700) may comprise a first alignment portion (702) having an upper surface (703a) and a lower surface (703b), a second alignment portion (704) having an upper surface (705a) and a lower surface (705b), a bridge portion (706) that spans between the first and second alignment portions, and one or more orientation registration markers (708). The registration markers (708) may be located along the facial surfaces of the first and second alignment portions and the bridge portion. An alignment portion may comprise a block with top and bottom surfaces and sidewalls extending between the top and bottom surfaces. A bridge portion may comprise a strip having two ends that are each attached to an alignment portion. As depicted in FIGS. 7A and 7D, each alignment portion (702, 704) may have a sidewall (710) that spans between the upper and lower surfaces. The vertical dimension, e.g., height $H_{sidewall}$, may be selected to retain a desired vertical offset between the upper and lower teeth, and may be from about 5 mm to about 25 mm. While the vertical dimension in the shim device of FIGS. 7A-7D is uniform across the alignment portion, in other variations, the vertical height may vary across the alignment portion (e.g., having an inclined, angled, or tapered surface). For example, the vertical height may vary and be determined as least in part based on the desired vertical offset between the upper and lower dental arches and the teeth that are used to define that vertical offset. For example, the vertical offset may be defined by the vertical distance between the upper and lower molars, or the upper and lower premolars, or the upper and lower anterior teeth, etc. In turn, the height of the alignment portion may be determined based on the location of the teeth along the dental arch and the desired vertical offset. The upper and lower surfaces of the alignment portion may comprise protrusions and/or grooves to help seat the user's teeth on the alignment portion. For example, the lingual side of the alignment portion may comprise a wall extension (712) that extends above the upper surface (703a, 705a) of the alignment portion (and/or optionally, below the lower surface (703b, 705b) of the alignment portion). FIG. 7B depicts one variation of a bridge portion (706) may comprise a left segment (706a), a central segment (706b), and a right segment (706c) that are connected to each other. The central segment (706b) may have a greater radius of curvature than the left and right segments (706a, 706b), i.e., the left and right segments may be straighter than the central segment. The segments (706a, 706b, 706c) may be connected to each other via a hinge, for example, a living or flexible hinge. Alternatively, the bridge portion may be a strip of a flexible material with a pre-shaped curve that approximates the curvature of a dental arch, with some compliance to accommodate the dental arches of different users. Optionally, certain regions of the bridge portion (e.g., hinge regions, one or more lengths along a bridge portion strip) may be tapered from the top edge to the bottom edge (e.g., from the maxillary edge to mandibular edge). This may help facilitate scanning of the incisal edge (e.g., where the maxillary incisal edge may protrude over mandibular incisal edge).

The orientation registration markers (708) may comprise any of the features previously described. For example, as depicted in FIGS. 7A, 7B, and 7D, the registration markers (708) located along the bridge portion may be raised protrusions arranged in a non-symmetric pattern across the vertical dimension, and may optionally, as shown in FIG. 7C, have a mirror-symmetric arrangement having a line of symmetry at the center midline (711) of the bridge portion (706). The registration markers (708) located along the sidewalls (710) of the alignment portions may be recessed and/or visual indicia printed on the surface of the sidewall (i.e., does not protrude from the surface). The registration markers (708) on the sidewalls may be arranged in a zig-zag or staggered pattern along the vertical dimension of the side wall, as depicted in FIGS. 7A, 7C, and 7D. Orientation registration markers may include cross-hatch patterns, elevated/depressed geometric features, such as semi-circles, blocks or other notches, vertical grooves or protrusions, and the like set at specified positions along the bridge and/or alignment portions to allow for continuous scanning of the user's oral anatomy and the shim device. Orientation registration markers may allow for continuous scanning of the user's teeth and the shim device from one end of a dental arch to the other end of the dental arch, which may be used to determine the alignment between the upper and lower dental arches.

Figure 8A:
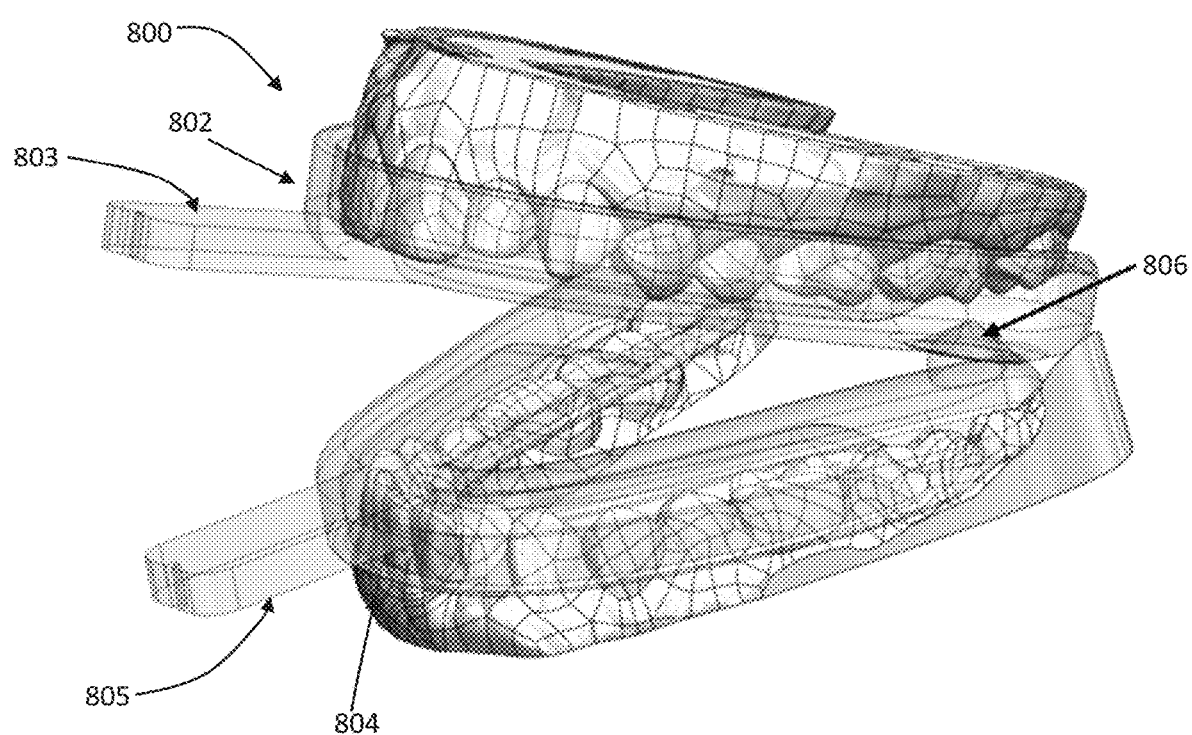
FIG. 8A depicts a perspective view of one variation of dental shim device.
Figure 8B:
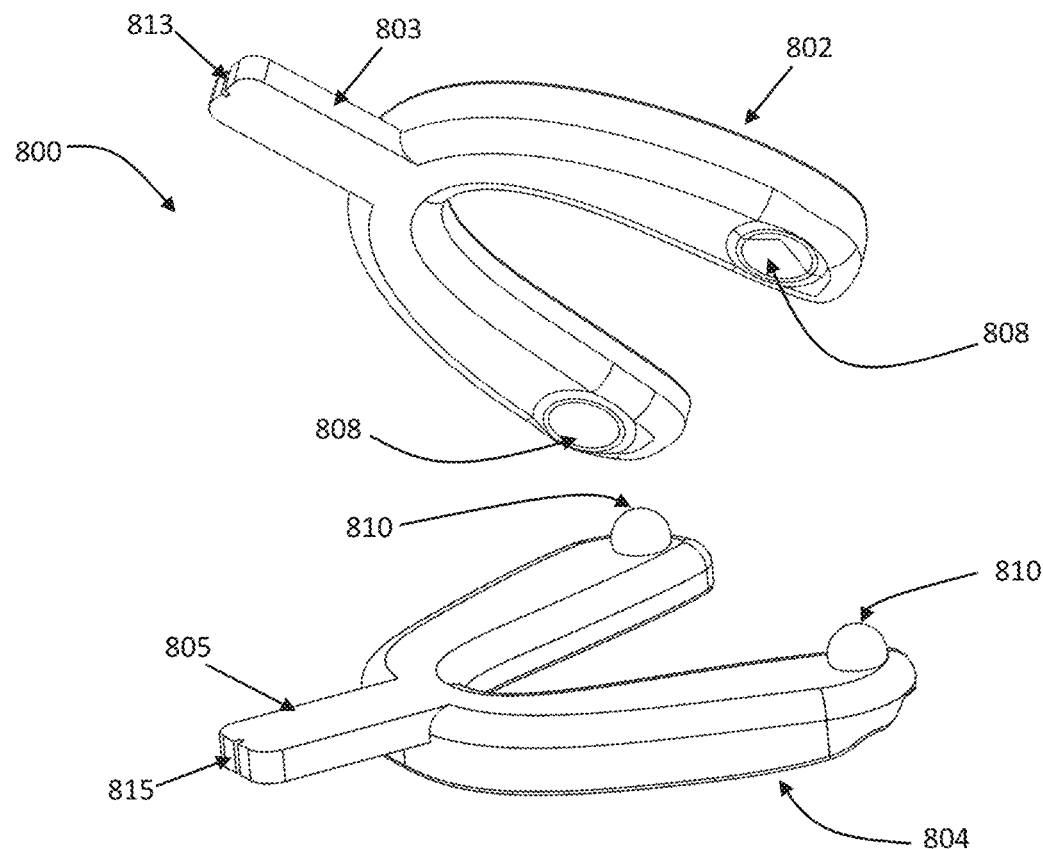
FIG. 8B depicts a perspective component view of the dental shim device of FIG. 8A.
Figure 8C:
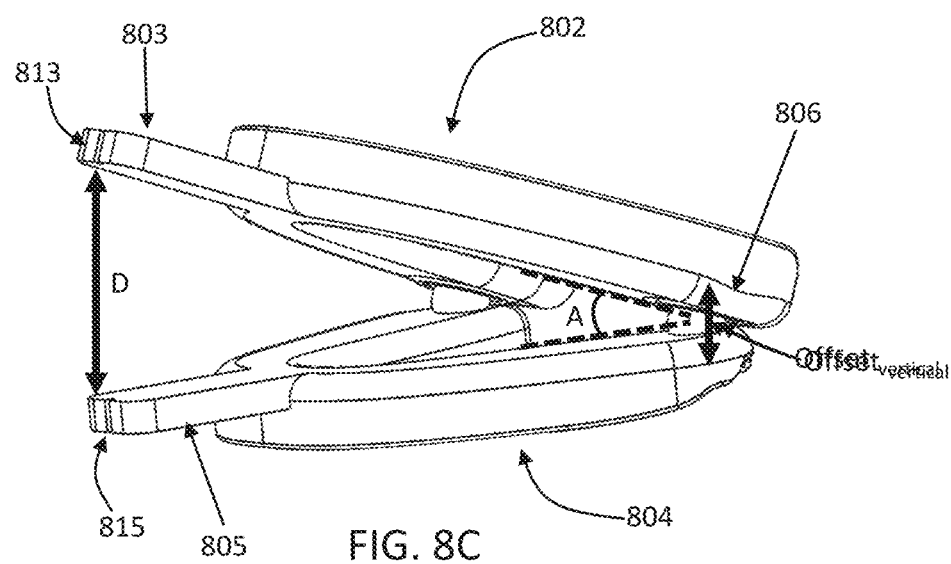
FIG. 8C depicts a perspective side view of the dental shim device of FIG. 8A.

FIGS. 8A-8D depict another variation of a dental shim device that may be used to acquire imaging data of the contours of the user's oral structures and the relative alignment between the upper teeth/arch and the lower teeth/arch. FIG. 8A depicts the dental shim device (800) that has been inserted into a user's oral cavity. The dental shim device (800) may comprise an upper tray (802) having an upper handle (803) that extends from a curved portion of the upper tray, a lower tray (804) having a lower handle (805) that extends from a curved portion of the lower tray, and an adjustable mating joint (806) that engages the upper tray and lower tray. The attachment joint (806) may be configured to adjust a vertical offset and angle between the upper tray and the lower tray. The upper tray and lower tray (802, 804) may each have a trough comprising a surface that contacts upper teeth of an upper dental arch and the lower teeth of a lower dental arch, respectively. The upper and lower handles may each comprise a marker such as a notch (813, 815), as depicted in FIGS. 8B and 8C. When the shim device (800) is inserted in a user's oral cavity and clamped together by the user's jaws, the distance D between the upper notch (813) and the lower notch (815) may be measured and stored in a processor memory, and may be used with other scan data to determine the alignment between the upper and lower teeth and/or arches.

FIGS. 8B and 8C depict one variation of an adjustable mating joint (806). An adjustable mating joint (806) may comprise a concave groove (808) and a corresponding protrusion (810) on the upper and lower trays, respectively. In this variation, the protrusion (810) has the shape of a sphere or a ball that fits within the concave groove (808). When the upper and lower trays are not clamped within a user's mouth, the ball can move within the groove, however, when the trays are clamped within the user's mouth, the ball is retained at a particular location within the concave groove. The size and shape of the concave groove and the protrusion may be selected such that a desired vertical offset, e.g., Offset$_{vertical}$, is attained between the rear upper and lower teeth. For example, the concave groove may have an internal cavity with one or more curves, which may be cone-shaped, hemispheric, and/or any shape that allows for some motion of the protrusion within the groove to accommodate the different oral geometries of different users. With the measured distance value D and the selected (i.e., known) vertical offset Offset$_{vertical}$, the angle A between the flat surfaces of the upper and lower trays may be calculated. These parameters, along with imaging data of the contours of the user's upper and lower teeth and gums, may allow a processor to determine the alignment between the upper and lower teeth and/or dental arches.

Figure 8D:
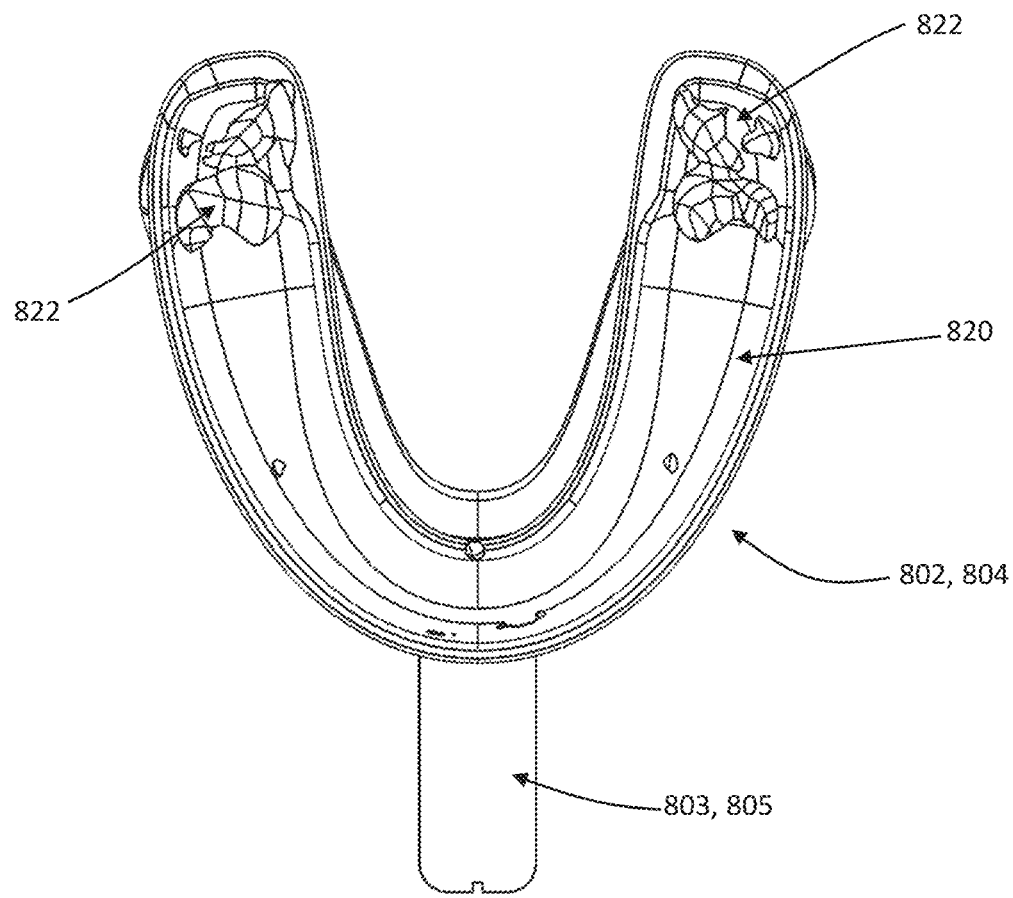
FIG. 8D depicts a top view of the dental shim device of FIG. 8A.

Imaging data of the contours of the user's upper and lower teeth and gums may be acquired by scanning impressions of these dental structures created on compliant materials of the teeth-contacting surface of the upper and lower trays. FIG. 8D depicts a view of the teeth-contacting surface (820) of either the upper or lower trays (802, 804). The teeth-contacting surface (820) may comprise regions having a compliant material that conforms to the contours of a user's oral geometry. As an example, FIG. 8D depicts the contours (822) of a user's molars impressed upon the compliant material when the trays were clamped between their teeth. The compliant material may be distributed along the entire teeth-contacting surface (820) or may be located at selected regions (e.g., rear regions, central regions, and/or front regions) of the teeth-contacting surface. The compliant material may comprise any of the compliant materials previously described above. Any imaging acquisition device or camera may be used to scan the impressions of the teeth and gums in the compliant material(s) of the upper and lower trays.

Figure 8E:
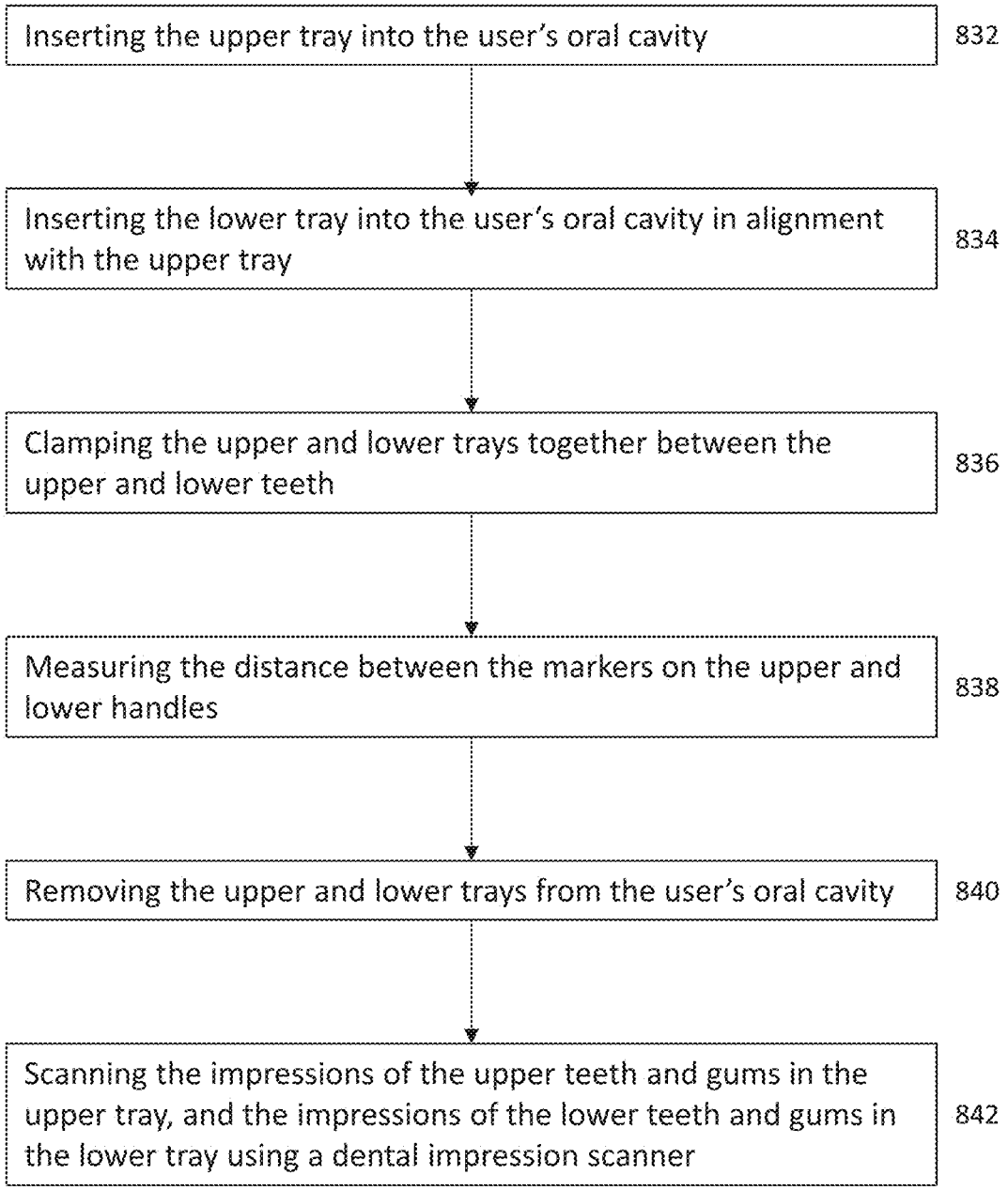
FIG. 8E is a flowchart depicting one method for acquiring imaging data of the contours, locations, orientation and/or alignment of the user's oral anatomy using a shim device.

One method for acquiring imaging data of the contours, locations, orientation and/or alignment of the user's oral anatomy using the shim device of FIGS. 8A-8D is represented by the flowchart in FIG. 8E. Method (830) may comprise inserting (832) the upper tray into the user's oral cavity, inserting (834) the lower tray into the user's oral cavity in alignment with the upper tray, clamping (836) the upper and lower trays together between the upper and lower teeth, measuring (838) the distance between the markers on the upper and lower handles, removing (840) the upper and lower trays from the user's oral cavity, and scanning (842) the impressions of the upper teeth and gums in the upper tray, and the impressions of the lower teeth and gums in the lower tray using a camera, such as a dental impression scanner. In some variations, camera may be any external scanner or camera that can acquire photographs (i.e., still images or snapshots) and/or videos and may not be an intraoral scanner or camera. The method (830) may optionally comprise storing the measured distance in a processor memory, and in conjunction with the scanned impressions of the upper and lower trays and the specified Offset$_{vertical}$, a processor may be configured to generate a model of the user's oral cavity that includes the contours of the user's oral structures as well as the alignment of the upper and lower teeth and/or dental arches to generate a model of the user's oral geometry.

Figure 8F:
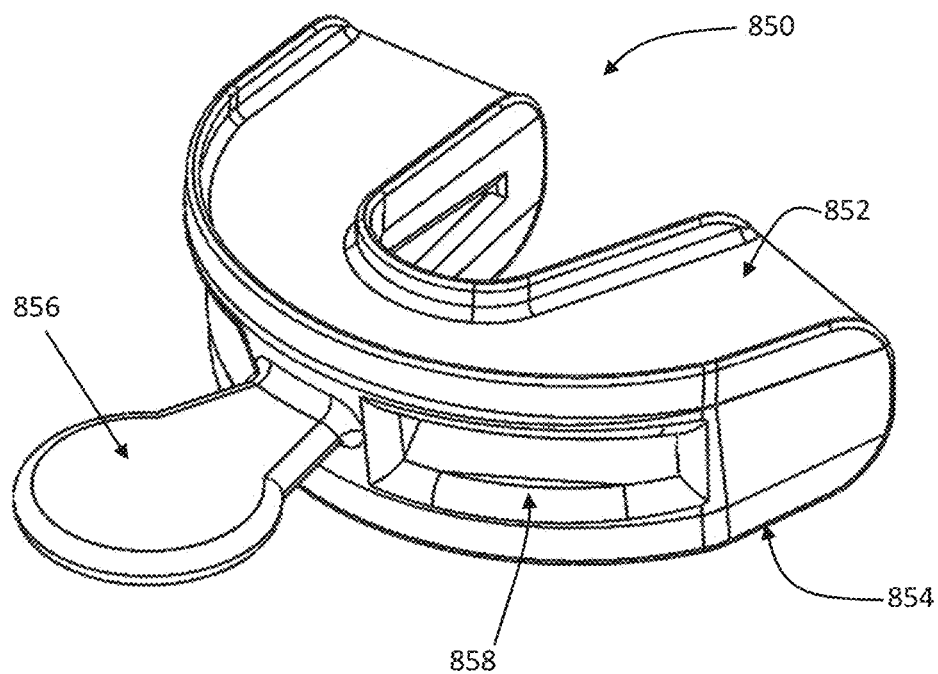
FIGS. 8F-8I depict a perspective view, a partial cutaway side view, a top view, and a rear view, respectively, of a variation of a dual-sided shim device.
Figure 8G:
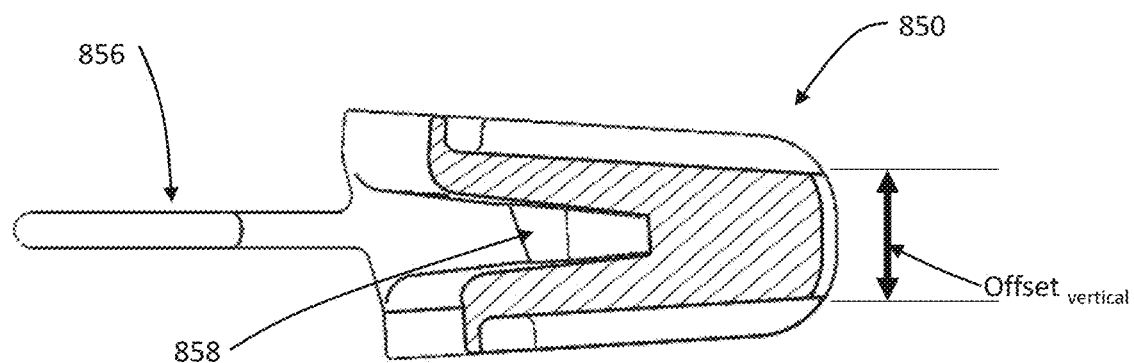
Figure 8H:
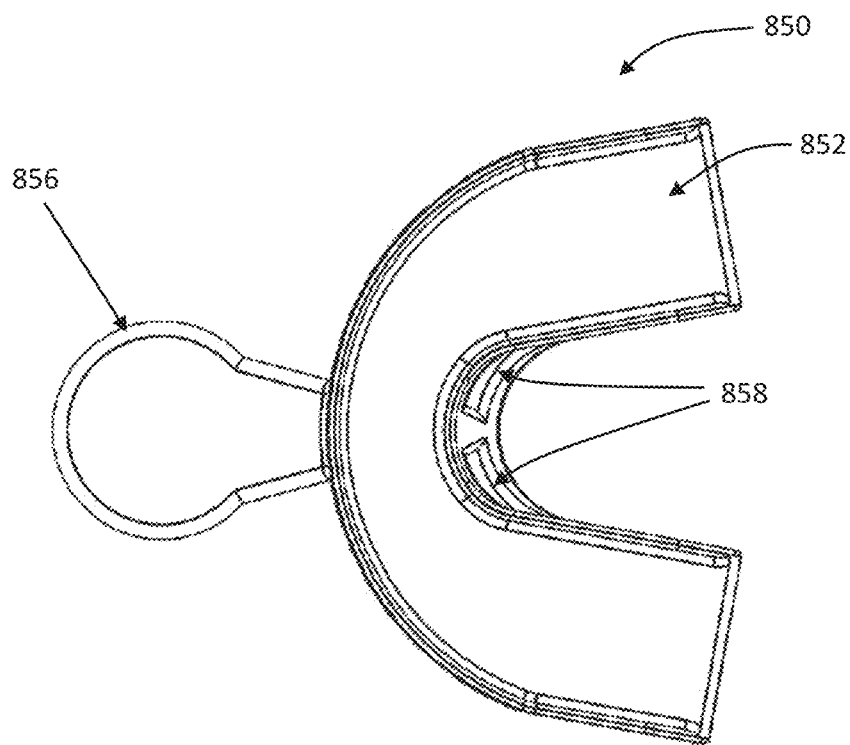
Figure 8I:
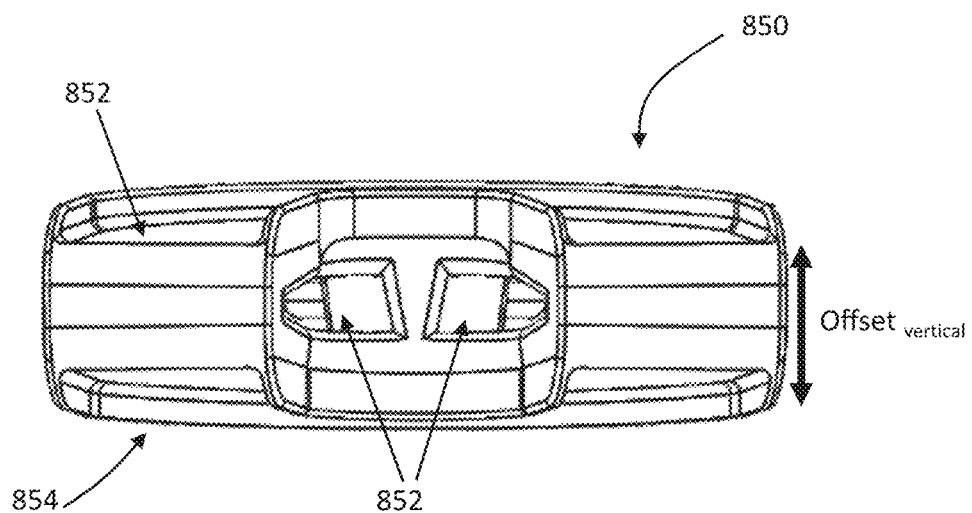

Another variation of a shim device is depicted in FIGS. 8F-8I. FIG. 8F depicts a perspective view, FIG. 8H depicts a top view, and FIG. 8I depicts a rear view of a dual-sided shim device (850). The dual-sided shim device (850) may comprise an upper tray (852), a lower tray (854) connected to the upper tray such that there is fixed, pre-selected vertical offset, and a placement tab (856). The upper tray (852) and the lower tray (854) may each have a curvature that corresponds with the curvature of the upper dental arch and the lower dental arch, respectively. The upper tray and lower tray (852, 854) may each have a trough comprising a surface that contacts upper teeth of an upper dental arch and the lower teeth of a lower dental arch, respectively, and may be configured to retain a compliant material that can conform to the contours of the user's teeth. Examples of compliant materials may include one or more of a rubber-like material, dental wax, dental impression material, gingival barrier material, and foam. The placement tab (856) may be located midway along the curvature of the upper and lower trays, and may, for example, be located at or along an axis of symmetry of the shim device (850) to help facilitate positioning of the shim device (850) within the user's mouth. In some variations, the shim device (850) may further comprise one or more slots or channels (858) that extend through from the anterior portion of the shim device to the posterior portion of the shim device, which may allow a user to breathe while they are clamped down on the shim device (850). The dual-sided shim device (850) may be made of any non-reflective, non-transparent material, or any opaque material. FIG. 8G is a partial cutaway side view of the shim device (850), which depicts the pre-selected vertical offset. In some variations, the vertical offset may be from about 5 mm to about 25 mm, e.g., about 10 mm, about 12 mm, about 16 mm, etc. The dental shim device (850) may be used to capture the impressions and relative positions of a subset of the teeth along the upper and lower arches, at the pre-selected offset. For example, the dental shim device may be configured to obtain impressions of teeth that are forward to the pre-molars (e.g., up to and including the pre-molars). Scan data of the impressions in the compliant material at the pre-selected vertical offset may be combined with scan data of the full set of teeth along the upper and lower arches to build a model of an oral insert that is customized to the user.

One variation of a method for acquiring imaging data of the contours, locations, orientation and/or alignment of the user's oral anatomy using the shim device of FIGS. 8F-8I is represented by the flowchart in FIG. 8J. Method (880) may comprise aligning (882) placement tab of the dual-sided shim with the midplane of the user's bit and inserting the dual-sided shim into the user's oral cavity, clamping (884) the dual-sided shim between the upper and lower teeth, removing (886) the dual-sided shim from the user's oral cavity, and scanning (888) the impressions of the upper teeth and gums in the upper tray, and the impressions of the lower teeth and gums in the lower tray using a dental impression scanner. The dual-sided shim device may remain in the user's mouth for variable amounts of time, depending on the length of time needed for the compliant material in the upper and lower trays to harden and retain the impressions of the user's teeth. The impressions from the upper and lower trays of the dual-sided shim devices may be obtained using any of the cameras described herein. Optionally, method (880) may further comprise scanning (890) single-arch impressions of the user's upper teeth and gums and the user's lower teeth and gums, and determining (892) the relative alignment between the upper and lower arches based on the scans of the impressions from the dual-sided shim and the single-arch impressions.

Figure 10A:
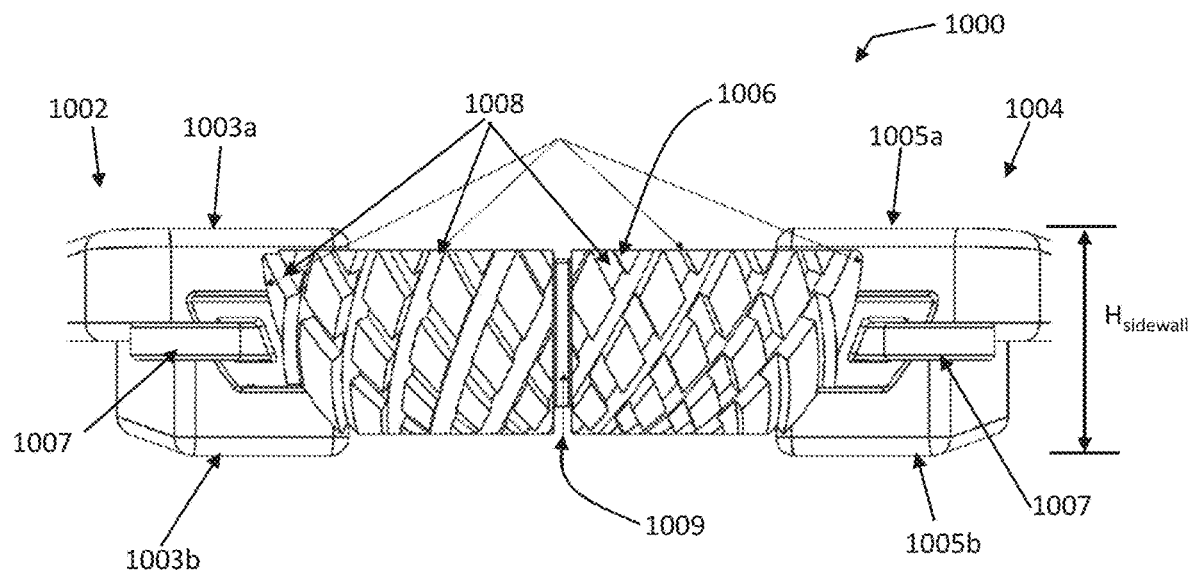
FIGS. 10A-10D depict another variation of a shim device.

Another variation of a shim device is depicted in FIGS. 10A-10D. FIG. 10A depicts one variation of a dental shim device that may be used with an intraoral scanner to acquire imaging data of the contours of the user's oral structures and the relative alignment between the upper teeth/arch and the lower teeth/arch. The dental shim device (1000) may comprise a first alignment portion (1002) having an upper surface (1003a) and a lower surface (1003b), a second alignment portion (1004) having an upper surface (1005a) and a lower surface (1005b), a bridge portion (1006) that spans between the first and second alignment portions, and one or more orientation registration markers (1008). Some variations may comprise one or more placement tabs (1007), which may be extrusions from the bridge and/or alignment portions of the shim to allow the shim device to be held without obstructing the natural bite of the user. The registration markers (1008) may be located along the facial surfaces of the first and second alignment portions and/or the bridge portion. In some variations, registration markers may be located only on the bridge portion, only on the alignment portions, or on both the bridge and alignment portions. The orientation registration markers (1008) may comprise any of the features previously described. In some variations, the orientation registration markers (1008) may be located only along the facial surface of the bridge portion (1006), and may include a midline indicator (1009). In use, the midline indicator (1009) may be aligned with the midline of at least one of the two arches, e.g., the maxillary arch. In some variations, the orientation registration markers (1008) may comprise a diamond pattern, where the diamond sizes are not uniform.

Figure 10B:
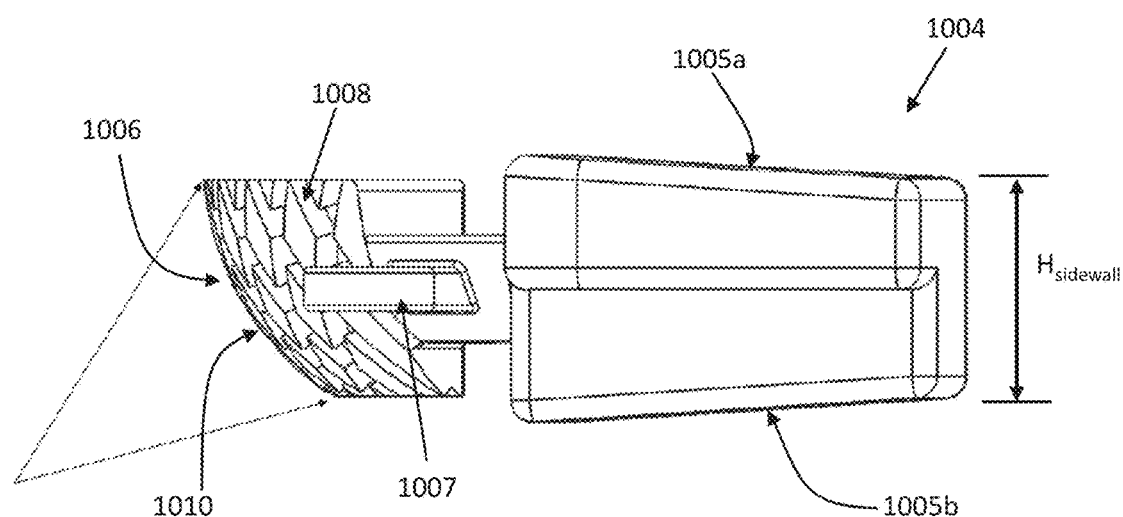
Figure 10C:
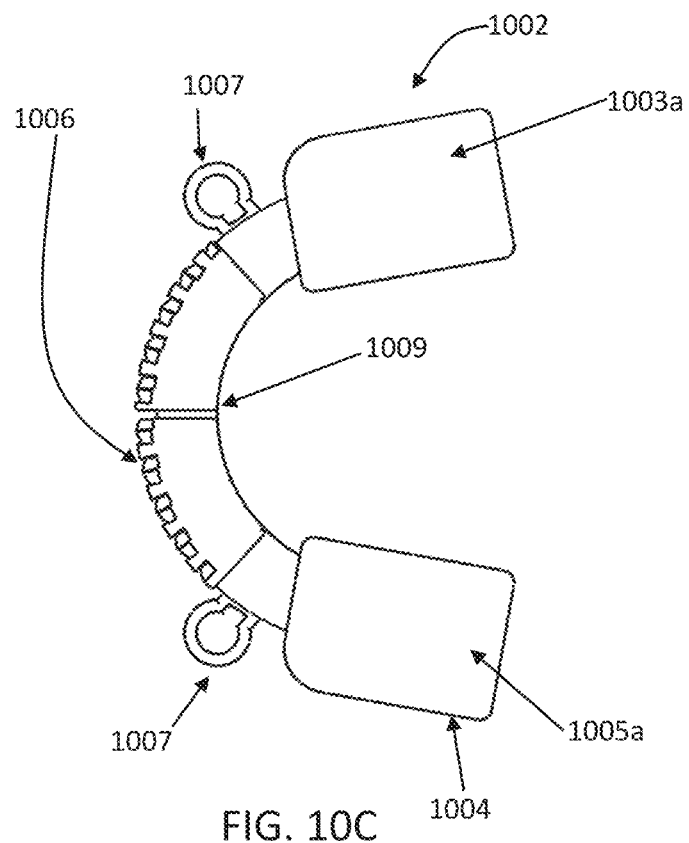
Figure 10D:
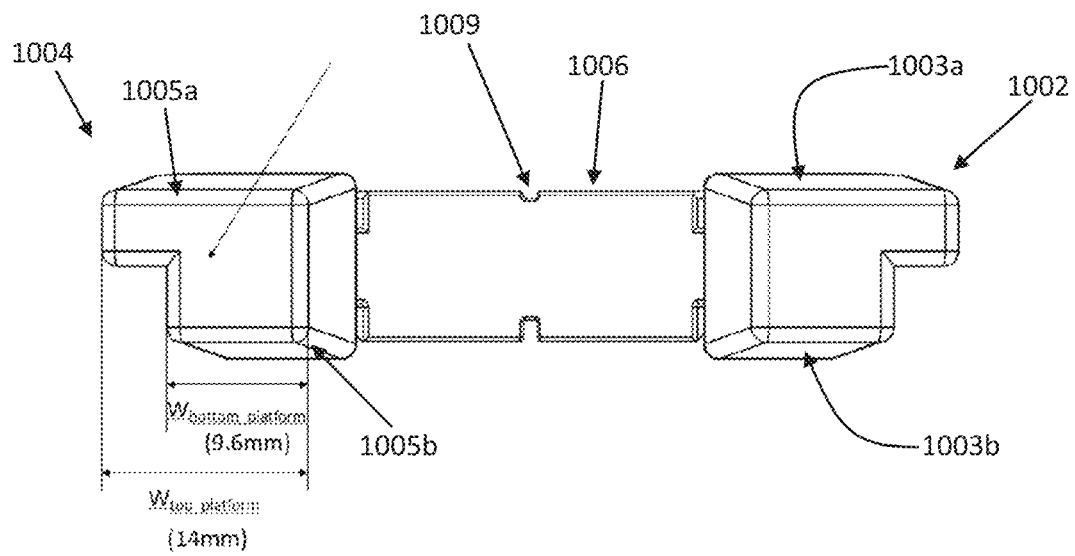

An alignment portion may comprise a block with top and bottom surfaces and sidewalls extending between the top and bottom surfaces. A bridge portion may comprise a strip having two ends that are each attached to an alignment portion. As depicted in FIGS. 10A and 10B, each alignment portion (1002, 1004) may have a sidewall that spans between the upper and lower surfaces. The vertical dimension, e.g., height $H_{sidewall}$, may be selected to retain a desired vertical offset between the upper and lower teeth, and may be from about 5 mm to about 25 mm. While the vertical dimension in the shim device of FIGS. 10A-10D is uniform across the alignment portion, in other variations, the vertical height may vary across the alignment portion (e.g., having an inclined, angled, or tapered surface). For example, the vertical height may vary and be determined as least in part based on the desired vertical offset between the upper and lower dental arches and the teeth that are used to define that vertical offset. For example, the vertical offset may be defined by the vertical distance between the upper and lower molars, or the upper and lower premolars, or the upper and lower anterior teeth, etc. In turn, the height of the alignment portion may be determined based on the location of the teeth along the dental arch and the desired vertical offset. The upper surfaces of the alignment portions may have width $W_{top\_platform}$ that is greater than the width $W_{bottom\_platform}$ of the lower surfaces. The difference between the upper width $W_{top\_platform}$ and the lower width $W_{bottom\_platform}$ may be from about 3 mm to about 6 mm, e.g., about 4 mm to about 5 mm. In one variation, a width $W_{top\_platform}$ of the upper surface may be about 14 mm while the width $W_{bottom\_platform}$ of the lower surface may be about 9.6 mm. The precise dimensions may vary according to the general size of the user's oral cavity (e.g., based on age and/or gender).

FIG. 10B depicts a side view of the shim device, where the bridge portion (1006) may comprise a convex facial surface (1010) and in some variations, the convex facial surface may be tapered. That is, an upper portion of the facial surface of the bridge may protrude forward and taper inward toward a lower portion of the facial surface (e.g., from the maxillary edge to mandibular edge). This may help facilitate scanning the lower anterior teeth for users who may have an overbite (e.g., where the maxillary incisal edge may protrude over mandibular incisal edge). In some variations, the bridge portion may be a strip of a flexible material with a pre-shaped curve that approximates the curvature of a dental arch, with some compliance to accommodate the dental arches of different users.

While the oral shim devices described herein are used for oral scanning for the modeling and making of an oral insert (e.g., any of the oral inserts described herein), it should be understood that these oral shim devices may be used during oral scans for other purposes, including for the modeling and making of mouthguards, retainers, and the like.

Methods for Microbiome Sample Collection

Figure 9:
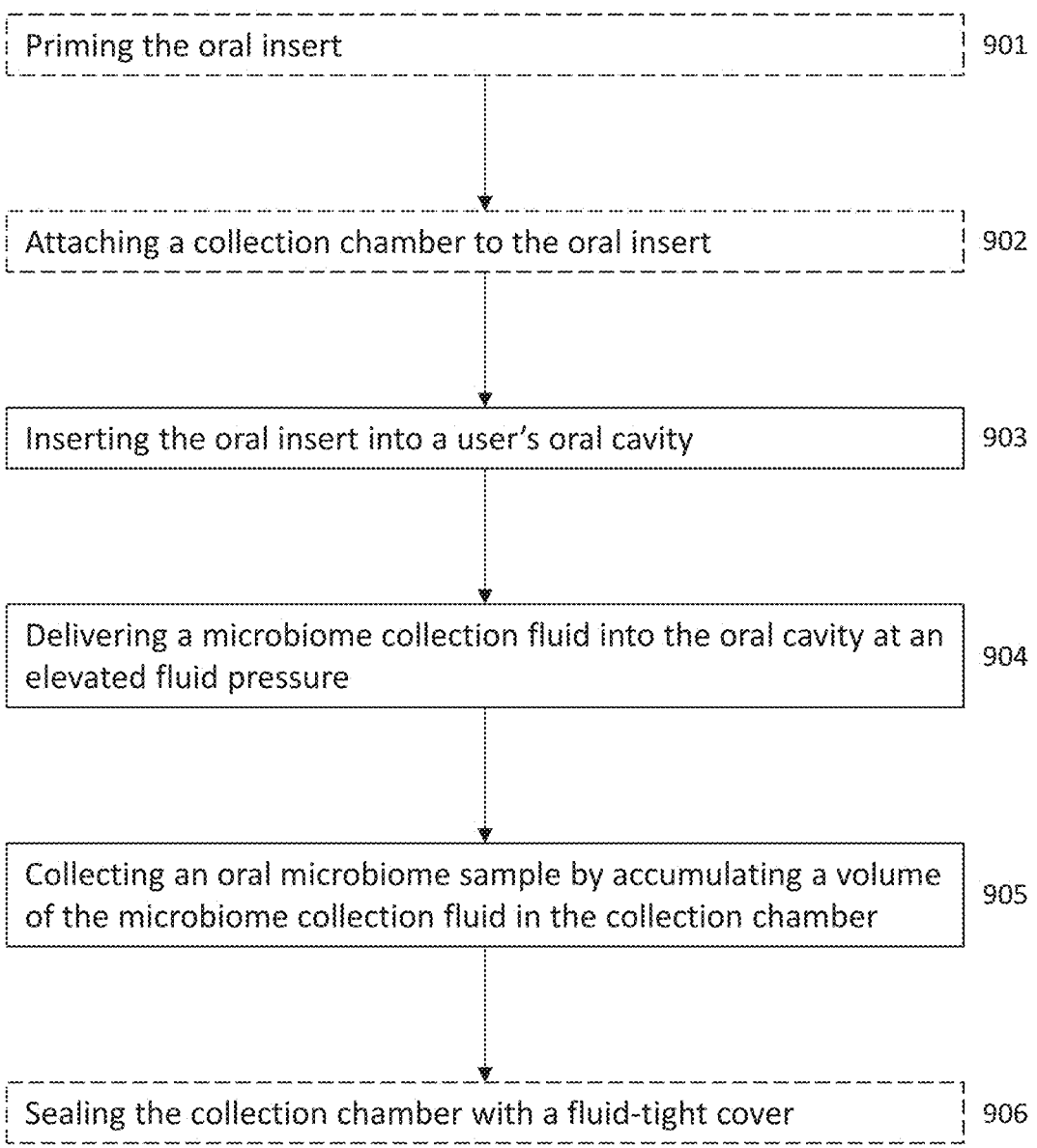
FIG. 9 is a flowchart depicting one variation of a method for collecting an oral microbiome sample in a collection chamber using an oral care system.

FIG. 9 depicts one variation of a method for collecting an oral microbiome sample in a collection chamber using any of the oral care systems described herein. As described previously, a user may select the sample collection mode (and/or the optional priming mode) on the base station of the system prior to sample collection. Method (900) may comprise inserting (903) the oral insert into a user's oral cavity, delivering (904) a microbiome collection fluid into the oral cavity at an elevated fluid pressure (e.g., from about 40 psi to about 200 psi or more), and collecting (905) an oral microbiome sample by accumulating a volume of the microbiome collection fluid in the collection chamber. Method (900) may optionally comprise priming (901) the oral insert and then coupling or attaching (902) the collection chamber to the oral insert prior to inserting the oral insert into the user's oral cavity. Priming (901) the oral insert may comprise pumping the microbiome collection fluid through the oral insert and discarded before inserting the oral insert into the user's oral cavity. During priming of the oral insert, the microbiome collection fluid may be pumped into the oral insert from about 1 second to about 60 seconds and the fluid may be discarded. After the oral microbiome sample has been collected, method (900) may optionally comprise sealing (906) the collection chamber with a fluid-tight cover and de-coupling the collection chamber from the oral insert. Optionally, a sample stabilization compound may be provided in the collection chamber before, during and/or after the accumulation of the volume of collection fluid in the chamber. The microbiome sample may then be analyzed to measure the content and/or content quantity of the user's microbiome. For example, a sample of a user's oral microbiome may be analyzed for bacterial content, and/or fungal content, and/or viral content, and/or protein content (including nucleic acids such as DNA or RNA), pH levels, and such data may be used to calculate a metric of the user's oral health. For example, a gum health score that represents the inflammation state/level of a user's gums may be calculated based on the content of the user's microbiome. Analysis of the collected microbiome sample by a processor may output the type and/or quantity of bacterial species in the oral cavity, ratio of commensal to pathogenic bacteria, whether high-risk and/or low-risk pathogens are present, correlations between pathogen type and systemic disease for informative purposes, etc.). Oral microbiome data may optionally be tracked over time (e.g., processor may monitor changes in the microbiome profile over time). The result of the microbiome analysis may be output to a display device for viewing by a user or clinician.

The invention claimed is:

1. A system for cleaning a user's oral cavity, the system comprising:
a fluid reservoir;
an oral insert comprising
an upper portion that is sized and shaped to receive a user's upper teeth,
a lower portion that is sized and shaped to receive a user's lower teeth, and
a plurality of fluid nozzles located in the upper portion and the lower portion and directed toward interproximal spaces between the user's teeth, and
an effluence conduit located between the upper portion and the lower portion and configured to channel fluid from a posterior or lingual region to an anterior or facial region of the user's oral cavity, wherein the oral insert comprises a plurality of fluid manifolds and a manifold connector, wherein the plurality of fluid manifolds are in fluid communication with the plurality of fluid nozzles and each fluid manifold terminates at a manifold opening in the manifold connector;
a handle comprising a fluid conduit in fluid communication with the fluid reservoir and the plurality of fluid nozzles of the oral insert, wherein the handle comprises an attachment mechanism configured to detachably retain the oral insert; and
a fluid switcher assembly, wherein the fluid switcher assembly comprises a motor and a rotor connected to the motor.

2. The system of claim 1, wherein the fluid effluence conduit comprises a central port located at a central region of the oral insert, wherein a posterior opening of the central port is configured to channel fluid from the posterior or lingual region of the user's oral cavity to the anterior or facial region of the user's oral cavity.

3. The system of claim 1, wherein the effluence conduit comprises a central port located at a central region of the oral insert, a first fluid cavity on a right side of the oral insert, and a second fluid cavity on a left side of the oral insert, wherein the first and second fluid cavities are in fluid communication with the central port.

4. The system of claim 1, wherein the oral insert has a U-shaped curve that corresponds with a curvature of the user's mandible and/or maxilla.

5. The system of claim 1, wherein the fluid nozzles are each located within a recess along an outer surface of the oral insert.

6. The system of claim 5, wherein the recess has a first end at an opening of the fluid nozzle and a second end at an opening along the outer surface of the oral insert.

7. The system of claim 5, wherein the recess has one or more concave contours.

8. The system of claim 1, wherein the attachment mechanism comprises a sealing ring configured to provide a water-tight interface between the manifold connector and the handle.

9. The system of claim 8, wherein the handle further comprises an elastomeric vibration damper located between the fluid switcher assembly and the oral insert.

10. The system of claim 8, wherein manifold openings of the manifold connector are arranged in a circle.

11. The system of claim 1, wherein the oral insert further comprises an elastomeric substrate and the handle further comprises a vibration mechanism that causes vibratory motion of the elastomeric substrate.

12. The system of claim 11, wherein the handle is attached to the oral insert such that vibratory motion from the vibration mechanism is transferred to the elastomeric substrate.

13. The system of claim 11, wherein the fluid conduit comprises a fluid valve configured to regulate fluid flow to the plurality of fluid nozzles, and wherein the fluid conduit is mechanically coupled to the vibration mechanism such that vibrations caused by fluid flow through the fluid conduit combine with the vibratory motion from the vibration mechanism to cause vibration of the elastomeric substrate.

14. A system for cleaning a user's oral cavity, the system comprising:
a fluid reservoir;
an oral insert comprising
an upper portion that is sized and shaped to receive a user's upper teeth,
a lower portion that is sized and shaped to receive a user's lower teeth, and a plurality of fluid nozzles located in the upper portion and the lower portion and directed toward interproximal spaces between the user's teeth, and an effluence conduit located between the upper portion and the lower portion and configured to channel fluid from a posterior or lingual region to an anterior or facial region of the user's oral cavity, wherein the effluence conduit comprises a central port located at a central region of the oral insert, a first fluid cavity on a right side of the oral insert, and a second fluid cavity on a left side of the oral insert, wherein the first and second fluid cavities are in fluid communication with the central port, wherein the first fluid cavity has a first opening configured to be located in the back region of the user's oral cavity and the second fluid cavity has a second opening configured to be located in the back region of the user's oral cavity, wherein surfaces of the oral insert around perimeter edges of the first and second openings comprise concave or convex contours.

15. A system for cleaning a user's oral cavity, the system comprising:

a fluid reservoir;

an oral insert comprising an upper portion that is sized and shaped to receive a user's upper teeth, a lower portion that is sized and shaped to receive a user's lower teeth, and a plurality of fluid nozzles located in the upper portion and the lower portion and directed toward interproximal spaces between the user's teeth, and an effluence conduit located between the upper portion and the lower portion and configured to channel fluid from a posterior or lingual region to an anterior or facial region of the user's oral cavity; and a handle comprising a fluid conduit in fluid communication with the fluid reservoir and the plurality of fluid nozzles of the oral insert, wherein the fluid reservoir comprises a fluid opening and a check valve on a bottom surface that is configured to provide fluid to the handle, and an elevated plate disposed over the fluid opening such that there is a gap between the elevated plate and the fluid opening.

16. A customized system for oral irrigation comprising:

a fluid reservoir;

a customized oral insert comprising an upper substrate configured to receive a user's upper teeth, a lower substrate configured to receive a user's lower teeth, an arrangement of fluid openings located in the upper and lower substrates, a fluid ingress port that is connectable to the fluid reservoir and in fluid communication with the fluid openings, and a fluid effluence port; and a collection container configured to be attached to the fluid effluence port of the oral insert.

17. The system of claim 16, further comprising a microbiome collection fluid within the fluid reservoir.

18. The system of claim 16, further comprising a sample stabilization fluid within the collection container, wherein the sample stabilization fluid comprises a liquid suspension.

* * * * *